(12) United States Patent
Reinke et al.

(10) Patent No.: US 12,703,796 B2
(45) Date of Patent: Aug. 11, 2026

(54) STEROL IN ASPHALT ROOFING MATERIALS

(71) Applicants: A.L.M. Holding Company, Onalaska, WI (US); Ergon Asphalt & Emulsions, Inc., Jackson, MS (US)

(72) Inventors: Gerald H. Reinke, La Crosse, WI (US); Gaylon L. Baumgardner, Arkadelphia, AR (US); Andrew Hanz, La Crosse, WI (US)

(73) Assignees: A.L.M. Holding Company, Onalaska, WI (US); Ergon Asphalt & Emulsions, Inc., Jackson, MS (US)

( * ) Notice: Subject to any disclaimer, the term of this patent is extended or adjusted under 35 U.S.C. 154(b) by 706 days.

(21) Appl. No.: 17/627,491

(22) PCT Filed: Jul. 15, 2020

(86) PCT No.: PCT/US2020/042203
§ 371 (c)(1),
(2) Date: Jan. 14, 2022

(87) PCT Pub. No.: WO2021/011704
PCT Pub. Date: Jan. 21, 2021

(65) Prior Publication Data

US 2022/0251387 A1 Aug. 11, 2022

Related U.S. Application Data

(60) Provisional application No. 63/027,845, filed on May 20, 2020, provisional application No. 62/887,811,
(Continued)

(51) Int. Cl.
*C08L 95/00* (2006.01)
*C08J 11/06* (2006.01)
*D06N 5/00* (2006.01)

(52) U.S. Cl.
CPC .............. *C08L 95/00* (2013.01); *C08J 11/06* (2013.01); *D06N 5/003* (2013.01);
(Continued)

(58) Field of Classification Search
CPC .............. C08L 95/00; C08L 2205/025; C08L 2207/22; C08L 2555/34; C08L 2555/64;
(Continued)

(56) References Cited

U.S. PATENT DOCUMENTS 1,112,492 A 10/1914 Turner
2,280,843 A 4/1942 Oliver et al.
(Continued)

FOREIGN PATENT DOCUMENTS

CA 3 026 997 A1 12/2017
CL 2011002791 A1 4/2012
(Continued)

OTHER PUBLICATIONS

ASTM Roof Standard 2023 (Year: 2023).*
(Continued)

*Primary Examiner* — Stefanie J Cohen
(74) *Attorney, Agent, or Firm* — Kagan Binder, PLLC

(57) ABSTRACT

Disclosed are compositions and methods of making and using asphalt roofing materials. The asphalt roofing materials include sterols. The sterols improve various rheological and aging properties of the asphalt roofing materials.

15 Claims, 33 Drawing Sheets

Related U.S. Application Data filed on Aug. 16, 2019, provisional application No. 62/874,229, filed on Jul. 15, 2019.

(52) U.S. Cl.
CPC ........ *C08J 2395/00* (2013.01); *C08J 2495/00* (2013.01); *C08L 2205/025* (2013.01); *C08L 2207/22* (2013.01); *C08L 2555/34* (2013.01); *C08L 2555/64* (2013.01)

(58) Field of Classification Search
CPC ........ C08L 91/00; C08J 11/06; C08J 2395/00; C08J 2495/00; D06N 5/003; C08K 5/05; C09J 201/00; C09J 11/06; E04D 5/02; E04D 5/10; E04D 11/02
See application file for complete search history.

(56) References Cited

U.S. PATENT DOCUMENTS 2,286,244 A 6/1942 Whitacre et al.
2,392,863 A 1/1946 Rudd
2,411,634 A 11/1946 Pearson
2,585,336 A 2/1952 McCoy
2,715,638 A 8/1955 Albrecht et al.
2,728,682 A 12/1955 Kalilnowski et al.
2,793,138 A 5/1957 Wilkinson
2,860,067 A 11/1958 Crews et al.
3,032,507 A 5/1962 Wright
3,044,373 A 7/1962 Sommer
3,556,827 A 1/1971 McConnaughay
3,691,211 A 9/1972 Julian
3,926,936 A 12/1975 Lehtinen
3,951,676 A 4/1976 Elste, Jr.
4,044,031 A 8/1977 Johnansson et al.
4,549,834 A 10/1985 Allen
4,874,432 A 10/1989 Kriech et al.
5,234,494 A 8/1993 Sawatzky et al.
5,437,717 A 8/1995 Doyle et al.
5,473,000 A 12/1995 Pinomaa
5,496,400 A 3/1996 Doyle et al.
6,027,557 A * 2/2000 Hayner .................. C08L 95/00 106/279
6,057,462 A 5/2000 Robinson et al.
6,107,456 A 8/2000 Huibers et al.
6,770,127 B2 8/2004 Kriech et al.
6,987,207 B1 1/2006 Ronyak
7,448,825 B2 11/2008 Kasahara et al.
7,575,767 B2 8/2009 May et al.
7,576,148 B2 * 8/2009 Kluttz .................... C08L 95/00 524/68
7,811,372 B2 10/2010 Nigen-Chaidron et al.
8,440,011 B2 5/2013 Naido et al.
8,513,338 B2 8/2013 Rodrigues
8,696,806 B2 4/2014 Williams et al.
8,741,052 B2 6/2014 Naidoo et al.
8,821,064 B1 9/2014 Morris et al.
9,481,794 B2 11/2016 Cox
9,828,506 B2 11/2017 Grady et al.
9,994,485 B2 6/2018 Warner et al.
10,030,145 B2 7/2018 Severance et al.
10,077,356 B2 9/2018 Fini
10,167,390 B2 1/2019 Cox
10,669,202 B2 * 6/2020 Reinke .................... C04B 24/08
10,793,720 B2 10/2020 Puchalski et al.
10,961,395 B2 3/2021 Williams et al.
11,097,981 B2 * 8/2021 Reinke .................... C04B 24/36
11,109,981 B2 * 9/2021 Ehteshami ............ A61F 2/4455
11,124,926 B2 9/2021 Fennell et al.
11,168,214 B2 11/2021 Reinke et al.
11,427,697 B2 * 8/2022 Reinke ...................... E01C 7/22
11,542,668 B2 1/2023 Reinke et al.
11,667,570 B2 6/2023 Reinke et al.
11,718,756 B2 8/2023 Reinke et al.
11,760,882 B2 9/2023 Reinke et al.
11,912,874 B2 * 2/2024 Reinke ..................... C08K 5/05
12,084,577 B2 9/2024 Reinke et al.
12,163,294 B2 12/2024 Reinke et al.
12,234,189 B2 2/2025 Reinke et al.
2003/0087789 A1 5/2003 Scheffler
2003/0144536 A1 7/2003 Sonnier et al.
2007/0122235 A1 5/2007 Kasahara et al.
2007/0151480 A1 7/2007 Bloom et al.
2010/0170417 A1 7/2010 Naidoo et al.
2010/0190892 A1 7/2010 Binkley
2010/0227954 A1 9/2010 Naidoo et al.
2010/0305342 A1 12/2010 Wong et al.
2010/0319577 A1 12/2010 Naidoo et al.
2011/0020519 A1 1/2011 Bowman et al.
2012/0060722 A1 3/2012 Montpeyroux et al.
2014/0234027 A1 8/2014 Morris
2014/0338565 A1 11/2014 Severance et al.
2015/0087753 A1 3/2015 Koleas et al.
2015/0329702 A1 11/2015 Hwang et al.
2016/0122507 A1 5/2016 Cox
2016/0160453 A1 6/2016 Donelson
2016/0304718 A1 10/2016 Bindschedler et al.
2016/0362338 A1 * 12/2016 Reinke ..................... C08K 5/05
2017/0370899 A1 12/2017 Porot et al.
2018/0171146 A1 6/2018 Allen et al.
2018/0209102 A1 7/2018 Baumgardner et al.
2018/0215919 A1 8/2018 Reinke et al.
2019/0152850 A1 5/2019 Warner et al.
2019/0153229 A1 5/2019 Reinke et al.
2019/0265221 A1 8/2019 Reinke et al.
2020/0207944 A1 7/2020 Reinke et al.
2020/0277497 A1 9/2020 Reinke et al.
2021/0017386 A1 1/2021 Reinke et al.
2021/0380477 A1 12/2021 Reinke et al.
2022/0195193 A1 6/2022 Reinke et al.
2023/0128467 A1 4/2023 Reinke et al.
2023/0257303 A1 8/2023 Reinke et al.
2023/0323126 A1 10/2023 Reinke et al.
2024/0141170 A1 5/2024 Reinke et al.
2025/0067004 A1 2/2025 Reinke et al.
2025/0075078 A1 3/2025 Reinke et al.

FOREIGN PATENT DOCUMENTS

CL 2014002871 A1 7/2015
CN 103387749 A 11/2013
CN 104245850 A 12/2014
CN 104364318 A 2/2015
CN 104629392 A 5/2015
CN 110799597 A 2/2020
EP 1 728 831 A1 12/2006
EP 2 966 128 A1 1/2016
GB 233430 A 5/1925
GB 575484 A 2/1946
JP 53-37724 A 4/1978
JP 56-20052 A 2/1981
JP H10-81827 A 3/1998
JP H11-60960 A 3/1999
JP 2005-154465 A 6/2005
JP 2012-093108 A 5/2012
JP 2016-509611 A 3/2016
WO 01/072315 A1 10/2001
WO 2004/016336 A1 2/2004
WO 2010/110651 A1 9/2010
WO 2010/128105 A1 11/2010
WO 2013/090283 A1 6/2013
WO 2013/163463 A1 10/2013
WO 2013/163467 A1 10/2013
WO 2014/047462 A1 3/2014
WO 2015/070180 A1 5/2015
WO 2016/065270 A1 4/2016
WO 2016/073442 A1 5/2016
WO 2017/011747 A1 1/2017
WO 2017/027096 A2 2/2017
WO 2017/213692 A1 12/2017
WO WO-2017213693 A1 * 12/2017 ............ A61K 31/56
WO WO-2018031540 A1 * 2/2018 ............ C04B 18/02
WO 2018/144731 A1 8/2018
WO 2019/023172 A1 1/2019

(56) References Cited

FOREIGN PATENT DOCUMENTS

| | | | |
|---|---|---|---|
| WO | 2019/079101 | A1 | 4/2019 |
| WO | 2021/011703 | A1 | 1/2021 |
| WO | 2022/232119 | A1 | 11/2022 |

OTHER PUBLICATIONS

Wang et al., "Study of extraction of phytosterol from masson pine raw tall oil," Journal of Wood Science, vol. 48, No. 6, Dec. 2002, pp. 505-511 (XP002580474).
Zaumanis et al., "Evaluation of Rejuvenator's Effectiveness with Conventional Mix Testing for 100% Reclaimed Asphalt Pavement Mixtures," Transportation Research Board of the National Academies, vol. 2370, No. 1, Jan. 2013, pp. 17-25. (XP055526878).
Zaumanis et al., "Influence of six rejuvenators on the performance properties of Reclaimed Asphalt Pavement (RAP) binder and 100% recycled asphalt mixtures," Construction and Building Materials, vol. 71, Sep. 2014, pp. 538-550. (XP029080483).
Faller, R., "Chapter 1.6: Sterols and Sterol Induced Phases," from UCD Biophysics 241: Membrane Biology, Mar. 2021, 4 pp.
International Search Report and Written Opinion of International Application No. PCT/US2022/026310, mailed Jul. 11, 2022, 11 pp.
Allen, Robert, "Structural Characterization of Micromechanical Properties in Asphalt Using Atomic Force Microscopy," Thesis, Office of Graduate Studies at Texas A&M University for a Master of Science Degree, Dec. 2010, pp. 104.
Rowe, (2016), "[Delta]Tc-Some Thoughts on the Historical Development," Binder ETG Meeting, pp. 1-43.
Rubab, et al. (2011) "Effects of Engine Oil Residues on Asphalt Cement Quality", Canadian Technical Asphalt Association Conference, 12 pages.
Sui, et al. (2010) "New Technique for Measuring Low-Temperature Properties of Asphalt Binders with Small Amounts of Material", Transportation Research Record, vol. 2179, Transportation Research Board, Washington, DC, pp. 23-28.
Sui, et al. (2011) "New Low-Temperature Performance-Grading Method: Using 4-mm Parallel Plates on a Dynamic Sher Rheometer," Transportation Research Record, 2207:43-48.
Takano, et al., (1999), "Chemical and Biochemical Analysis Using Scanning Force Microscopy", Chemical Reviews, 99 (10):2845-2890.
Verleyan et al. (2002), "Influence of the Vegetable Oil Refining Process on Free and Esterified Sterols", Journal of the American Oil Chemists' Society, 8 pages.
Verleyan et al. (2002), "Analysis of Free and Esterified Sterols in Vergetable Oils", Journal of the American Oil Chemists' Society, 7 pages.
Wakefield, Amma (Aug. 15, 2018) "ΔTc: A Parameter to Monitor Asphalt Binder's Kryptonite" Asphalt, 33(2):24-27.
Yan, et al., (2011), "Recovery of Phytosterols from Waste Residue of Soybean Oil Deodorizer Distillate", Soybean-Applications and Technology, 13 pages.
Zaumanis, et al. (2014) "Evaluation of Different Recycling Agents for Restoring Aged Asphalt Binder and Performance of 100% Recycled Asphalt", Materials and Structures, 48(8):2475-2488.
"B-Sitosterol from Soybeans" downloaded from http://www.mpbio.com/product.php?pid=02102886, May 21, 2015, 2 pages.
"Material Safety Data Sheet (Aug. 8, 2013)", Sylfat.TM. DP8, Arizona Chemical Company LLC, 7 pages.
"Product Data Sheet from MP Biomedicals Website", Catalog No. 102886, beta-Sitosterol, 2015, 1 page.
"Refining and Properties of Asphalt Binders", Asphalt Handbook, 7th Edition, 2007, 2 pages.
"Sylvaroad.TM. RP 1000 Performance Additive", Safety Data Sheet, Arizona Chemical Company LLC, Apr. 1, 2015, 7 pages.
"Tall Oil Fatty Acid", Ataman Kimya, retrieved on Aug. 10, 2021, 8 pages.
"Tallex Pitch", Ingevity Holdings SPRL, Safety Data Sheet, Jul. 21, 2017, 12 pages.
"Wood Chemistry PSE 406/Chem E 470, Lecture 13, Diterpenes and Triterpenes", Wood Chemistry, 2015, 5 pages.
Allen, et al. (2013) "Microstructural Characterization of the Chemo-Mechanical Behavior of Asphalt in Terms of Aging and Fatigue Performance Properties", UMI Dissertation Publishing, Proquest LLC., 162 pages.
Anderson, et al. (1994) "Binder Characterization and Evaluation, vol. 3: Physical Characterization", SHRP-A-369, Strategic Highway Research Program, 4 pages.
Anonymous, (2001), "Standard Test Method for Determining the Flexural Creep Stiffness of Asphalt Mixtures Using the Bending Beam Rheometer (BBR)", ASTM D 6648-01, pp. 1-22, Retrieved from the Internet: http://www.eng. auburn.edu/research/centers/ncat/rap/files/meetings/05-10/aashto-draft-sp-ecs.pdf.
Anonymous, (2016), "The Use of REOB/VTAE in Asphalt (IS-235)", Asphalt Institute, pp. 1-87, Retrieved from the Internet: URL:http://www.asphaltinstitute.org/wp-content/uploads/IS235_REOB_VTAE_Asphaltinstitute.pdf (retrieved on: Mar. 20, 2017).
Arnaud, et al. (2009) "Digging into Asphaltenes", Analytical Chemistry, 87(38), downloaded from http://pubs.acs.Urg/cen/coverstory/87/8738cover.html, 7 pages.
ASTM D6521-13 (2013) "Standard Practice for Accelerated Aging of Asphalt Binder Using a Pressurized Aging Vessel (PAV)", ASTM International, 6 pages.
B-Sitosterol Powder, Supplier: MP Biomedicals, Printed from VWR Website, Date: Jun. 9, 2016,1 page.
Cantrill, Richard (2008) "Phytosterols, Phytostanols and Their Esters, Chemical and Technical Assessment", 69th JECFA, 13 pages.
Cao, et al. (2011) "Chemical Structures of Swine-Manure Chars Produced under Different Carbonization Conditions Investigated by Advanced Solid-State 13C Nuclear Magnetic Resonance (NMR) Spectroscopy ", Energy Fuels, 25:388-397.
Cox, Russell Brian "Asphalt Binders Containing a Glyceride and Fatty Acid Mixture and Methods for Making and Using Same", U.S. Appl. No. 62/074,526, filed Nov. 3, 2014, 64 pages.
Endo, Yasushi (1990) "Minor Components in Edible Fats and Oils" Oil Chemistry, 39(9):611-617 (English Abstract on p. 611).
Farrar, et al. (2012) "Thin Film Oxidative Aging and low Temperature Performance Grading using Small Plate Dynamic Shear Rheometry: An Alternative to Standard RTFO, PAV, and BBR", 5th Eurasphalt & Eurobitume Congress, 10 pages.
Fini et al. (2012) "Application of Swine Manure in Development of Bio-Adhesive", Allen D. Leman Swine Conference, p. 244.
Fini, et al. (2010) "Characterization and Application of Manure-Based Bio-Binder in Asphalt Industry", Transportation Research Board 89th Annual Meeting, 14 pages.
Fini, et al. (2011) "Chemical Characterization of Biobinder from Swine Manure: Sustainable Modifier for Asphalt Binder", Journal of Materials in Civil Engineering, 23(11):1506-1513.
Fini, et al.(2011) "Application of Bio-Binder from Swine Manure in Asphalt Binder", Annual Meeting, 15 pages.
Hanz, et al. (2017) "Extended Aging of RAS Mixes with Rejuvenator," Binder expert Task Group Meeting, Aug. 10, 2016, 40 pages, retrieved from the internet: URL:https://www.asphaltpavement.org/PDFs/Engineering_ETGs/Binder_201609/06 Hanz Extened Aging of RAS Mixes with Rejuvenator.pdf., retrieved on Nov. 23, 2017.
Harhar, et al., "Chemical Characterization and Oxidative Stability of Castor Oil Grown in Morocco", Moroccan Journal of Chemistry, 4(2):279-284.
Hill, (2015) "The When, How and Benefits of Using Thinlays for Pavement Preservation", Equipment World, 9 pages.
Holmbom, et al., (1978), "Compostion of Tall Oil Pitch", Journal of the American Oil Chemist's Society, 55:342-344.
International Search Report and Written Opinion for International Application No. PCT/US2016/037077, dated Apr. 5, 2017, 20 pages.
International Search Report and Written Opinion for International Application No. PCT/US2016/064950, dated Apr. 19, 2017, 12 pages.
International Search Report and Written Opinion for International Application No. PCT/US2016/064961, dated Apr. 5, 2017, 23 pages.

(56) References Cited

OTHER PUBLICATIONS

International Search Report and Written Opinion for International Application No. PCT/US2017/045887, dated Dec. 8, 2017, 13 pages.
International Search Report and Written Opinion for International Application No. PCT/US2018/043387, dated Nov. 28, 2018, 17 pages.
International Search Report and Written Opinion for International Application No. PCT/US2018/055443, mailed on Jan. 31, 2019, 14 pages.
International Search Report and Written Opinion for International Application No. PCT/US2020/042202, dated Oct. 15, 2020, 24 pages.
Jarde, et al. (2007) "Using Sterols to Detect Pig Slurry Contribution to Soil Organic Matter", Water Air Soil Pollut, 178:169-178.
Kriz, et al. (2007) "Glass Transition and Phase Stability in Asphalt Binders", Road Materials and Pavements Design, 30 pages.
Logan, R.L., (Nov. 1979) "Tall Oil Fatty Acids", Journal of American Oil Chemists Society, 56:777A-779A.
Loughrin, et al. (2006) "Free Fatty Acids and Sterols in Swine Manure", Journal of Environmental Science and Health, Part B, 41:31-42.
Martin, et al. (2015) "The Effects of Recycling Agents on Asphalt Mixtures with High RAS and RAP Binder Ratios, Project N 9-58", National Cooperative Highway Research Program Transportation Research Board of The National Academics, pp. 1-184.
Material Safety Data Sheet, Catalog No. 102886, Revision date: Apr. 26, 2006, Product Name: beta-Sitosterol Practical Grade, 5 pages.
McSweeney, et al. (Jan. 1, 1987) "Composition of Crude Tall Oil & Fractionation Products (Chapter 2)" in "Tall Dil and Its Uses—II", Pulp Chemicals Association, 6 pages.
Mogawer, et al. (2012) "Performance Characteristics of High Rap Bio-Modified Asphalt Mixtures", Transportation Research Board 91st Annual Meeting, 16 pages.
Muhlen, et al., Introduction to Atomic Force Microscopy and its Application to the Study of Lipid Nanoparticles , Chapter 7 in Particle and Surface Characterization Methods, ISBN 3887630572, pp. 98-127.
Overney, et al. (1992) "Friction Measurement on Phase-Separated Thin Films with a Modified Atomic Force Microscope", Nature, 359:133-135.
Reinke, et al. (2015) "Further Investigations Into the Impact of REOB & Paraffinic Oils on the Performance of Bitiminous Mixtures", Binder ETG Meeting, Fall River, MA, pp. 1-92.
Reinke, et al. (2017) "Extended Aging of RAS Mixes with Rejuvenator (An Update)", Binder Expert Task Group Meeting, May 4, 2017, retrieved from the internet: URL: https://www.asphaltpavement.org/PDFs/Engineering_ETGs/Binder_201705/1-2_Reinke&Hanz_UpdateExtendedAgingofRAS.pdf, retrieved on Nov. 23, 2017, 34 pages.
Reinke, et al. (2017) "Investigation of Sterol Chemistry to Retard the Aging of Asphalt Binders", Transportation Research Record, 2633:127-135.
Rossi, et al. (2017) "Adhesion Promoters in Bituminous Road Materials: A Review", Applied Sciences, 7(524):1-10.
Rowe, (2015), "Asphalt Modification", The 56th Illinois Bituminous Paving Conference, Champaign, Illinois, USA, pp. 1-42.
International Search Report and Written Opinion of International Application No. PCT/US2018/016451, mailed May 8, 2018, 18 pp.
International Search Report and Written Opinion of International Application No. PCT/US2020/042203, mailed Oct. 15, 2020, 27 pp.
King et al., "Temperature Dependent Imaging of Aged Asphalt Binders using AFM," Petersen Asphalt Research Conference, Jul. 2019, 28 pp.
Reinke et al., "Retardation of Binder Aging Using Sterol Chemistry—Focused on Re-Aging Properties of Treated Binder Based on Theological & Compositional Properties for Six Treatments & Four Aging Levels," Petersen Asphalt Research Conference, Jul. 2019, 41 pp.
Alvarez-Henao et al., "Supercritical fluid extraction of phytosterols from sugarcane bagasse: Evaluation of extraction parameters," The Journal of Supercritical Fluids, vol. 179, Oct. 2021, 105427. (8 pp).
Appleton et al., "The Sterol Content of Fungi II. Screening of Representative Yeasts and Molds for Sterol Content," Applied Microbiology Applied Microbiology, vol. 3, No. 4, Mar. 1955, pp. 249-251.
"Sterols" retrieved from http://www.cyberlipid.org/sterols/ster0003.htm, Nov. 2016, 22 pp.
Weete et al., "Phylogenetic Distribution of Fungal Sterols," PLoS ONE, vol. 5, No. 5, May 2010, e10899, pp. 6.
Anderson et al., "Evaluation of the Relationship Between Asphalt Binder Properties and Non-Load Related Cracking," Journal of the Association of Asphalt Paving Technologies, vol. 80, 2011, pp. 615-664. (Abstract Only).
Carden et al., "Dietary Plant Sterol Esters Must be Hydrolyzed to Reduce Intestinal Cholesterol Absorption in Hamsters," The Journal of Nutrition Biochemical, Molecular, and Genetic Mechanisms, vol. 145, No. 7, May 2015, pp. 1402-1407.
Carr et al., "Stearate-Enriched Plant Sterol Esters Lower Serum LDL Cholesterol Concentration in Normo- and Hypercholesterolemic Adults," The Journal of Nutrition Biochemical, Molecular and Genetic Mechanisms, vol. 139, No. 8, Jun. 2009, pp. 1445-1450.
"Distilled Tall Oil, Crops—Identification of Petitioned Substance," CAS No. 8002-26-4, Technical Evaluation Report compiled by Savan Group for the USDS National Organic Program, Aug. 12, 2021, 18 pp.
Fernandes et al., "Phytosterols: Applications and recovery methods," Bioresource Technology, vol. 98, No. 12, Nov. 2006, pp. 2335-2350.
Itoh et al., "Sterol Composition of 19 Vegetable Oils," Journal of the American Oil Chemists Society, vol. 50, No. 4, Apr. 1973, pp. 122-125.
Jianying et al., "Aging and Anti-Aging of Asphalt Materials," Wuhan University of Technology Press, Dec. 2012, w-Eng. Trans. pp. 14.
Mercado et al., "Asphalt emulsions formulation: State-of-the-art and dependency of formulation on emulsions properties," Construction and Building Materials, vol. 123, Oct. 2016, pp. 162-173. (Abstract Only).
Ex parte Gerald H. Reinke, Gaylon L. Baumgardner, and Andrew Hanz, Appeal No. 2025-001519, Decision on Appeal in U.S. Appl. No. 15/179,858, Patent Trial and Appeal Board, Dec. 4, 2025. 13 pages.

* cited by examiner

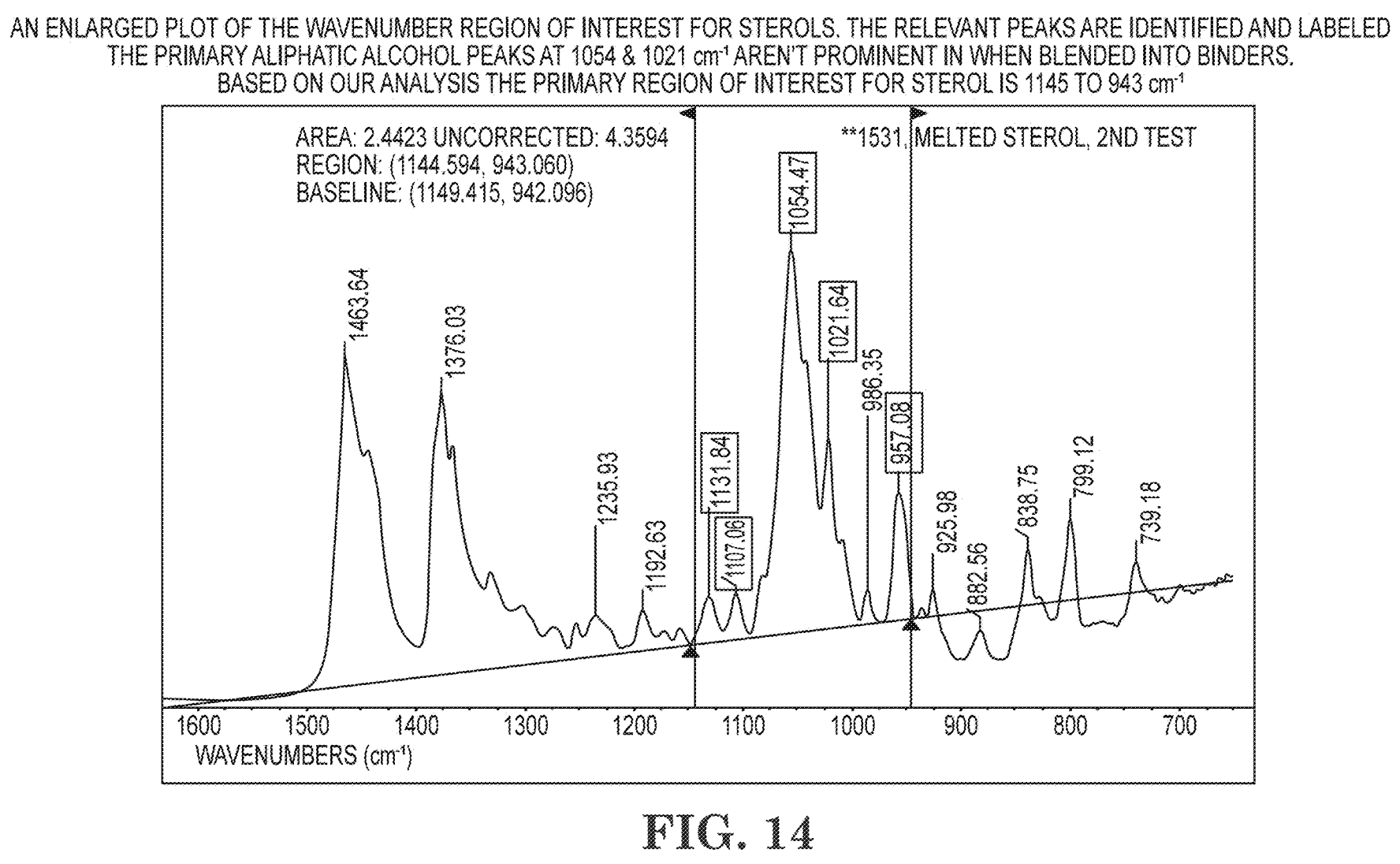

AN ENLARGED PLOT OF THE WAVENUMBER REGION OF INTEREST FOR STEROLS. THE RELEVANT PEAKS ARE IDENTIFIED AND LABELED
THE PRIMARY ALIPHATIC ALCOHOL PEAKS AT 1054 & 1021 $cm^{-1}$ AREN'T PROMINENT IN WHEN BLENDED INTO BINDERS.
BASED ON OUR ANALYSIS THE PRIMARY REGION OF INTEREST FOR STEROL IS 1145 TO 943 $cm^{-1}$

FIG. 14

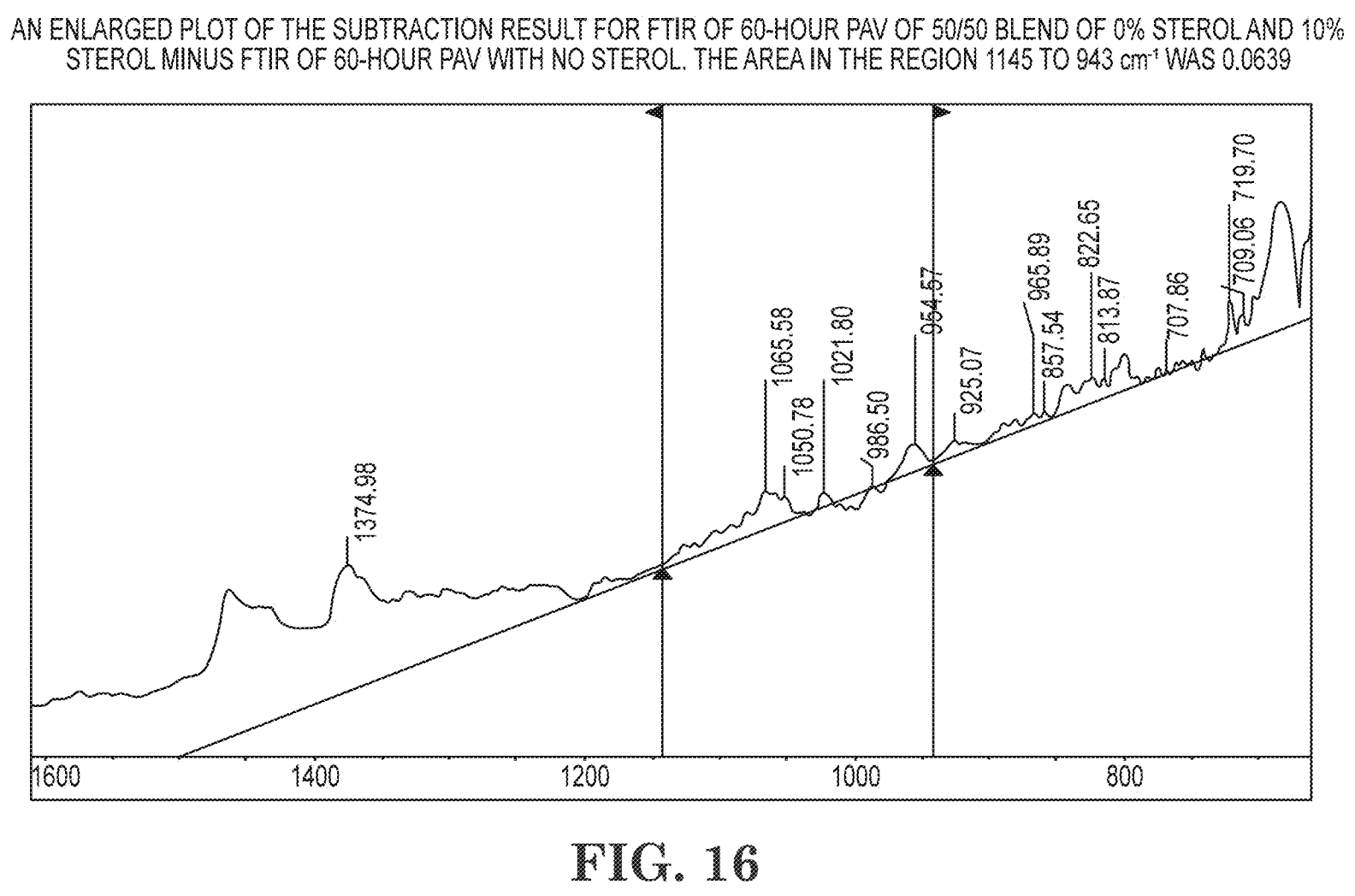

AN ENLARGED PLOT OF THE SUBTRACTION RESULT FOR FTIR OF 60-HOUR PAV OF 50/50 BLEND OF 0% STEROL AND 10% STEROL MINUS FTIR OF 60-HOUR PAV WITH NO STEROL. THE AREA IN THE REGION 1145 TO 943 $cm^{-1}$ WAS 0.0639

FIG. 16

STEROL IN ASPHALT ROOFING MATERIALS

This application claims priority to International Application No. PCT/US2020/042203, filed Jul. 15, 2020, which claims the benefit of U.S. Provisional Patent Application Ser. Nos. 62/874,229, filed Jul. 15, 2019; 62/887,811, filed Aug. 16, 2019; and 63/027,845, filed May 20, 2020; the disclosures of which are each incorporated in its entirety herein by reference.

BACKGROUND

Asphalt has been used in roofing materials such as roofing shingles, roll roofing and built-up roofing. Typically, the roofing material includes a substrate such as a glass fiber mat, an asphalt-based coating which saturates the substrate and coats the top and bottom, and a layer of granules embedded in the top coating. The asphalt coating typically contains a filler such as ground limestone. Roofing shingles can also have back dust material such as silica sand on the bottom coating to prevent the shingles from sticking together when in a bundle.

The composition used to make a roofing material determines, to a great extent, the performance of the resultant roofing material (e.g., aging, cracking, blistering, algae resistance, pliability, and sticking).

There continues to be a need for roofing materials with better aging characteristics.

SUMMARY

Disclosed are compositions and methods that may be employed in asphalt based coatings for roofing materials to retard, reduce, or otherwise improve the aging rate of the asphalt binders in such coatings and roofing materials. Also disclosed are roofing materials containing such compositions.

In one aspect is a method for retarding the rate of aging of asphalt-based roofing materials or beneficially improving the rheological properties of aged asphalt-based roofing materials comprising adding sterol to an oxidized asphalt binder composition, wherein the oxidized asphalt binder composition comprises a virgin oxidized or air blown asphalt binder, aged oxidized or air blown asphalt binder, or both.

In another aspect is a method for reusing aged asphalt binder from roofing materials, comprising treating the aged asphalt binder to provide an oxidized asphalt binder, and adding a sterol to the oxidized asphalt binder composition, wherein the asphalt binder composition comprises asphalt binder extracted from roofing materials.

In another aspect is a method of making roofing materials comprising treating an asphalt binder to provide an oxidized asphalt binder; adding sterol to the oxidized asphalt binder composition to form coating asphalt composition, wherein the coating asphalt composition comprises a virgin oxidized or air blown asphalt binder, aged oxidized or air blown asphalt binder, or both; and coating a roofing material with the coating asphalt composition.

In still other aspects is a roofing material comprising a coated roofing substrate, wherein the coated roofing substrate comprises a coating asphalt comprising sterol and an asphalt binder, wherein the asphalt binder comprises a virgin oxidized or air blown asphalt binder, aged oxidized or air blown asphalt binder, or both.

The sterol is useful to retard or slow the aging rate, or to restore or renew aged oxidized or air blown asphalt or aged oxidized or air blown binder to provide some or all of the original properties of virgin oxidized or air blown asphalt or virgin binder to be used in roofing materials. The sterol may be added to virgin or aged asphalt binder before or after oxidation or air blowing, or may be provided by reclaiming sterol from aged asphalt binder that contained sterol prior to aging.

BRIEF DESCRIPTION OF DRAWINGS

FIG. 14 is an enlarged plot of a wavenumber region of interest for sterols

FIG. 16 is an enlarged plot of the subtraction spectrum result for FTIR of 60-hour PAV of 50/50 blend of 0% sterol and 10% sterol minus F Ilk of 60-hour PAV with no sterol.

DETAILED DESCRIPTION

Figure 1:
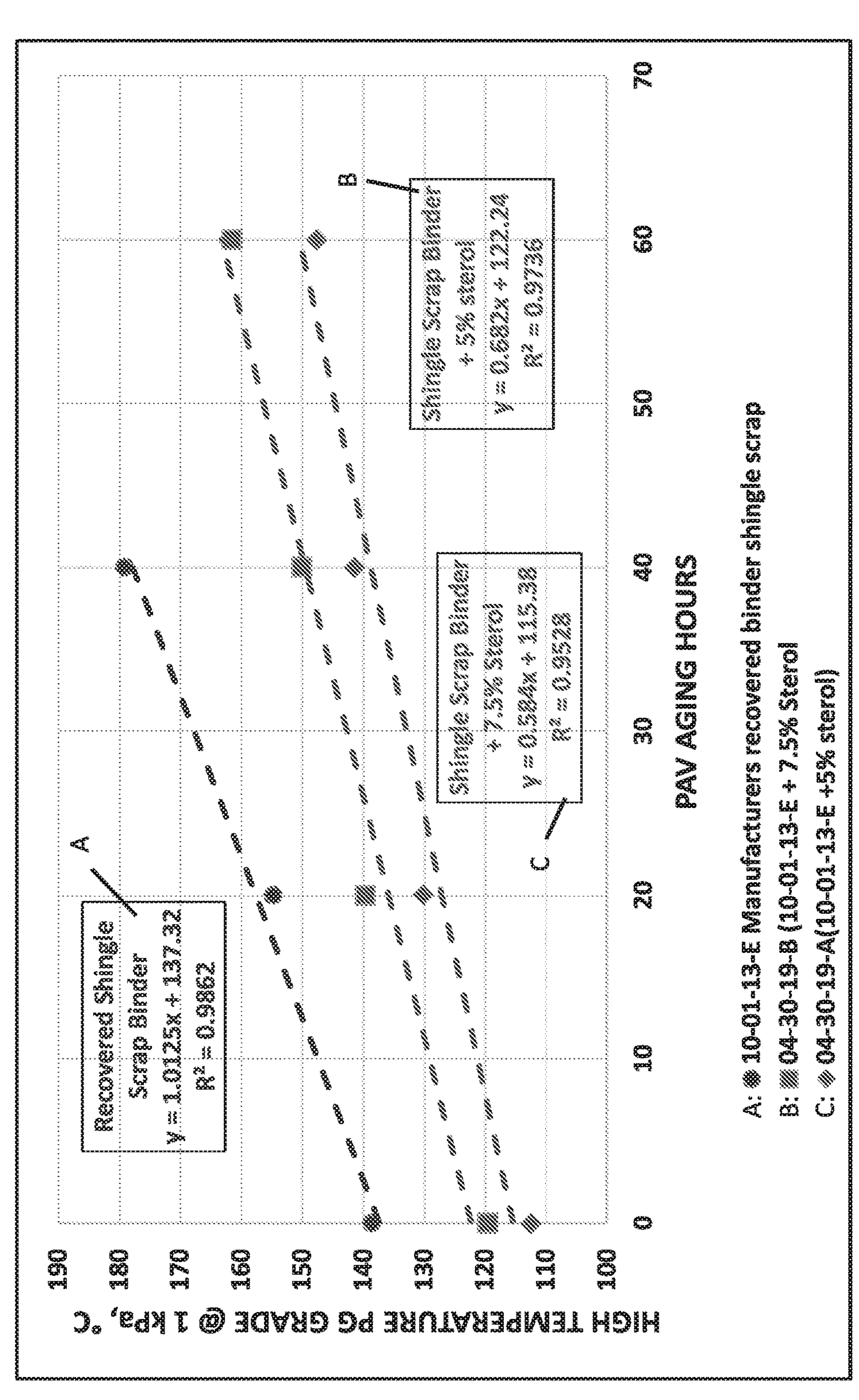
FIG. 1 graphically represents the temperature at which several recovered shingle scrap binders reach a stiffness of 1 kPa.

"Aged" refers to brittle, high stiffness, high softening point and poor aging-quality, asphalt binder relative to the virgin oxidized binder.

"Binder" refers to a highly viscous liquid or semi-solid form of petroleum. "Binder" can include, for example bitumen. The term "asphalt binder" is used interchangeably with the term "binder."

"Bitumen" refers to a class of black or dark-colored (solid, semisolid, or viscous) cementitious substances, natural or manufactured, composed principally of high molecular weight hydrocarbons, of which asphalts, tars, pitches, and asphaltenes are typical.

"Crude" when used with respect to a material containing a sterol means sterol that has not been fully refined and can contain components in addition to sterol.

"m-critical" or "Creep critical" grade refers to the low temperature relaxation grade of a paving binder. The creep critical temperature is the temperature at which the slope of the flexural creep stiffness versus creep time according to an ASTM D6648 or AASHTO T31 or Bending Beam Rheometer (BBR) test with an absolute value of 0.300. The creep critical temperatures can also be determined from a 4 mm Dynamic Shear Rheometer (DSR) test at a value of −0.275.

Fresh sterol" refers to sterol not yet used in or recycled from asphalt pavement or asphalt shingles.

"Neat" or "Virgin" binders are binders not previously used in or recycled from asphalt pavement or asphalt shingles, and can include Performance Grade binders.

"PAV" refers to a Pressurized Aging Vessel test. The PAV test simulates accelerated aging of asphalt binder using a pressurized aging vessel as described in ASTM D6521-13, Standard Practice for Accelerated Aging of Asphalt Binder Using a Pressurized Aging Vessel (PAV).

"Pure" when used with respect to a sterol or mixture of sterols means having at least a technical grade of purity or at least a reagent grade of purity.

"Recycled asphalt shingles" and "RAS" refer to asphalt binder reclaimed or extracted from used roofing materials and includes Manufacturers waste or production scrap.

"Reclaimed sterol" refers to sterol contained in aged asphalt binder or binder that was previously present in an existing, used asphalt pavement or an existing used or unused asphalt shingle.

"Roofing asphalt binder" or "coating asphalt binder" refers to asphalt binder that is suitable to make roofing materials as defined by ASTM D 3462: a softening point minimum of 88° C. (190° F.) to 113° C. (235° F.) and a minimum penetration of 15 dmm at 25° C. (77° F.).

"Roofing fillers" or "fillers" refer to material such as minerals that are used in the manufacture of asphalt roofing materials. The filler materials are characterized by having a particle size of 100-400 mesh and range from 1 to 80 per by weight of the total roofing asphalt composition.

"Roofing granules" or "granules" refer to materials such as minerals that are applied atop a roofing shingle. The granules have a particle size of 8-40 mesh.

"Roofing materials" of "asphalt roofing materials" refers to materials containing asphalt binder and include roofing shingles, roll roofing, built-up roofing, post-consumer waste (e.g. tear-off shingles) or manufacture's waste shingles, shingle manufacturing scrap, roofing felt, and the like.

"S-Critical" or "stiffness critical" grade refers to the low temperature stiffness grade of a binder. The stiffness critical temperature is the temperature at which a binder tested according to ASTM D6648 has a flexural creep stiffness value of 300 MPa or as determined by either the Bending Beam Rheometer test (ASTM D6648 or AASHTO T313) or 4 mm DSR test as described in ΔTc.

"Sterol" or "Sterol additive" refers to one or more sterols or combination thereof with binder used to retard or slow the rate of aging of asphalt binder (viz., aged or virgin), or to restore or renew aged asphalt or aged binder to provide some or all of the original properties of virgin, oxidized asphalt or virgin, oxidized binder.

"ΔTc" refers to the value obtained when the low temperature creep or m-value critical temperature is subtracted from the low temperature stiffness critical temperature. The ΔTc can be measured by either the above-mentioned Bending Beam Rheometer test (ASTM D6648 or AASHTO T313) or the 4 mm dynamic shear rheometer (DSR) test as described by Sui et al. (2010), Sui et al. (2011) or Farrar et al. (2012) from Western Research Institute noted below.

"Upcycled asphalt binder" refers to an asphalt binder composition that includes already used asphalt binder containing reclaimed stemol. Upcycled is used interchangeably with "re-recycled" in reference to asphalt binder containing sterol.

Numerical ranges expressed using endpoints include all numbers subsumed within that range (e.g. 1 to 5 includes 1, 1.5, 2, 2.75, 3, 3.80, 4 and 5 and so on).

All weights, parts and percentages are based on weight unless otherwise specified.

Disclosed is the use of sterols in roofing materials. Sterols are shown to slow the rate of aging of oxidized roofing binders. Applicants have previously shown that sterols can retard, reduce, or otherwise overcome some of the effects of asphalt aging so as to preserve or retain some or all of the original properties of virgin asphalt binder. See International Application Nos. PCT/US16/037077, PCT/US16/64950 and PCT/US16/064961, PCT/US17/045887 each of which is incorporated herein by reference in its entirety. The sterol was used with the binders containing reclaimed or recycled materials such as recycled asphalt pavement (RAP), recycled asphalt shingles (RAS) or combination of both with pavement aggregate.

RAS is an attractive component for recycling and reusing because of its high asphalt binder content. RAS may for example have asphalt binder content in the 15 to 35 percent range, compared to RAP, which may have an asphalt content of about 5 percent. Asphalt binder from newly manufactured shingles may for example have an asphalt binder content of about 20 percent.

Roofing materials can be constructed using a mat such as a glass fiber mat and an asphalt binder-based coating, and a layer of granules embedded in the asphalt base top coating. The mat is impregnated with a hot saturant asphalt binder, which is subsequently coated on both sides with more asphalt binder and finally surfaced with granules. The saturant and coating asphalt binder need not be the same. The coating applied to a top portion covers the top of the mat, a mat portion saturates the mat, and a bottom portion covers the bottom of the mat. As used herein, "top" means the side facing upward or away from the roof when the roofing material is installed on a roof, and "bottom" means the side facing downward or toward the roof.

The mat can be any type known for use in reinforcing asphalt binder-based roofing materials, such as a web, scrim or felt of fibrous materials such as a nonwoven mat of glass fibers, mineral fibers, cellulose fibers, rag fibers, synthetic fibers such as polymer fibers, or mixtures thereof. In some embodiments, the mat is organic felt produced from cellulose fibers, or glass felt produced from glass fibers. In some embodiments the roofing shingles produced are of the organic felt type.

In addition to the asphalt binder, the roofing asphalt may contains other materials, such as fillers, polymers, waxes, stabilizers, pigments, antioxidants, and/or solvents. Roofing shingles usually have a back dust material such as silica sand on the bottom coating to prevent them from sticking together in a bundle.

In some embodiments, the filler is about 1-80 wt %, 45 to 60 wt %, 50 to 75 wt % or 60 to 80 wt % based on weight of the coating. In some embodiments, the filler is particles of sedimentary rocks or minerals such as limestone or calcium carbonate, dolomite, silica, talc, shale, clay, mica or combinations thereof. Other suitable fillers include fly ash, carbon black, and inorganic fibers or combinations thereof. In other embodiments, the filler is sedimentary rock particles. The fillers used for the top, bottom or mat coating need not be the same. In some embodiments, fillers serve to impart desired mechanical properties to the shingles, to reduce raw material costs, or both.

Coated or embedded to the top surface of the coating asphalt binder of a roofing shingle are roofing granules. Roofing granules provide various roofing types the desired weather-resistance, fire-resistance, visual decorative exterior surface or any combination thereof. In some embodiments, the granules are crushed and screened mineral materials, which are subsequently coated with a coating asphalt binder. In some embodiments, the granules are hard mineral base rock such as slate, basalt or nephelite. In some embodiments, the granules are the same type of granule, or can be a mixture of different types, textures, shapes, and/or colors of granules.

Asphalt binder compositions suitable for manufacturing roofing materials such as coating roofing shingles are generally produced by selecting a suitable asphalt binder, sometimes referred to asphalt flux,s and processing the asphalt binder to obtain properties useful for roofing materials. For example, roofing asphalt binder typically retains some degree of hardness and do not flow under conditions of high temperature. Such an increased hardness is generally accompanied by a reduced penetration level, an increased viscosity, and an increased softening point.

In some embodiments, roofing asphalt binder is processed by air blowing, which is an oxidation process that involves blowing air through molten asphalt binder to modify the physical properties of the asphalt binder. In such process, air is blown through an asphalt binder for a period of time at an elevated temperature. The air blowing process generally raises the softening point of the asphalt binder, which increases the roofing materials (e.g. roofing shingles') ability to resist flowing at high temperatures on a roof, lowers the shingle penetration without becoming too brittle, raises the melt viscosity such that when filler is added, the filled coating viscosity is in a range that allows the roofing shingle to be efficiently processed, and creates a shingle that can withstand being exposed to sun, high temperatures, and inclement weather conditions.

Specifications for roofing materials are set out in ASTM D255 ("*Asphalt binder Shingles* (*Organic Felt*) *Surfaced into Mineral Granules*." American Society for Testing and Materials, *Annual Book of ASTM Standards*, Volume 04.04, West Conshohocken, PA, 1996); and ASTM D3462 ("*Asphalt binder Shingles Made From Glass Felt and Surfaced with Mineral Granules*." American Society for Testing and Materials, *Annual Book of ASTM Standards*, Volume 04.04, West Conshohocken, PA, 1996).

The properties of the roofing asphalt binder compositions may be measured by any suitable test known and accepted in the art. For example, the asphalt binder properties are measured as follows: softening point or "SP" by ASTM D36; penetration or "pen" by ASTM D5 run at 25° C.; melt viscosity by ASTM D4402 run at 204° C. (400° F.) with a Model LV Brookfield Viscometer, using a no. 18 spindle, 6 RPM or a Model RV Brookfield Viscometer, using a no. 21 spindle, 50 RPM; durability by ASTM D4798; flashpoint by ASTM D92; and stability by ASTM D3791 modified to run at oven temperature of 260° C. (500° F.) for up to 5 days or similar test procedure.

In some embodiments, the process of preparing a coating asphalt binder composition involves heating an asphalt binder to a temperature of about 49° C. (120° F.) to about 288° C. (550° F.) until the asphalt binder liquefies into a molten asphalt binder material. The molten asphalt binder may then be oxidized to adjust the properties of the molten asphalt binder, particularly to increase the softening point. Various methods of oxidizing the molten asphalt binder may be used, such as, for example, the "air blowing" process. The air blowing process involves the oxidation of an asphalt binder composition by bubbling or blowing oxygen containing gas, such as air, for example, through molten asphalt binder at an elevated temperature for a particular time period, such as from about 1 hour to about 72 hours. The amount of time depends on various factors, such as the type of asphalt binder feedstock used, the processing temperature, the air flow rate, the design of the process equipment, and the desired characteristics of the coating asphalt binder to be produced.

In some embodiments, the oxygen enriched gas contains about 25 weight percent to about 35 weight percent oxygen and about 65 to about 75 weight percent nitrogen. Chlorine enriched air or pure oxygen may also be utilized in the air blowing step. Catalysts, such as, for example, ferric chloride, or any form of phosphoric acid, aluminum chloride, zinc chloride, and organic sulfonic acids, may be used in the oxidation process to achieve desired properties and may increase the reaction rate.

In some embodiments for coating asphalt binder manufacturing processes, molten asphalt binder feedstock is loaded into a converter (oxidizer) at an increased temperature and air is bubbled or blown through the molten asphalt binder and air-blown until the asphalt binder reaches a target penetration value, for example a penetration of 15 dmm but less than 20 dmm. The softening point, penetration, and viscosity of the output asphalt binder material are interdependent on the input asphalt binder material selected and one property can be singly adjusted without the other two properties adjusting to a corresponding degree. Depending on the nature of asphalt binder, the air-blowing process alone may be insufficient to produce an asphalt binder with properties that fall within each of the penetration, softening point, and viscosity requirements to be considered "coating" asphalt binder.

To achieved the desired asphalt properties for roofing materials, in some embodiments the molten asphalt binder feedstock is "under-blown", whereby the asphalt binder is air blown to a penetration value that is within or slightly higher than the target penetration range for the coating asphalt binder (about 15-23 dmm), but the softening point is lower than a target softening point range, such as in the range of about 60° C. (140° F.) to about 85° C. (185° F.). "Under-blowing" refers to stopping the oxidation process prior to sufficiently lowering the penetration value.

Processes that under-blow a molten asphalt binder material may incorporate an additive into the molten asphalt binder material to adjust the material's properties to those desired for a particular application. In some embodiments, wax pellets may be introduced into the molten asphalt binder to increase the softening point of the asphalt binder to a target softening point range, while maintaining a desirable penetration value. Other additives, such as polyphosphoric acid may also be used to further soften the product. In some embodiments, sterol is the additive.

In some embodiments, rather than under-blowing the molten asphalt binder material, the molten asphalt binder may be "over-blown" or air blown to a penetration value within or slightly lower than a target softening point range, such as to a penetration value around or slightly below 15 dmm. By over-blowing the molten asphalt binder, the resulting molten asphalt binder material may have a softening point that is higher than the target softening point range for coating asphalt binders, such as between about 98.8 to 116° C. (210-240° F.). Therefore, in some embodiments, the over-blown molten asphalt binder material may have a first penetration value that is within the target penetration range, while having a first softening point that is higher than the target range.

Any suitable binder that can be air blown to achieve the roofing asphalt characteristics can be used. In some embodiments, the asphalt binders are petroleum-based binders. Suitable asphalt-based or asphalt binders include binders complying with ASTM D312, ASTM D3462, ASTM D2626, ASTM D-6373, D-946, AASHTO M320, M332, M226, or M20, ASTM D312, ASTM D3462, or ASTM D2626 and ones that comply with ASTM for Type 1-4 BURA and also specifications for coating asphalt binder.

In some embodiments the binders are aged binders. In some embodiments, the aged binders are obtained by extracting the asphalt binder from roofing materials. In some embodiments, the aged binders are oxidized asphalt binders. In some embodiments the oxidized asphalt binders are air-blown to be used for roofing materials. In some embodiments, the roofing materials include roofing shingles, roll roofing and built-up roofing. In some embodiments, the asphalt is extracted from roofing shingles. There are two types of roofing shingle scraps. They are referred to as tear-off roofing shingles, and roofing shingle tabs, also called prompt roofing shingle scrap. Tear-off roofing shingles are generated during the demolition or replacement of existing roofs. Roofing shingle tabs are generated when new asphalt shingles are trimmed during production to the required physical dimensions. The quality of tear-off roofing shingles can be quite variable.

In some embodiments, the asphalt binders contain other components in addition to the sterol. Such other components can include polymers, non-bituminous binders, adhesion promoters, softening agents, rejuvenating agents and other suitable components.

Useful polymers include, for example, ethylene-vinyl acetate copolymers, polybutadienes, ethylene-propylene copolymers, ethylene-propylene-diene terpolymers, reactive ethylene terpolymers (e.g. ELVALOY™), butadiene-styrene block copolymers, styrene-butadiene-styrene (SBS) block copolymers, isoprene-styrene block copolymers and styrene-isoprene-styrene (SIS) block copolymers, chloroprene polymers (e.g., Neoprenea) and the like. Cured elastomer additives may include ground tire rubber materials. For example, see the 2015 Standard Specifications for the State of California (Section 37, pg. 423), and Section 39 for Hot Mix Asphalt, starting on pg. 447 and available at http://www.dotca.gov/distUdllab/SECTION%2039%20%20HMA.pdf and http://caltrans-opac.ca.gov/publicat.htm.

In some embodiments, the asphalt binder is extracted from recycled asphalt roofing materials such as roofing shingles that can then be used to produce new roofing materials. In some embodiments, the sterol is added to aged asphalt binder that is recycled or extracted from roofing materials such as shingles. In other embodiments, the sterol can be added to virgin, oxidized binder or newly manufactured roofing materials. Addition of sterol to either aged asphalt binder or virgin, oxidized asphalt binder or combination thereof, which is used to manufacture roofing materials, prolongs the useful life of the roofing materials.

Added to the roofing asphalt is a class of plant-derived chemistry, the sterol class of compounds. While plant sterols do not contain the same number of condensed or partially unsaturated rings as asphaltenes, they do have the benefit of not being a linear or branched linear molecule. For example, a sterol can alter or improve physical and rheological characteristics such as high temperature stiffness, effective temperature range, and low temperature stiffness and relaxation properties of an asphalt binder.

In some embodiments, the sterol additive belongs to the class of triterpenoids, and in particular to sterols or stanols. The disclosed sterols (e.g. triterpenoids) can effectively work with asphaltenes. Asphaltenes include extensive condensed ring systems with some level of unsaturation. The asphaltene content of typical binders can range from less than 10% to more than 20% and to more than 30% in air blown binders. Asphaltenes are typically described as materials that are insoluble in n-heptane according to ASTM D4124. An exact structure is unknown and based on the performance behavior of different binders. It is unlikely that the asphaltene structure in any two binders is the same, especially those from different crude sources. Asphaltenes give a binder its color and stiffness and they increase in content as the binder ages. Typically the higher the asphaltene content the stiffer the binder and the binder is less able to relax. Consequently, the addition of RAP and/or RAS causes the asphaltene content to increase. Increasing asphaltene content along with other products of oxidation such as carbonyls and sulfoxides are responsible for the stiffening of bituminous mixtures and their ultimate failure. By their very chemical nature asphaltenes are not readily soluble in aliphatic chemicals. Aromatic solvents will readily dissolve asphaltenes and aromatic process oils have been used in recycled mixtures. However, these oils may contain polynuclear aromatic compounds including listed potential carcinogens and therefore are not desirable additives. Most plant based oils are straight or branched chain hydrocarbons with some level of unsaturation and also contain carboxylic acid functionality and therefore are not as effective at retarding aging rates as they are at softening the overall binders in a mixture.

Triterpenoids are a major group of plant natural products that include sterols, triterpene saponins, and related structures. Triterpenoids can be natural or synthetic. Typically, they are obtained by extraction from plant material. Extraction processes for the isolation of triterpenoids are described e.g. in International Application Publication Numbers WO 2001/72315 A1 and WO 2004/016336 A1, the disclosures of which are each incorporated herein by reference in their entirety.

The triterpenoids include plant sterols and plant stanols. The disclosed triterpenoids include the esterified and non-esterified forms of any of the plant sterols mentioned herein.

Exemplary plant sterols include campesterol, stigasterol, stigmasterol, β-sitosterol, Δ5-avenosterol, Δ7-stigasterol, Δ7-avenosterol, brassicasterol or mixtures thereof. In some embodiments, the sterol additive is a combination of different sterols. In some embodiments, the sterol additive is β-sitosterol as the pure sterol. In some embodiments, the sterol additive is mixture of different, pure sterols. In some embodiments the pure sterol is campesterol, stigasterol, stigmasterol, β-sitosterol, Δ5-avenosterol, Δ7-stigasterol, Δ7-avenosterol, brassicasterol or mixtures thereof.

Commercially available pure sterols and mixtures of pure sterols include those available from MP Biomedicals (Catalog No. 02102886) referred to as beta-Sitosterol (beta-Sitosterol ~40-60%; campesterol ~20-40%; Stigmasterol~5%). In some embodiments, the pure sterol can include pure cholesterol. In some embodiments, a pure sterol can have at least 70 wt. % sterols, and in some embodiments can have at least 80 wt %, at least 85 wt % or at least 95 wt % sterols.

In some embodiments, the sterol additive is a crude sterol. The crude sterol can be obtained from plant sources that include modified or unmodified natural products containing differing quantities of sterols, including such diverse plant sources as corn oil, wheat germ oil, sarsaparilla root, soybean pitch and corn oil pitch. For example, tall oil pitch can be obtained indirectly from the process of preparing paper from wood, particularly pine wood. For example, tall oil is a by-product of wood pulping (for example by the Kraft process). When tall oil is distilled to produce tall oil fatty acids (TOFA) and tall oil rosin (TOR) the residue remaining from the distillation process is tall oil pitch. Tall oil pitch is an extremely complex material that can contain rosins, fatty acids, oxidation products, wax compounds, high molecular weight alcohols, and esterified and non-esterified materials, a fraction of which are sterols. In some embodiments, a source of crude sterol is a plant source. Plant sources of crude sterols are inexpensive as they are the foots or tailings left from distillation or solvent extraction of wood derived or vegetable or seed derived oils.

In some embodiments, the crude sterol is a mixture of different crude sterols. In some embodiments the crude sterol is a mixture that includes stigmasterol, β-sitosterol, campesterol, ergosterol, brassicasterol, cholesterol and lanosterol or mixtures thereof. In some embodiments, the crude sterol sources include soybean oil, corn oil, rice bran oil, peanut oil, sunflower seed oil, safflower oil, cottonseed oil, rapeseed oil, coffee seed oil, wheat germ oil, tall oil, and wool grease. In some embodiments, the crude sterol includes a bio-derived source or partially distilled residue of the bio-derived source. In some embodiments, the crude sterol source includes tall oil pitch, soybean oil or corn oil.

Any of the oil tailings or pitches from the disclosed plant sources is suitable crude sterol sources. U.S. Pat. No. 2,715,638, Aug. 16, 1955, to Albrecht, discloses a process for recovering sterols from tall oil pitch whereby the fatty acid impurities are removed by a neutralization process. Following this, the sterol esters are saponified; the free sterols are then recovered and washed with isopropanol and dried.

In some embodiments, the crude sterols are obtained from plant sources. The crude sterol can include components in addition to the desired sterol or sterols. Exemplary plant sources for crude sterols include tall oil pitch, crude tall oil, sugar cane oil, hot well skimmings, cottonseed pitch, soybean pitch, corn oil pitch, wheat germ oil or rye germ oil. In some embodiments, tall oil pitch is a source of the crude sterol. Tall oil pitch can include about 30 to 40% unsaponifiable molecules. Unsaponifiables are molecules that do not react with alkali hydroxides. Fatty and rosin acids remaining in the tall oil pitch readily react with potassium or sodium hydroxides (saponification) and thus the unsaponifiables can be readily separated. It has been shown that up to 45% of the unsaponifiable fraction can include sitosterols. Therefore, a tall oil pitch sample can contain approximately 13.5% to 18% sterol molecules by weight. In some embodiments the crude sterol can have less than a food grade of purity (e.g., less than 85 wt. % sterols) or contain more than 85 wt. % sterols but also can contain impurities or contaminants that render the material unsuitable for use in foods.

In some embodiments, the crude sterol may be animal derived. In some embodiments, the animal derived sterol is cholesterol.

It should be understood that the disclosed sterol can be used in any combination that includes animal derived, plant derived, pure, crude, or reclaimed sterol. For example, in some embodiments the sterol is pure sterol from plants. In some embodiments, the sterol is pure sterol that is a combination of plant derived and animal derived. In some embodiments, the sterol is crude sterol from a combination of plant derived and animal derived. In some embodiments, the reclaimed sterol is sterol from an aged asphalt binder containing the sterol.

In some embodiments, the sterol added to the asphalt binder is reclaimed or fresh sterol that ranges from about 0.5 to about 15 wt. %, from about 1 to about 10 wt. %, or from about 1 to about 3 wt. % of the asphalt binder. The sterol added to the asphalt binder may for example range from about 0.5 to about 15 wt. %, from about 1 to about 10 wt. %, or from about 1 to about 3 wt. % of the asphalt binder. In some embodiments, the sterol added to the asphalt binder may for example range from about 0.5 to about 15 wt. %, from about 1 to about 10 wt. %, or from about 1 to about 3 wt. % of a virgin, oxidized asphalt binder.

In some embodiments, the sterol is a combination of reclaimed sterol and fresh sterol. Such reclaimed sterol to fresh sterol in some embodiments includes a 5:95 to 95:5 ratio of reclaimed sterol to fresh sterol. The sterol combination, in some embodiments, includes at least a 20:80, 30:70 or 40:60 ratio of reclaimed sterol to fresh sterol, and in some embodiments includes less than an 80:20, 70:30 or 60:40 ratio of reclaimed sterol to fresh sterol.

In some embodiments, the fresh sterol is a pure, crude sterol or combination thereof. In some embodiments, the sterol is a sterol combination in which the pure sterol:crude sterol is added to an asphalt binder in the range from about 0.5 to about 15 wt. %, or about 1 to about 10 wt. %, about 1 to about 3 wt. % of the virgin, oxidized binder in an asphalt composition. The sterol combination, in some embodiments includes a 5:95 to 95:5 ratio of pure sterol to crude sterol. The sterol combination, in some embodiments, includes at least a 20:80, 30:70 or 40:60 ratio of pure sterol to crude sterol, and in some embodiments includes less than an 80:20, 70:30 or 60:40 ratio of pure sterol to crude sterol.

In some embodiments, sterol can alter, reduce, or retard the degradation of rheological properties due to aging of binders containing recycled bituminous materials such as RAS and/or RAP, or oxidized binders.

The sterol may be added to asphalt binder that is either aged or virgin, oxidized and used to produce roofing materials by saturating or coating the roofing materials, or a combination thereof. In some embodiments, the sterol may be added to virgin or aged asphalt binder before oxidation or air blowing, or the sterol is provided by reclaiming sterol from aged asphalt binder that contained sterol prior to aging. In other embodiments, the sterol may be added to virgin or aged asphalt binder after oxidation or air blowing, or the sterol is provided by reclaiming sterol from aged asphalt binder that contained sterol prior to aging.

In some embodiments, at least the top surface of a portion of a roofing material is coated with a composition comprising a coating asphalt binder and sterol.

The application also shows the sterol may be present in the aged bitumen and is not consumed or reacted with the aged bitumen. This provides an additional sterol source such that the reclaimed sterol (present in an aged asphalt) can be used with virgin materials or even aged bitumen in the form of RAP and the age retarding benefits of that reclaimed sterol could be used to help reduce the aging or rate of aging of a new blend. For example, the application shows that a RAP mix that contains 10% sterol and that could undergo field aging for 10 to 12 years could be approximated by 60 hours of PAV aging based on data generated.

Therefore, if 50% binder replacement using the RAP that contained the reclaimed sterol was used with a virgin binder the final blend could contain 5% sterol. This new blend would age at a rate based on 5% freshly added sterol. Additional 5% fresh sterol could be added to the virgin binder to bring the final level back to 10%. In other words, the aged asphalt can be added with additional fresh sterol if needed to bring the amount or level appropriate to provide anti-aging properties.

Therefore, the present application provides an additional sterol source—an aged asphalt binder in which the binders already contain sterol—that may have already been used in asphalt pavement or asphalt shingles. In other words, the sterol that can be used is sterol that was present in an existing asphalt pavement or asphalt shingle. These "reclaimed sterols" have been found to provide anti-aging properties similar to a fresh sterol, namely sterol that was not used in an asphalt pavement or an oxidized asphalt application. The reclaimed sterol is provided in the form of an asphalt binder composition that contains the sterol.

Such compositions and methods save on raw materials achieving economic and environmental protections with the concomitant benefits observed with fresh sterol addition. The resultant benefits include improved physical and rheological characteristics such as stiffness, effective temperature range, and low temperature properties.

In some embodiments, the sterol is obtained from reclaimed sterol. In some embodiments, the reclaimed sterol is a sterol-containing asphalt binder. It should be understood that different sterol types can be added in an asphalt composition to provide the sterol in an amount appropriate to provide the anti-ageing properties of sterol. In other words, a 10 wt % sterol present in an aged asphalt binder containing reclaimed sterol can be used as the sterol in an asphalt composition to provide the anti-aging properties. On the other hand the same 10 wt % sterol present in an aged asphalt binder containing reclaimed sterol can be used as the sterol along with fresh sterol to provide an amount appropriate to provide anti-aging properties to an asphalt composition.

Different parameters are used to measure how effectively different binders respond to aging or how effectively different additives (e.g. sterol) effect the binder response to aging. Delta Tc (ΔTc) is calculated by subtracting the in-critical temperature from the S-critical temperature. Anderson et al. (Anderson, R. M, King, G. N., Hanson, D. I., Blankenship, P. B *"Evaluation of the Relationship between Asphalt Binder Properties and Non-Load Related Cracking,"* Association of Asphalt Paving Technologists, Volume 80, pp 615-663 (2011)) showed that larger values of ΔTc were correlated to fatigue cracking of asphalt pavements. Specifically, that research showed that when ΔTc was 5° C. or greater cracking was likely. Anderson, et al. used the procedure of subtracting the S-critical temperature from the m-critical temperature and thus the more positive the value of ΔTc the greater the chance of fatigue cracking. The asphalt research community has reversed the calculation as stated above and now the more negative values of ΔTc the more difficulty a binder has relaxing stresses and it is therefore more brittle indicating decreasing binder performance.

Determination of the m-critical grade of oxidized binders in this application is used as a means of identifying the aging improvements in the oxidized binders to which sterol is added. Changes in m-critical can also quantify the rate or extent to which an oxidized bitumen's level of embrittlement is increasing. There is currently no m-critical requirement for oxidized binders.

Determination of the S-critical grade of oxidized binders in this application is used as a means of identifying the changes in low temperature stiffness properties in the oxidized binders to which sterol is added when subjected to aging. There is currently no S-critical requirement for oxidized binders.

To determine the ΔTc parameter, a 4 mm DSR test procedure and data analysis methodology from the Western Research Institute was employed as noted above. The DSR test procedure and methodology are also disclosed in International Application No. PCT/US16/37077 filed Jun. 10, 2016, in PCT/US2016/064950 filed Dec. 5, 2016 and PCT/US2016/064961 filed Dec. 5, 2016, each of which is incorporated herein by reference in its entirety.

The ΔTc parameter can be measured using the 4 mm DSR test as described by Sui, C., Farrar, M., Tuminello, W., Turner, T., *A New Technique for Measuring low-temperature Properties of Asphalt Binders with Small Amounts of Material*, Transportation Research Record No 1681, Transportation Research Board, Washington, DC, U.S., Vol. 2179, 1 Dec. 2010, pages 23-28. See also Sui, C., Farrar, M. J., Harnsberger, P. M., Tuminello, W. H., Turner, T. F., *New Low Temperature Performance Grading Method Using 4 mm Parallel Plates on a Dynamic Shear Rheometer. TRB Preprint CD,* 2011; and by Farrar, M., et al., (2012), *Thin Film Oxidative Aging and Low Temperature Performance Grading Using Small Plate Dynamic Shear Rheometry: An Alternative to Standard RTFO, PAV and BBr.* Eurasphalt & Eurobitume 5th E&E Congress-2012 Istanbul (pp. Paper O5ee-467). Istanbul: Foundation Eurasphalt.

The ΔTc parameter can be also measured using a Bending Beam Rheometer (BBR) test procedure based on AASHTO T313 or ASTM D6648. It is important that when the BBR test procedure is used that the test is conducted at a sufficient number of temperatures such that results for the Stiffness failure criteria of 300 MPa and Creep or m-value failure criteria of 0.300 are obtained with one result being below the failure criteria and one result being above the failure criteria. In some instances for binders with ΔTc values less than −5° C. this can require performing the BBR test at three or more test temperatures. ΔTc values calculated from data when the BBR criteria requirements referred to above are not met may not be accurate.

While the ΔTc values have not been determined for oxidized bitumen, this application has determined ΔTc for oxidized bitumen to which sterol has been added and then subjected to aging and the ΔTc values are used to quantify the rate at which embrittlement of the oxidized bitumen changes. The ΔTc values of the oxidized bitumen as measured in this application are all negative and the more negative the ΔTc value becomes the more brittle is the binder.

Another indicator of the ability of sterol to retard or slow the development of binder brittleness is the Rheological Index or R-Value of the binder. R-Value data is shown in Table 1 and plotted in FIG. 3. Rheological index is defined as the difference between the Log of a binder's glassy modulus (G*), which is generally assumed to be 1 gigapascal or 1 E 9 pascals, and the log of the binder's stiffness modulus (G*) at the crossover frequency. The binder crossover frequency is point at which the binder's storage modulus (G') and loss modulus (G") are equal and at this point the binder's phase angle is 45°. These values are readily obtained by performing dynamic shear rheological tests over a range of temperatures and frequencies. As a binder ages its R-Value will increase because while the glassy modulus remains relatively constant in the 1.0 to 1.5 gigapascal range the crossover frequency temperature increases (becomes warmer) and therefore the modulus at the crossover frequency decreases due to the warmer temperatures. The net effect is that the difference between these two moduli becomes greater. The R-Value data reported in Tables 1 and 2 used a static glassy modulus of 1 E 9 Pascals for all samples.

In some embodiments, the roofing materials comprise sterol-containing oxidized asphalt binder that can provide Tm-critical temperatures 2 to 5° C. lower than the Tm-critical temperature of the untreated roofing binder without sterol and a ΔTc of 2 to 5° C. greater than the oxidized binder to which no sterol is added. In some embodiments, the roofing materials comprising sterol-containing asphalt binder that can provide a ΔTc improvement greater than or equal to 5.0° C. after 0, 10, 20, 40 hours of PAV aging at 100° C. compared to a similarly aged, oxidized binder without sterol. In still other embodiments, the roofing materials comprise sterol-containing coating asphalt binder with a less negative ΔTc value and a decreased R-Value following aging, when compared to a similarly-aged roofing material without the sterol.

Ian some embodiments the roofing materials are filled products with mineral filler added to the oxidized binder. Sterol can be added to the oxidized binder prior to the filler addition or after the filler addition. Filler content can range from 1 to 80% by weight of the final roofing product. Sterol can be added as percent by weight of the filled roofing material or can be added to the oxidized binder as percent by weight prior to the addition of the filler.

Other physical and chemical compositional properties that are indicative of binder aging are the Rheological Index, referred to as the R-Value; and increase in asphaltene content in binder as it ages. Asphaltenes are defined as a fraction of asphalt that is insoluble in normal heptane. They exhibit a molecular weight (1000 Daltons or higher), are comprised of condensed ring structures and are aromatic in character. As binders age the asphaltenes increase while cyclics (polar aromatic compounds) decrease, resins increase and saturates tend to change very little. The Colloidal Index (CI) captures the overall change in asphalt chemical compositional change due to aging. The CI is calculated as follows:

$$\frac{\text{resins} + \text{cyclics}}{\text{asphaltenes} + \text{saturates}}$$

The R-Value of a binder increases as binder ages. This is because R-Value is calculated as the difference between the Log of the complex shear modulus (G*) when the phase angle is equal to 45° and Log of the complex shear modulus (G*) at what is referred to as the glassy or limiting brittle modulus, which is typically set equal to 1 E9 Pascals. As binder ages G* increases and the binder becomes more brittle therefore G* must decrease before it can achieve a phase angle of 45° relative to a binder with less aging. Because the log of the glassy modulus does not change or changes only slightly the difference between Log of the glassy modulus and log of modulus at a phase angle of 45° becomes larger and the result is a R-Value that increases as binders age.

R-Value is determined based on the rheological properties of the binder and asphaltene content is obtained by performing a chemical separation of the main component fractions that comprise the asphalt binder. Both properties are impacted by binder aging but because their properties are not determined from the same type of test the result of asphaltene content and R-Value are independently determined; the result of one test cannot influence the other. This is important when showing the benefit of sterol in retarding the aging of binders. See for example, references related to R-Value development in the following: SHRP-A-369 *"Binder Characterization and Evaluation, Volume 3: Physical Characterization"* pp: 25-26 Published by Strategic Highway Research Program, National Research Council, Washing, DC 1994 *National Academy of Sciences* 2101 Constitution Ave, N.W>Washington, DC 20418; *"Interpretation of Dynamic Mechanical Test Data for Paving Grade Asphalt Cements"* Donald W. Christensen, Jr. and David A. Anderson *Proceedings of the Association of Asphalt Paving Technologists*, Vol 61, 1991, pp: 77-80 *"Physical Properties of Asphalt Cement and the Development of Performance-Related Specifications"* David A. Anderson, Donald W. Christensen, and *Hussain Bahia Association of Asphalt Paving Technologists*, Vol. 60, 1990, pp 437-475.

EXAMPLES

The disclosed composition is further illustrated in the following non-limiting examples. Various modifications and alterations of the disclosed compositions will be apparent to those skilled in the art without departing from the scope of this disclosure.

Example 1

The following study showed that the presence of sterol in asphalt binder recovered from newly manufacturer's shingle scrap (typically three tab cut outs and waste from cutting and laminating) retards or slows the aging rate of the recovered asphalt binder relative to the untreated asphalt binder from newly manufacturer's shingle scrap.

Testing of the untreated asphalt binder and the two sterol-treated binder samples was conducted at the original condition (viz., unaged) and after 20, 40 and 60 hours of PAV aging of the binders according to ASTM D 6521. PAV aging is typically used to assess the aging properties of paving asphalt binders and was used for these samples as a rapid means of evaluating the ability of sterol to retard or slow the aging rate of an oxidized binder.

The sterol used was mixed sterols obtained from MP Biomedicals (Catalog No. 02102886) referred to as beta-Sitosterol (beta-Sitosterol ~40-60%; campesterol ~20-40%; Stigmasterol~5%).

The low temperature data, ΔTc, and R-Value data provided in Table 1 were obtained using a 4 mm dynamic shear rheometer (DSR) test method as presented by Sui et al. (2010), Sui et al. (2011) and Farrar et al. (2012). The high temperature results were obtained using a 25 mm DSR test method according to ASTM D7175.

TABLE 1

Rheological Properties of Recovered Binder from Shingle Waste plus Sterol

| Sample Description | Aging, PAV hours | % sterol | Ts-Critical, ° C. | Tm-critical ° C. | ΔTc, ° C. | R-Value | 1 kPa Stiffness Temperature, ° C. |
|---|---|---|---|---|---|---|---|
| Recovered binder from manufacturer's waste | 0 | 0 | −31.15 | −22.15 | −9.00 | 3.167 | 138.7 |
| Recovered binder from manufacturer's waste | 20 | 0 | −27.64 | −3.75 | −23.89 | 3.656 | 154.8 |
| Recovered binder from manufacturer's waste | 40 | 0 | −26.56 | −0.23 | −26.33 | 3.762 | 179.2 |
| Recovered binder from manufacturer's waste | 60 | 0 | No data- | No data- | No data- | No data- | No data- |
| 10-01-13-E + 5% sterol | 0 | 5 | −30.43 | −27.01 | −3.42 | 2.677 | 119.5 |
| 10-01-13-E + 5% sterol | 20 | 5 | −26.84 | −18.15 | −8.69 | 3.038 | 139.7 |
| 10-01-13-E + 5% sterol | 40 | 5 | −26.42 | −13.98 | −12.44 | 3.257 | 150.1 |
| 10-01-13-E + 5% sterol | 60 | 5 | −24.85 | −5.72 | −19.14 | 3.471 | 161.5 |
| 10-01-13-E + 7.5% sterol | 0 | 7.5 | −29.80 | −28.89 | −0.91 | 2.476 | 112.4 |
| 10-01-13-E + 7.5% sterol | 20 | 7.5 | −27.53 | −22.38 | −5.15 | 2.820 | 130.2 |
| 10-01-13-E + 7.5% sterol | 40 | 7.5 | −25.30 | −16.90 | −8.40 | 3.030 | 141.4 |
| 10-01-13-E + 7.5% sterol | 60 | 7.5 | −23.48 | −9.58 | −13.9 | 3.223 | 147.6 |

As Table 1 shows, no data was generated for the 60-hour PAV aged condition of the original (viz., unaged, untreated) recovered binder. The 60-hour aged sample, although produced, was brittle and unable to be liquefied to a point where it could be tested without excessive heating, which would have altered the properties of the binder. The Table 1 data as a whole, however, shows the benefits of adding sterol to the recovered binder from manufacturer's waste prior to aging.

Figure 2:
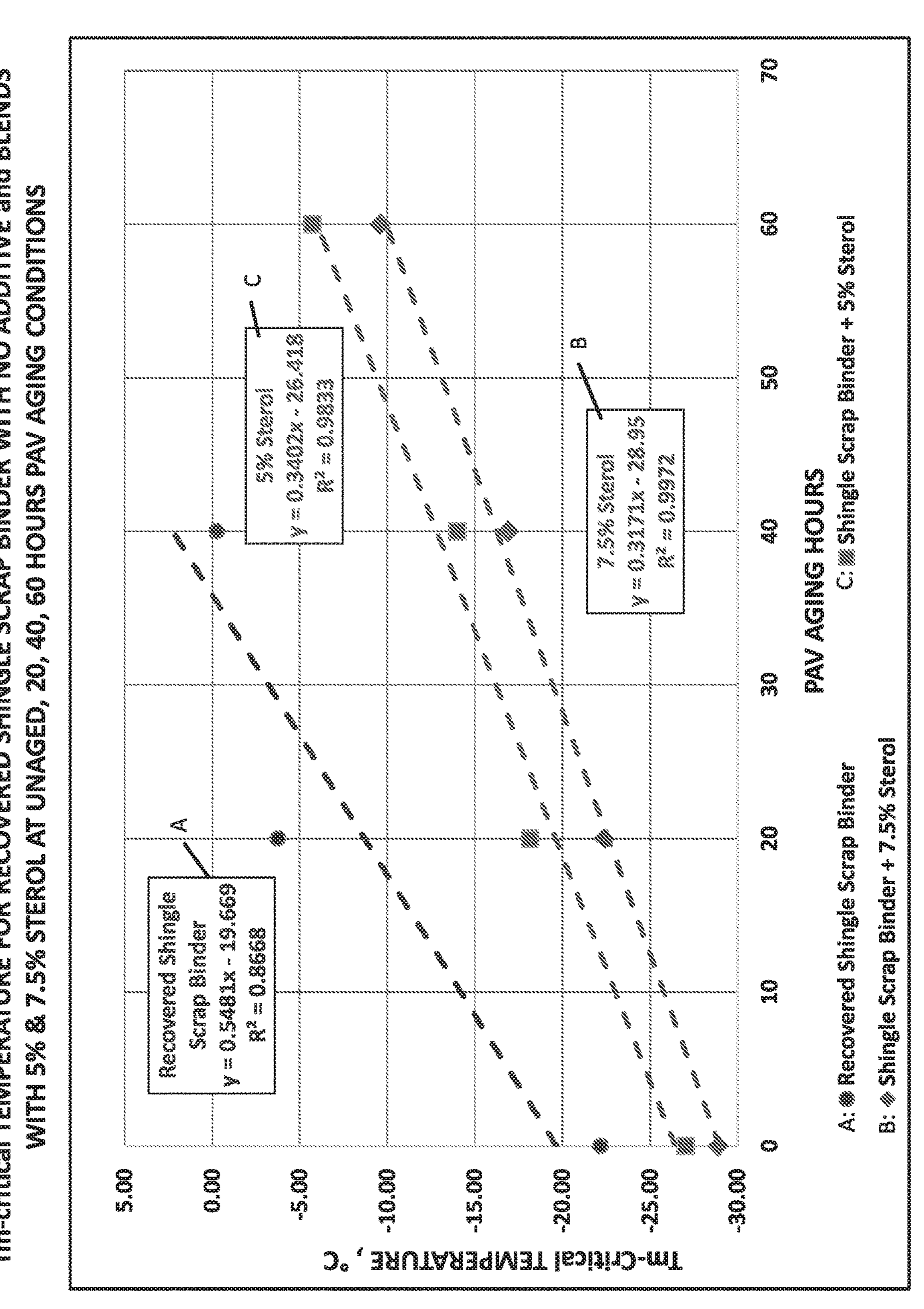
FIG. 2 graphically represents the Tm-critical temperature for recovered shingle scrap binder with and without sterol under Pressure Aging Vessel (PAV) aging conditions.
Figure 3:
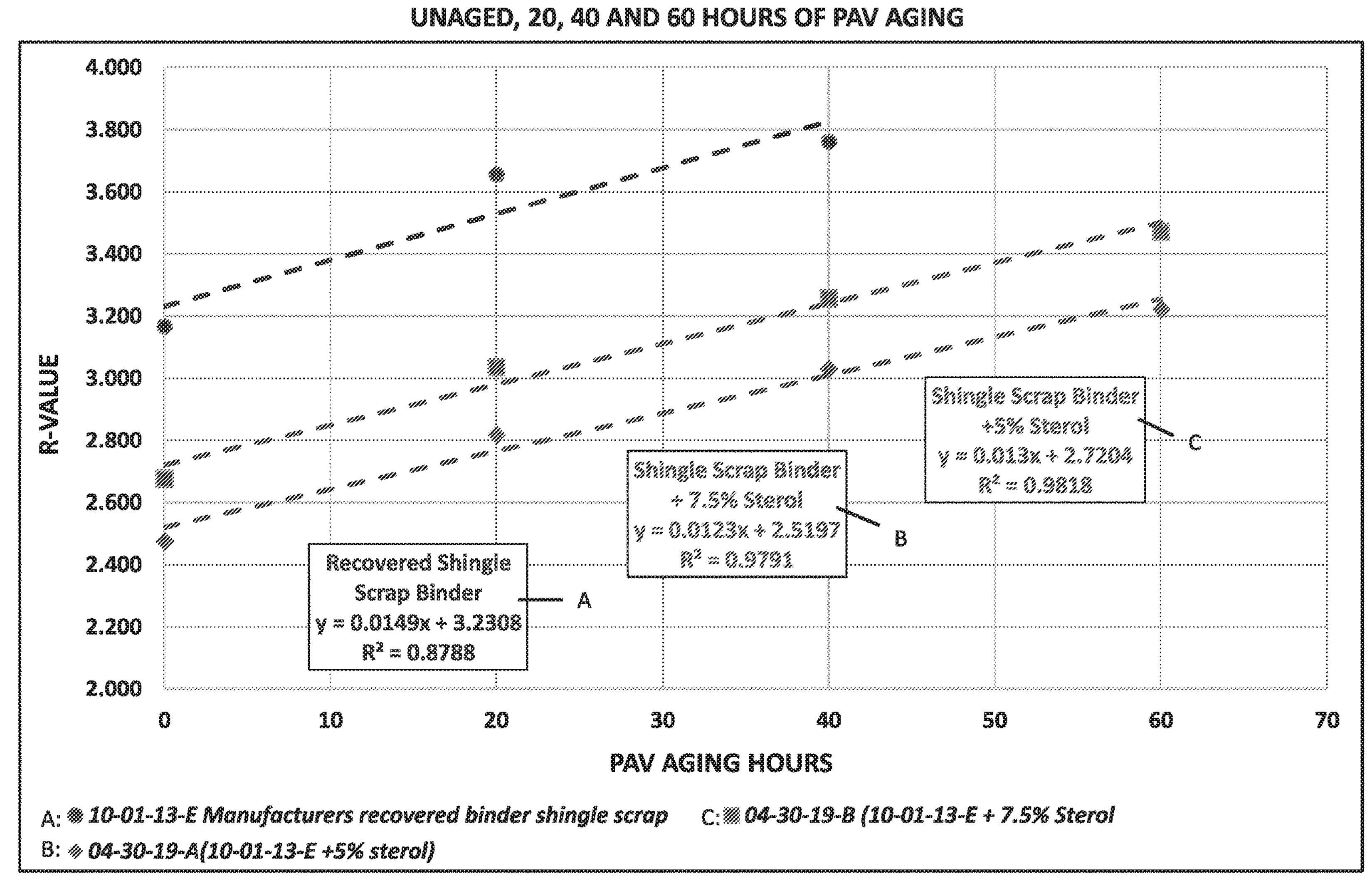
FIG. 3 graphically represents the rheological index, also referred to as R-value, for recovered shingle scrap binder with and without sterol under PAV aging conditions.

The Table 1 results were also graphically plotted and shown in FIGS. 1-3. FIG. 1 shows the temperature at which the binder has a stiffness of 1 kPa when tested with a dynamic shear rheometer using a 25 mm diameter plate-plate geometry at a 1 mm gap according to ASTM D7175.

The data in FIG. 1 shows that the addition of 5% and 7.5% sterol reduces the temperature at which the original binder (unaged) sample achieves a stiffness of 1 kPa.

The 1 kPa stiffness temperature for the 5% sterol sample with no additional aging is reduced by 19.2° C., whereas the 7.5% sterol sample is reduced by 26.3° C. FIG. 1 shows that the aging rate of the 5% and 7.5% samples is reduced compared to the aging rate of the unaged, original recovered binder with no sterol. The data also shows that it takes 20 hours of PAV aging for the 5% sterol sample to reach the 1 kPa stiffness temperature of the unaged, original binder at zero aging time and it takes 40 hours of PAV aging for the 7.5% sterol to reach the 1 kPa stiffness temperature of the original binder at zero aging time.

FIG. 2 is a plot of the Tm-critical of the binders at each aging condition. Ts-critical and Tm-critical as defined as the temperatures where the Bending Beam stiffness value=300 MPa and the Bending Beam relaxation temperature=0.300. The test method and methods of determining these results is presented in ASTM 6648. FIG. 2 shows that the Tm-critical temperature for the recovered shingle scrap (without sterol) increases at a more rapid rate than the samples with 5% and 7.5% sterol. As stated previously the low temperature data was obtained using 4 mm DSR geometry procedures developed by Western Research Institute.

The brittleness of the recovered, untreated shingle scrap binder produces test results with a Tm-Critical that is higher (warmer) than either of the sterol-treated samples. Warmer low temperature failure values indicate the binder's brittleness is increasing and the potential for low temperature failure will increase. Although the sterol-treated samples are aging based on their increase in Tm-critical value, brittleness is not the same as for the original, unaged binder. The reduction in brittleness is demonstrated by the ΔTc temperature values shown in Table 1. Although the Ts-critical temperatures for the sterol-treated samples are similar to those of the untreated, recovered shingle scrap binder at 40 hours of PAV aging, the sterol sample ΔTc values are substantially better (less negative) because the sterol retards or slows the increase in the binder creep relaxation temperatures or Tm-critical values. It is important to realize that binder relaxation (and not binder stiffness at low temperatures) is a measure of binder brittleness. The data in Table 1 shows that neither of the sterol-treated samples after 60 hours of PAV aging reaches a ΔTc value equivalent to the original binder at 20 hours of PAV aging.

Table 1 shows a steady increase of R-Values for all the blends tested. Similar to the ΔTc value, the R-values for the sterol samples never reach the level after 60 hours of PAV aging that the original, untreated binder reaches at 20 hours of PAV aging. These results are shown graphically in FIG. 3, where the 60-hour R-value data for the 7.5% sterol sample is similar to that of the original binder at zero aging time. These data further explain why brittleness present in the original binder sample is not as prevalent in the sterol samples.

Example 2

The sterol was also evaluated using an oxidized, coating asphalt binder. In the following data a coating asphalt binder is treated using three loading levels of sterol followed by PAV aging at 10, 20 and 40 hours followed by determination of the change in high temperature and low temperature properties of the aged samples as described in Example 1.

A coating asphalt binder obtained from Malarky Roofing was used. Sterol concentrations of 3%, 5% and 8% were blended into the coating asphalt binder and PAV aged at 100° C. according to ASTM D 6521 for 10, 20 and 40 hours. The test results for these samples are presented in Table 2.

TABLE 2

Rheological Properties of Coating asphalt binder Blends with Sterol

| Sample Description | Aging | % sterol | Ts-critical | Tm-critical | ΔTc | R-Value | Temperature @ 1 kPa Stiffness |
|---|---|---|---|---|---|---|---|
| Shingle Coating asphalt binder | 0 | 0 | −33.14 | −11.03 | −22.11 | 3.785 | 126.4 |
| Shingle Coating asphalt binder | 10 | 0 | −32.35 | −4.10 | −28.25 | 3.956 | 143.2 |
| Shingle Coating asphalt binder | 20 | 0 | −31.01 | −1.33 | −29.68 | 4.090 | 153.5 |
| Shingle Coating asphalt binder | 40 | 0 | −29.90 | 4.75 | −34.65 | 4.195 | 175.4 |
| Shingle Coating + 3% sterol | 0 | 3 | −34.23 | −18.23 | −16.00 | 3.362 | 115.6 |
| Shingle Coating + 3% sterol | 10 | 3 | −31.55 | −10.41 | −21.14 | 3.764 | 132.3 |
| Shingle Coating + 3% sterol | 20 | 3 | −32.42 | −7.89 | −24.54 | 3.855 | 142.5 |
| Shingle Coating + 3% sterol | 40 | 3 | −28.32 | 2.32 | −30.64 | 4.050 | 157.3 |
| Shingle Coating + 5% sterol | 0 | 5 | −34.76 | −22.00 | −12.76 | 3.359 | 110.4 |
| Shingle Coating + 5% sterol | 10 | 5 | −32.56 | −15.96 | −16.60 | 3.501 | 125.5 |
| Shingle Coating + 5% sterol | 20 | 5 | −30.71 | −10.45 | −20.27 | 3.621 | 137.8 |
| Shingle Coating + 5% sterol | 40 | 5 | −27.77 | −0.07 | −27.70 | 3.854 | 151.2 |
| Shingle Coating + 8% sterol | 0 | 8 | −34.07 | −27.02 | −7.06 | 2.949 | 104.1 |

TABLE 2-continued

Rheological Properties of Coating asphalt binder Blends with Sterol

| Sample Description | Aging | % sterol | Ts-critical | Tm-critical | ΔTc | R-Value | Temperature @ 1 kPa Stiffness |
|---|---|---|---|---|---|---|---|
| Shingle Coating + 8% sterol | 10 | 8 | −31.52 | −20.71 | −10.81 | 3.225 | 118.1 |
| Shingle Coating + 8% sterol | 20 | 8 | −30.88 | −15.28 | −15.60 | 3.265 | 122.6 |
| Shingle Coating + 8% sterol | 40 | 8 | −27.25 | −7.25 | −19.99 | 3.505 | 137.1 |

Review of the temperature at which the binders reach 1 kPa stiffness shows that the 3% sterol sample has a stiffness temperature 4° C. higher after 40 hours of PAV aging as compared to the untreated coating asphalt binder at 20 hour of PAV aging. The 5% sterol sample is 2° C. lower in temperature at 40 hours of aging as compared to the untreated coating asphalt binder at 20 hours of aging. The 8% sterol sample has a 1 kPa stiffness temperature of 137.1° C. after 40 hours of PAV aging compared to a 1 kPa stiffness temperature of 126° C. for the unaged, untreated sample. The untreated sample has a 1 kPa stiffness temperature of 143° C. for the 10-hour PAV aged sample which means that the 8% sterol sample has a 1 kPa stiffness temperature after 40 hours of PAV aging that is 6° C. lower than the 1 kPa Stiffness temperature of the untreated sample after 10 hours of PAV aging.

Figure 4:
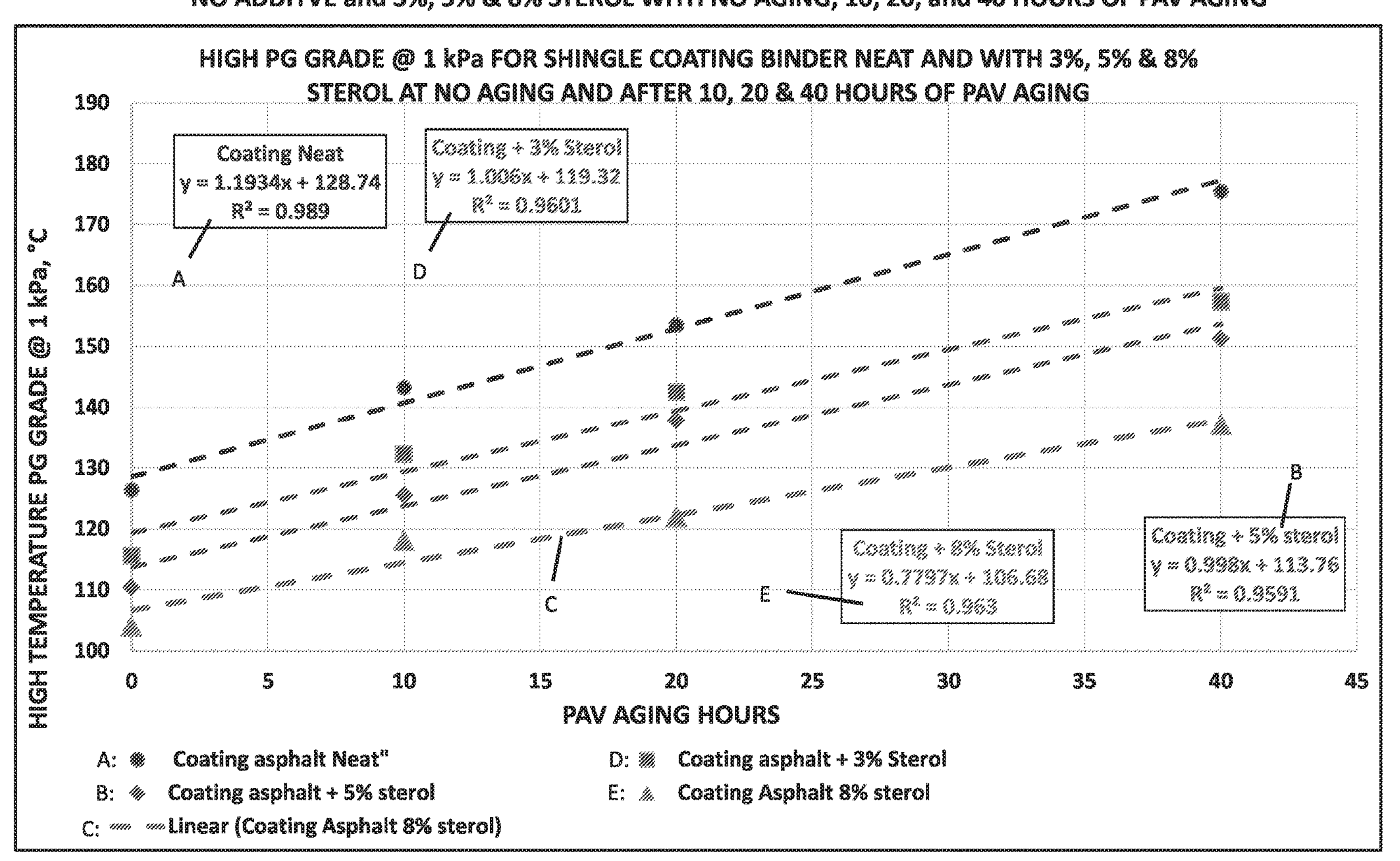
FIG. 4 graphically represents the temperature at which a coating asphalt reaches a stiffness of 1 kPa.

The high temperature data from Table 2 is plotted in FIG. 4. FIG. 4 shows a sterol dose response. Each successively higher sterol dosage level reduces the rate at which the high temperature values of the treated samples increase compared to the untreated sample.

FIG. 4 shows a plot of the high temperature coating asphalt binder samples at different aging times. The regression plots show the addition of sterol retards or slow the rate at which the high temperature property of the coating asphalt binder increases with aging in a dose-dependent manner. The samples with no aging differ by 10.8° C., 16° C. and 22.3° C. for 3% sterol, 5% sterol and 8% sterol respectively, but after 40 hours of aging those differentials have increased by 8° C. for the 3% and 5% sterol samples and by 16° C. for the 8% sterol blend.

Figure 5:
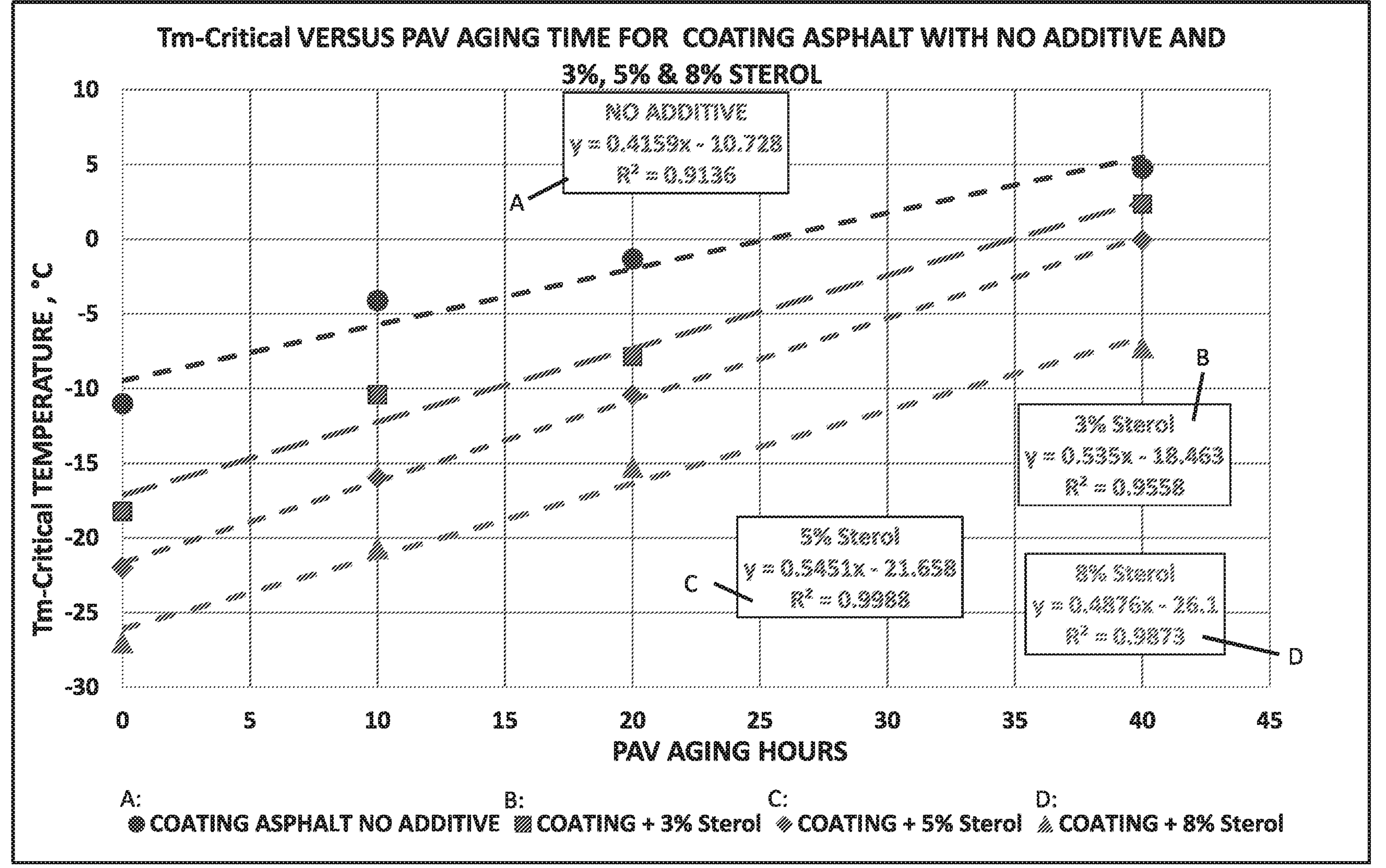
FIG. 5 graphically represents the Tm-critical temperature for a coating asphalt with or without sterol.

Evaluation of the Tm-critical data in Table 2 for the coating asphalt binder samples shows that sterol reduces the Tm-critical temperature of the unaged samples by 7° C. for 3% sterol and 11° C. for 5% sterol and 16° C. for 8% sterol. However, the data also show the sterol samples' Tm-critical values increase at a faster rate than Tm-critical of the untreated binder such that at 40 hours of aging the Tm-critical for the 3% sterol blend is 2.4° C. lower than the untreated coating asphalt binder, the 5% sterol blend is 4.7° C. lower than the untreated coating asphalt binder and the 8% sterol blend has a Tm-critical value 12° C. lower than the untreated coating. The sterol concentration exhibits a dose-dependent response for Tm-critical. The data plots in FIG. 5 show that the Tm-critical rate of aging decreases with higher sterol levels. Based on the slopes of the data plots, Tm-critical increases at a more rapid rate than the untreated binder for all sterol treatment levels, although there is clearly a dose response improvement in the rate of Tm-Critical aging. Coating asphalt is the most highly oxidized air blown asphalt. The more oxidized the binder the more sterol is required to retard the Tm-Critical aging rate. The data shown graphically in FIG. 4 makes this clear. Three percent and 5% sterol loading have nearly the same Tm-Critical aging slopes, but 8% sterol shows a reduction in Tm-Critical aging slope compared to the 3% and 5% samples.

Figure 6:
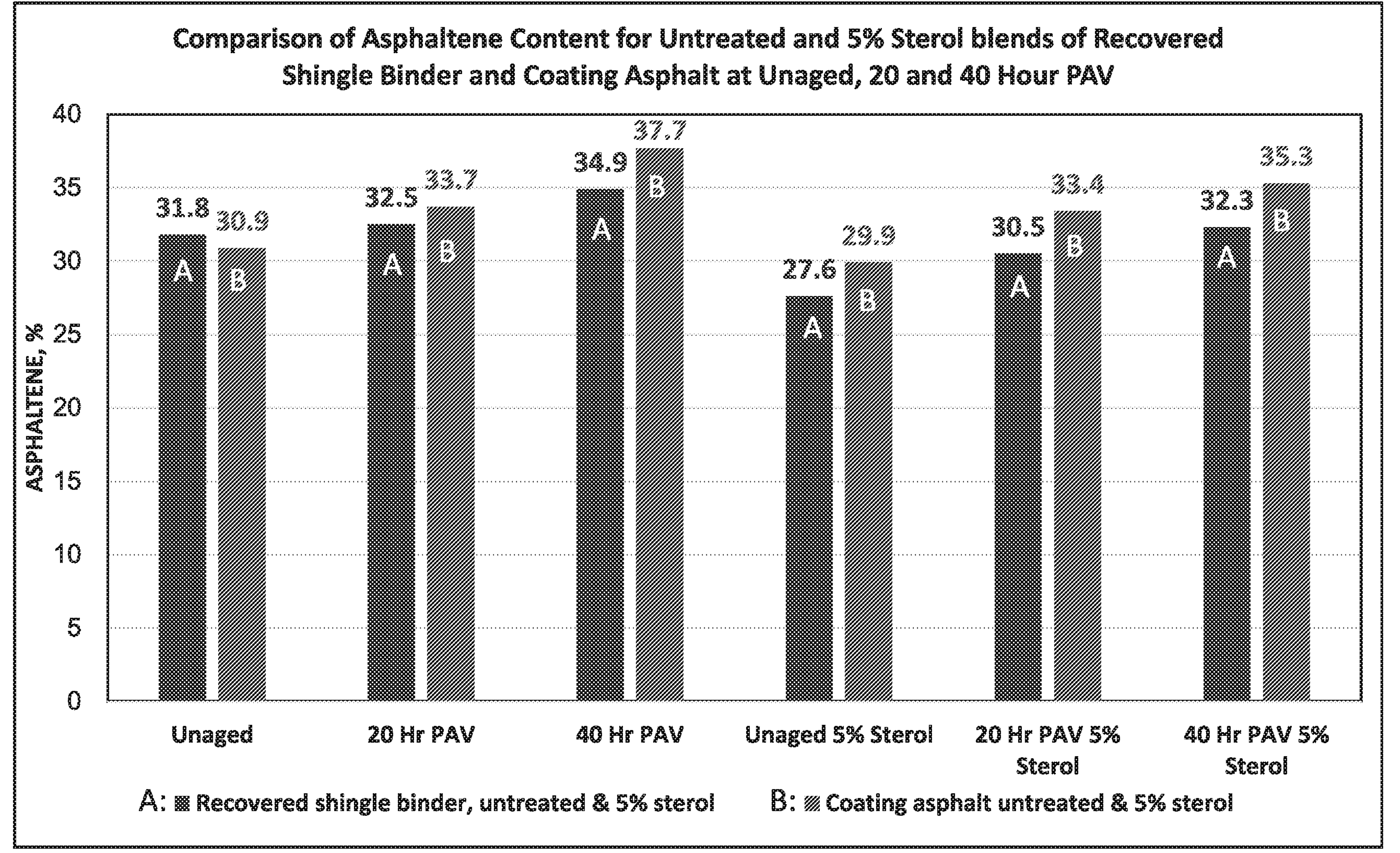
FIG. 6 graphically represents the asphaltene content of Recovered Shingle Binder and Coating asphalt binder under various aging conditions.

An explanation for this response of the coating asphalt binder samples compared to the binder recovered from the manufacturer's waste lies in the compositional makeup of the binders. Tables 3 and 4 show the IATROSCAN results for samples presented in Tables 1 and 2 respectively. A variation in these data is that the binder recovered from the shingle waste has saturate content that is 3% to 5.5% lower than the saturate content of the coating asphalt binder. This higher saturate content could be due to addition of a softening oil prior to the blowing of the bitumen to produce the coating as the typical saturate level for most bitumen is in the 6-8% range. Regardless of source the saturate level is greater in the coating asphalt binder. Also, for equivalent aging times and sterol contents the asphaltene content of the coating asphalt binder is greater than that of the recovered shingle waste binder (FIG. 6). Both of these factors have a detrimental impact on binder relaxation with aging as quantified by Tm-Critical. Without being bound by any theory, the sterol may impact binder performance by dispersing or disrupting the asphaltenes that develop due to aging. Higher levels of asphaltenes require greater levels of sterol to reverse the effects of asphaltene growth due to high levels of oxidation.

Looking at the plots of Tm-Critical versus hours of PAV aging in FIG. 5 it is possible to use the regression equations to calculate the number of PAV aging hours required before the sterol regression data would intersect the untreated sample. For 3% sterol loading the time would be 65 total PAV hours, for 5% sterol it would be 84 PAV hours and for 8% sterol the time would be 214 PAV hours. These results provide a means of ascertaining a reasonable sterol dosage that would in effect protect the coating asphalt binder from degrading to the same condition as the untreated coating asphalt binder. The 3% loading would only require a little over 20 more hours added to the condition shown FIG. 5 and therefor 3% sterol would not be a worthwhile loading for this binder. The 5% loading would require twice as much aging as already shown and would probably be considered a cost-effective loading depending on how many years in service a 40 hour PAV aging predicts for a shingle. The 8% loading would provide a theoretical protection based on aging 5 times longer than the 40 hours shown in FIG. 5. The 8% loading level is probably greater than required for all uses except the most extreme.

Figure 7:
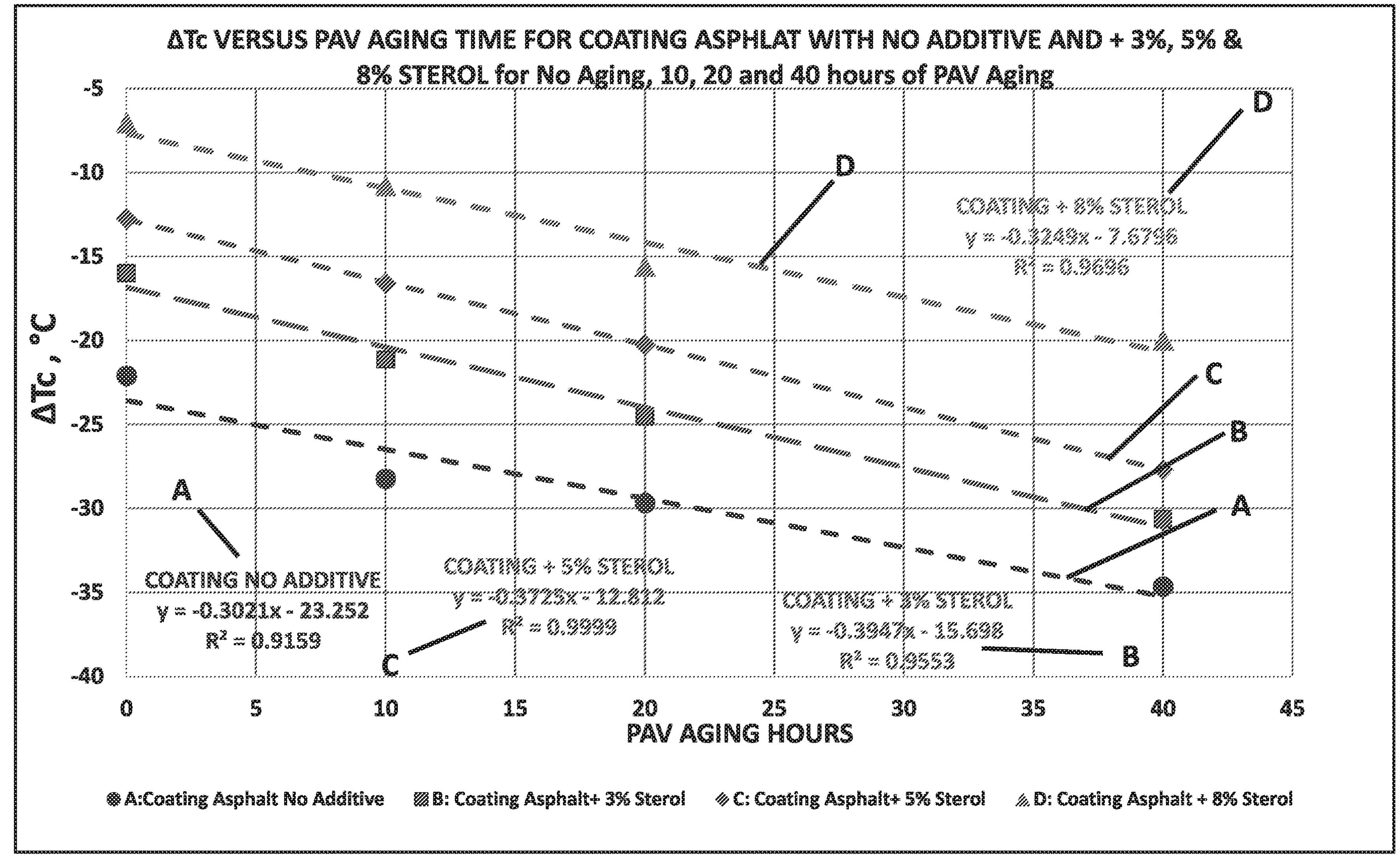
FIG. 7 graph graphically represents ΔTc compared to PAV aging time for aa coating asphalt with or without sterol.

The ΔTc data (FIG. 7), which takes into account changes in Ts-critical and Tm-critical shows that the 40 hour aged 3% sterol has a ΔTc value similar to the 20 hour aged untreated sample and the 40 hour aged 5% sterol has a ΔTc slightly better than the 10 hour aged untreated sample. The 40-hour PAV of the 8% is about 3° C. better than the ΔTc of the original coating asphalt binder with no additive. These data show that these sterol loadings are able to alter the brittleness of the coating asphalt binder over extended aging times.

Using the same regression equation calculation for the ΔTc data the 5% sterol blend would require 132 PAV aging hours to achieve the same ΔTc as the untreated coating asphalt binder and the 8% sterol blend would require 475 FAV aging hours to match the untreated coating asphalt binder. These values are approximately double the values determined for the Tm-Critical result. That is because when ΔTc is calculated both the Ts-Critical and Tm-Critical data is used in the calculation. As the binders are aged both Ts-Critical and Tm-Critical degrade, but as is clear from Table 2 Ts-Critical degrades at a slower rate than does Tm-Critical and ΔTc decreases at a slower rate than does Tm-Critical.

TABLE 3

Compositional Properties of Binder Recovered from Shingle Waste

| Source of Oxidized Roofing Asphalt | Aging | Asphaltenes | Resins | Cyclics | Saturates | Cl |
|---|---|---|---|---|---|---|
| Oxidized Binder From Shingle Waste, Neat | Original | 31.8 | 18.5 | 41.2 | 8.5 | 1.481 |
| Oxidized Binder From Shingle Waste, Neat | 20 hr PAV | 32.5 | 21.8 | 37.9 | 8 | 1.474 |
| Oxidized Binder From Shingle Waste, Neat | 40 hr PAV | 34.9 | 22.5 | 37 | 7.8 | 1.393 |
| Oxidized Binder from Shingle Waste + 5% Sterol | Original | 27.6 | 21.1 | 43.8 | 7.6 | 1.844 |
| Oxidized Binder from Shingle Waste + 5% Sterol | 20 hr PAV | 30.5 | 25.3 | 36.6 | 7.5 | 1.629 |
| Oxidized Binder from Shingle Waste + 5% Sterol | 40 hr PAV | 32.3 | 28.3 | 31.1 | 8.3 | 1.463 |
| Oxidized Binder from Shingle Waste + 5% Sterol | 60 hr PAV | 35.3 | 25.8 | 30.5 | 8.4 | 1.288 |
| Oxidized Binder from Shingle Waste + 7.5% Sterol | Original | 27.5 | 26.2 | 39.1 | 7.1 | 1.887 |
| Oxidized Binder from Shingle Waste + 7.5% Sterol | 20 hr PAV | 30.6 | 28.4 | 33.9 | 7.2 | 1.648 |
| Oxidized Binder from Shingle Waste + 7.5% Sterol | 40 hr PAV | 31.8 | 30.1 | 30.7 | 7.3 | 1.555 |
| Oxidized Binder from Shingle Waste + 7.5% Sterol | 60 hr PAV | 33.6 | 36.8 | 22.7 | 6.9 | 1.469 |

TABLE 4

Compositional Properties of Coating asphalt binder

| Source of Roofing Asphalt | Aging | Asphaltenes | Resins | Cyclics | Saturates | Cl |
|---|---|---|---|---|---|---|
| Coating Asphalt, Neat | Original | 30.9 | 17.9 | 40.0 | 11.1 | 1.379 |
| Coating Asphalt, Neat | 10 hr PAV | 33.8 | 20.2 | 34.3 | 11.7 | 1.198 |
| Coating Asphalt, Neat | 20 hr PAV | 33.7 | 20.9 | 33.4 | 12.0 | 1.188 |
| Coating Asphalt, Neat | 40 hr PAV | 37.7 | 22.3 | 27.4 | 12.6 | 0.988 |
| Coating Asphalt + 3% Sterol | Original | 30.6 | 22.5 | 35.9 | 11.0 | 1.404 |
| Coating Asphalt + 3% Sterol | 10 hr PAV | 32.6 | 25.6 | 31.1 | 10.7 | 1.309 |
| Coating Asphalt + 3% Sterol | 20 hr PAV | 33.5 | 24.3 | 30.3 | 11.9 | 1.203 |
| Coating Asphalt + 3% Sterol | 40 hr PAV | 36.0 | 26.1 | 26.0 | 11.8 | 1.090 |
| Coating Asphalt + 5% Sterol | Original | 29.9 | 21.6 | 38.6 | 9.9 | 1.513 |
| Coating Asphalt + 5% Sterol | 10 hr PAV | 31.2 | 24.3 | 34.1 | 10.4 | 1.404 |
| Coating Asphalt + 5% Sterol | 20 hr PAV | 33.4 | 26.8 | 27.8 | 11.9 | 1.205 |
| Coating Asphalt + 5% Sterol | 40 hr PAV | 35.3 | 29.3 | 24.3 | 11.2 | 1.153 |
| Coating Asphalt + 8% Sterol | Original | 28.5 | 24.7 | 37.4 | 9.4 | 1.639 |

TABLE 4-continued

Compositional Properties of Coating asphalt binder

| Source of Roofing Asphalt | Aging | Asphaltenes | Resins | Cyclics | Saturates | Cl |
|---|---|---|---|---|---|---|
| Coating Asphalt + 8% Sterol | 10 hr PAV | 32.6 | 26.8 | 29.6 | 11 | 1.294 |
| CoatingAsphalt + 8% Sterol | 20 hr PAV | 33.8 | 31.4 | 24.6 | 10.1 | 1.276 |
| Coating Asphalt + 8% Sterol | 40 hr PAV | 34.3 | 30.4 | 24.2 | 11.1 | 1.203 |

Figure 8:
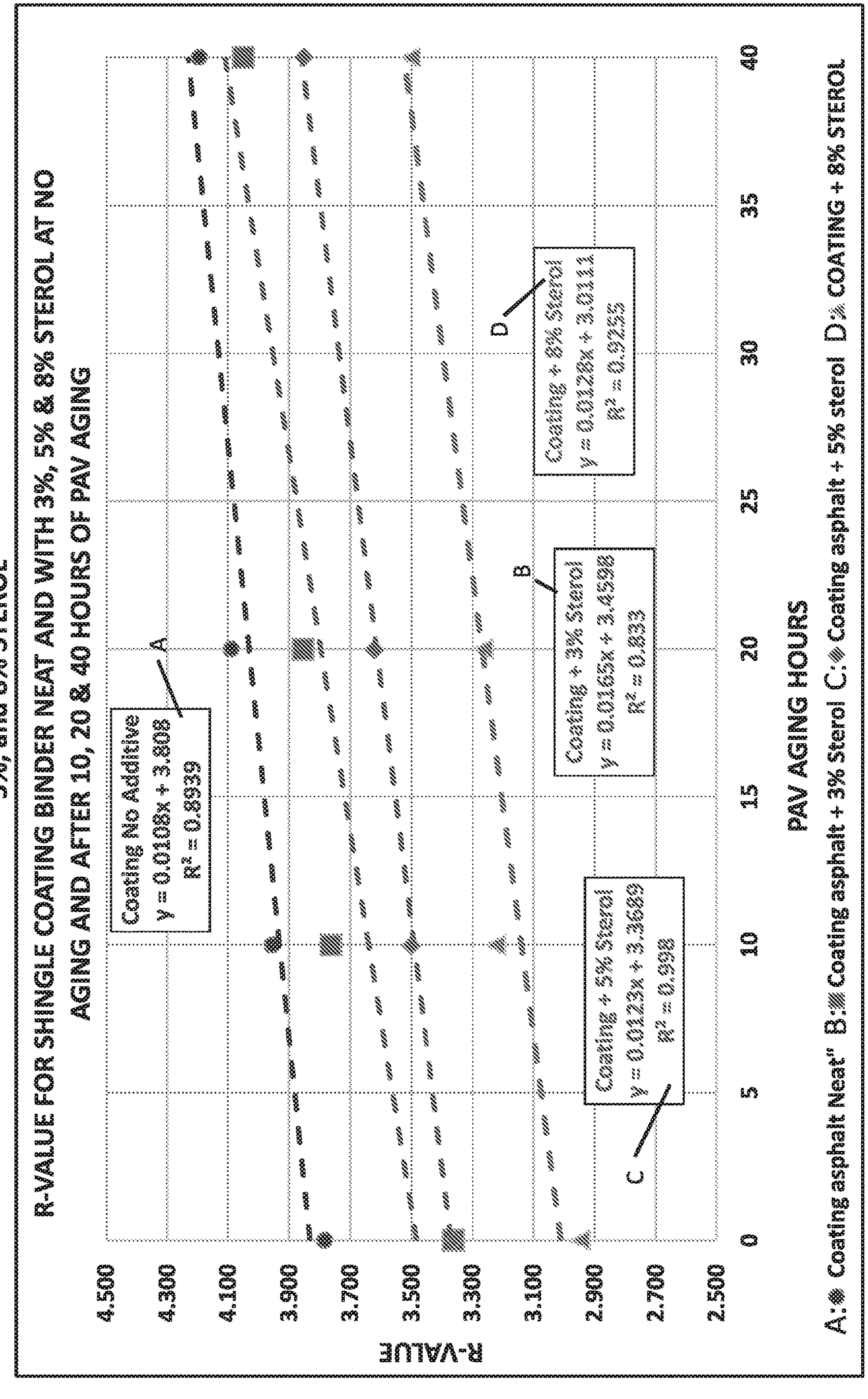
FIG. 8 graph graphically represents the rheological index (R-value) as a function of aging time for a coating asphalt with or without sterol.
Figure 9:
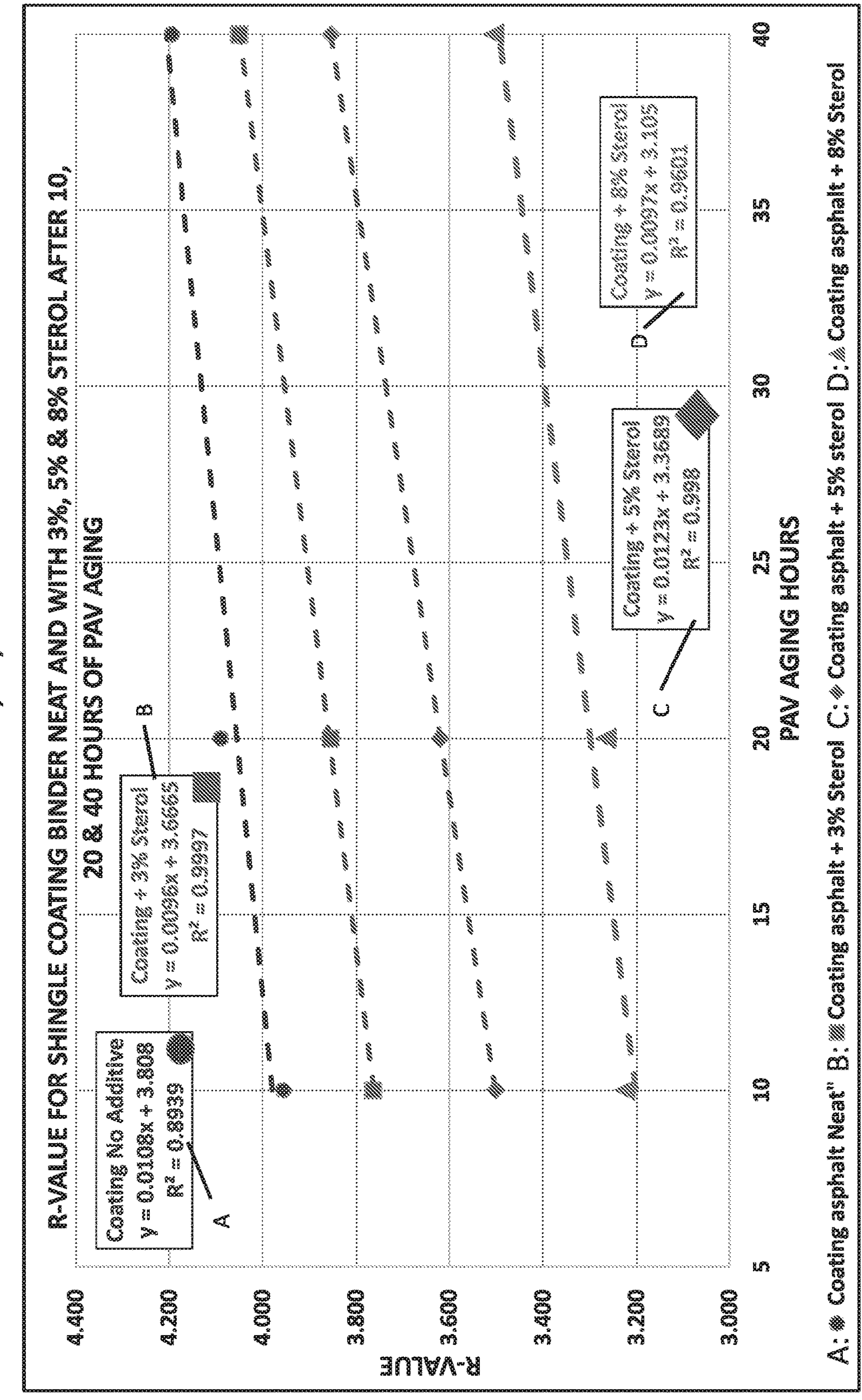
FIG. 9 graphically represents the rheological index (R-value) as a function of aging time for a coating asphalt with or without sterol.

Evaluation of the change in R-Value based on sterol content and aging time was also conducted and that data is plotted in FIG. 8. Both FIG. 8 and Table 2 show the R-Value for 3% sterol with no aging to be nearly the same as the R-Value for the 5% sterol sample which is inconsistent with the remaining data. Repeated tests confirm this outcome. A possible explanation is that 3% sterol initially produced a large effect on the properties of the coating asphalt binder, but with aging that effect was not sustained due to the low loading of sterol. FIGS. 8 and 9 show that the results for 5% and 8% sterol are less variable with aging than the 3% sterol samples. The data plotted in FIG. 9 includes the data for only 10, 20 and 40 hours of PAV aging to remove the data inconsistencies of the unaged blends. The 40-hour aged R-Value for 3% sterol is slightly greater than the 10 hour aged untreated sample. The R-Value for 40 hour aged 5% sterol sample is lower the untreated sample at 10 hours and similar to the 3% sterol blend at 10 hours. The ΔTc data in FIG. 7 also provides the same conclusions. The data regressions in FIG. 9 also show that the rate of increase in R-Value for the coating asphalt binder plus sterol samples are similar to or slightly lower than those of the untreated sample. However, the initial reduction in R-Value is dose dependent and the R-Values follow that aging path based on the starting point of the initial blend, this is especially true for the 5% and 8% blends. The reduction in R-Value and improvement in ΔTc as a result of the sterol addition shows that sterol is able to reduce the low temperature brittleness of the coating asphalt binder as the binder samples are aged.

Example 3

Example 3 provides data for aging of untreated filled coating binder and 5% and 8% sterol samples. A filled coating binder is mineral fillers in the coatings. The samples were aged for 10, 20 and 40 hours in the PAV prior to testing. An estimate of the filler amount in the coating was determined by solubilizing the filled coating in toluene and washing the sample until it was clear through the filter. The asphaltene amount was determined by n-heptane insoluble test procedure according to ASTM D3279. The filler amount was determined at 41% by weight of the total asphalt binder. The sterol was added based on weight percent of total asphalt binder. The data for these samples is shown in Table 5

TABLE 5

Rheological Properties of Filled Coating asphalt binder with Sterol

| Sample Description | Aging | % sterol | Ts-critical | Tm-critical | ΔTc | R-Value | 1 kPa Stiffness temperature |
|---|---|---|---|---|---|---|---|
| Filled Shingle Coating asphalt | 0 | 0 | −15.93 | −5.76 | −10.17 | 2.538 | 144.6 |
| Filled Shingle Coating asphalt | 10 | 0 | −11.69 | 2.10 | −13.79 | 2.624 | 154 |
| Filled Shingle Coating asphalt | 20 | 0 | −10.06 | 7.82 | −17.88 | 2.789 | 161.7 |
| Filled Shingle Coating asphalt | 40 | 0 | −11.28 | 9.95 | −21.23 | 2.956 | 169.7 |
| Filled Shingle Coating + 5% sterol | 0 | 5 | −19.52 | −25.24 | 5.72 | 1.807 | 106.5 |
| Filled Shingle Coating + 5% sterol | 10 | 5 | −17.36 | −21.61 | 4.25 | 1.949 | 120.8 |
| Filled Shingle Coating + 5% sterol | 20 | 5 | −14.81 | −17.76 | 2.95 | 2.092 | 127.4 |
| Filled Shingle Coating + 5% sterol | 40 | 5 | −12.75 | −15.05 | 2.30 | 2.102 | 138.2 |
| FILLED Shingle Coating + 8% sterol | 0 | 8 | −20.15 | −25.32 | 5.16 | 1.658 | 93.6 |
| FILLED Shingle Coating + 8% sterol | 10 | 8 | −17.70 | −23.01 | 5.32 | 1.864 | 103.4 |
| FILLED Shingle Coating + 8% sterol | 20 | 8 | −16.20 | −22.24 | 6.04 | 1.744 | 111.7 |
| FILLED Shingle Coating + 8% sterol | 40 | 8 | −14.05 | −19.98 | 5.93 | 1.909 | 118.4 |

Figure 10:
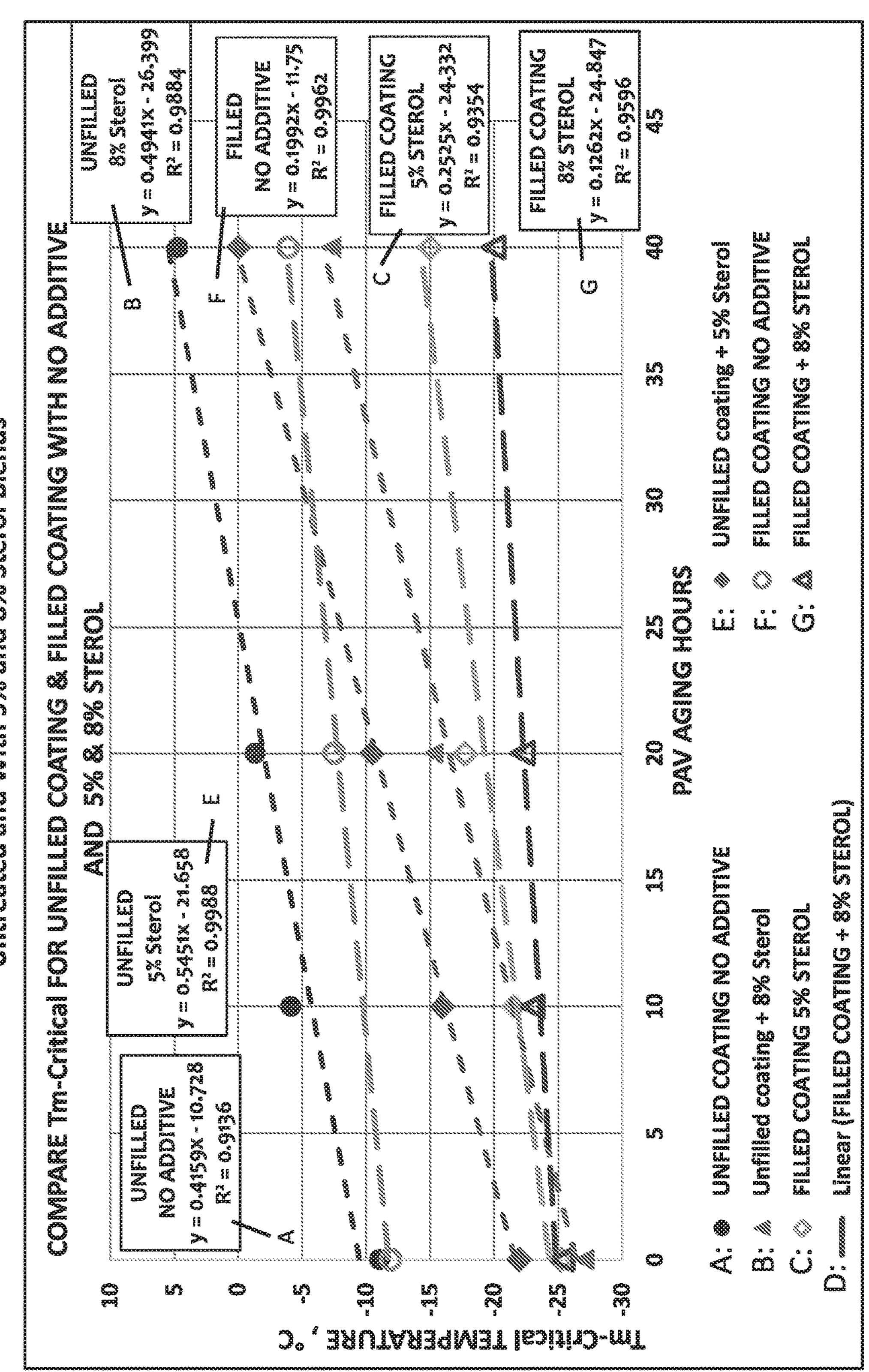
FIG. 10 graphically represents the comparison of the Tm-critical temperature for an unfilled coating asphalt and filled coating asphalt.

The temperature at which the filled coating asphalt binder equals 1 kPa is lower than the unfilled coating asphalt binder with no sterol (Example 2) and substantially lower than the unfilled coating asphalt binder with 5% and 8% sterol. This may be due to the fact that the sterol loading based on the binder only content of the filled coating is 8.4% and 13.5% sterol based on our analysis that the mass percent of the binder in the filled coating is 59%. The Tm-Critical temperature results for the filled coating are increasingly colder (meaning the specification criteria for low temperature relaxation occurs at colder temperatures). However, the Ts-Critical temperatures are warmer than the unfilled samples for the untreated, 5% and 8% sterol loadings. In the case of Tm-Critical the test results can be attributed to higher sterol concentration as a percent of the binder; alternatively, the sterol appears to have resulted in no beneficial effect on Ts-Critical and the higher binder stiffness of the filled coating asphalt may simply be a function of the stiffening effect of the filler. The R-Values for the three samples show minor changes with aging for each individual sample, however the R-Values tend to decrease from the untreated samples to the 5% and the 8% sterol samples as shown in Table 5. FIG. 10 is comparison plot of Tm-Critical as a function of PAV aging hours for the unfilled and filled coating binder samples. Shown are the data for the untreated samples and the 5% and 8% blends for each coating material. The effect of filler appears to flatten out the aging of the sterol containing filled binder blends. Both the unfilled and filled untreated samples have similar values of Tin-Critical at zero aging time, but the trend lines diverge to the point where after 40 hours of PAV aging Tm-Critical for the filled binder is 8.6° C. colder than the unfilled binder. For the 5% sterol samples the filled sample has 15° C. colder Tm-Critical value and for the 8% blends the filled sample has a 12.75° C. colder Tm-Critical value. Also, the 8% sterol filled binder exhibits a lower slope than any of the other samples, which implies that this sample will not be affected much by additional aging. Once again it is worth pointing out that based on sterol concentration as a percent of binder the filled asphalt sterol concentration is higher because of the filler and the fact that sterol concentration was based on the filled mass and not on the binder mass only.

Figure 11:
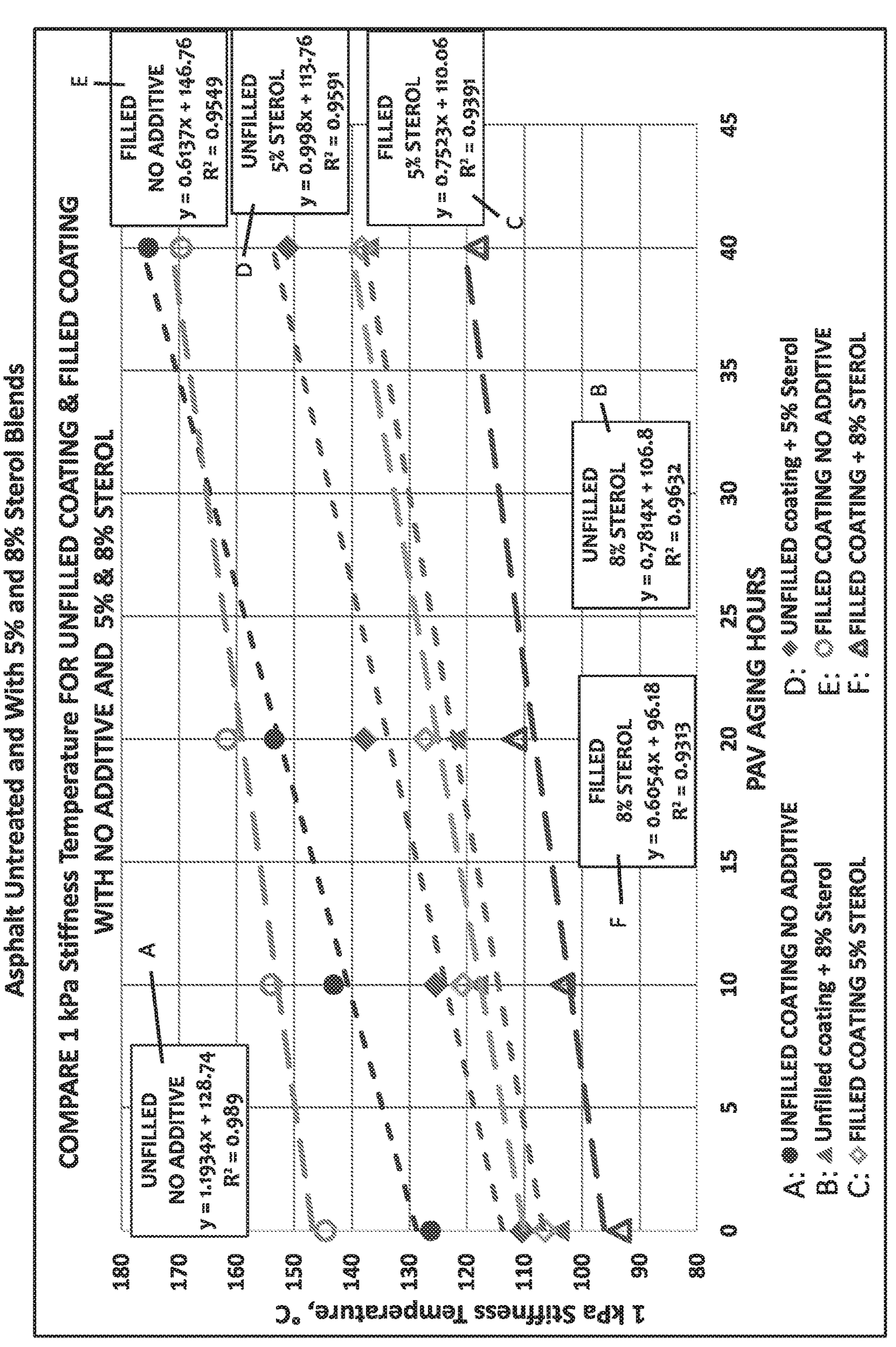
FIG. 11 graphically represents the comparison of temperatures at which the unfilled and filled coating asphalt reaches a stiffness of 1 kPa when the unfilled and filled coating asphalt contain zero percent, 5% and 8% sterol by weight of the coating asphalt samples.

FIG. 11 is a comparison plot of the 1 kPa stiffness temperature for the filled and unfilled coating binders in the untreated condition and with 5% and 8% sterol loading. The data shows that the addition of sterol to filled coating reduces the high temperature aging rate of the filled coating for each comparison sample, however this can be due to the sterol to binder dosage difference between the unfilled and filled samples. Regardless of the dosage difference the data plotted in FIG. 11 shows that it is possible to decrease the 1 kPa stiffness temperatures for the filled binder compared to the unfilled binder and to also decrease the high temperature aging rate of the filled system relative to the unfilled system.

Example 4

For these experiments, PG 58-28 asphalt binder was aged in thin films at 135° C. for an average of 70-72 hours to simulate an aged asphalt binder. To the aged asphalt binders are added varying sterol amounts. The sterol is available from MP Biomedicals, Solon, Ohio, Catalog No. 02102886-(beta-Sitosterol ~40-60%; campesterol ~20-40%; Stigmasterol-5%) and referred herein as the sterol), or no additive to serve as a control. All samples were tested as blended with no further aging or further aged in Pressure Aging Vessel (PAV) according to established aging conditions used in the paving industry (see, for example, ASTM D6521). At the unaged condition (viz., no further PAV aging) and after each aging cycle the high temperature PG grade results were determined using ASTM 7175 "Standard Test Method for Determining the Rheological Properties of Asphalt Binder Using a Dynamic Shear Rheometer," $T_{S\text{-}Critical}$, $T_{m\text{-}Critical}$, and ΔTc were obtained from 4 mm Dynamic Shear Rheometer data following test procedures developed by Sui, et al[1]. Asphaltenes were determined as n-heptane insolubles according to ASTM D3279. The high temperature stiffness properties of all samples at all aging conditions was determined using ASTM D7175 and low temperature properties were determined using 4 mm Dynamic Shear Rheometer (DSR) procedure according to (Sui C. 2010), (*Sui* C. F., 2011), (Farrar, 2012). Data analysis was performed using RHEA software (ABATECH, 2018) Using 4 mm DSR geometry is it possible to determine the low temperature limiting stiffness (S-value) grade and low temperature limiting relaxation (m-value) grade of the bitumen after each aging step. These parameters will be referred to TS-Critical and Tm-Critical respectively. Based on these data the parameter Delta Tc (ΔTc) is calculated as (TS-Critical−Tm-Critical) which is an industry adopted modification of work reported by Anderson et al (Anderson, 2011). IATROSCAN analysis and Fourier-transform infrared spectroscopy (FTIR) data was collected for all samples at all aging conditions. IATROSCAN analysis is done using an IATROSCAN TH-10 Hydrocarbon Analyzer and the procedure used is described in J-F. Masson, T. Price, and P. Collins, "Dynamics of Bitumen Fractions by Thin-Layer Chromatography/Flame Ionization Detection", *Energy & Fuels* 2001, 15, 955-960, and Baumgardner, G. L., Masson, J. F., Hardee, J. R., Menapace, A. M. and Williams, A. G., 2005. Polyphosphoric acid modified asphalt: proposed mechanisms. *Journal of the Association of Asphalt Paving Technologists,* 74, pp. 283-305. And Baumgardner, G. L., 2015. *Characterization and implementation of ground tire rubber as post-consumer polymers for asphalt concrete.* Mississippi State University. Briefly, Asphalt binders are deasphaltened according to ASTM Method D-3279 "Standard Test Method for n-heptane Insolubles" to yield asphaltenes (A) the n-heptane insoluble portion and maltenes (Resins (R), Cyclics (C), and Saturates (S)) which is the n-heptane soluble portion.

[1] Changping Sui et al., "New Technique for Measuring Low-Temperature Properties of Asphalt Binders with Small Amounts of Material." Transportation Research Record, Transportation Research Board, Washington, DC, U.S., Vol. 2179, 1 Dec. 2010, pages 23-28.

Spectroscopy FTIR data was collected for all samples at all aging conditions.

This example shows that sterol slows or retards the aging rate of asphalt binder. This example also shows that a sterol-containing asphalt binder can be re-used or re-cycled to serve as the age-retarding sterol.

Figure 12:
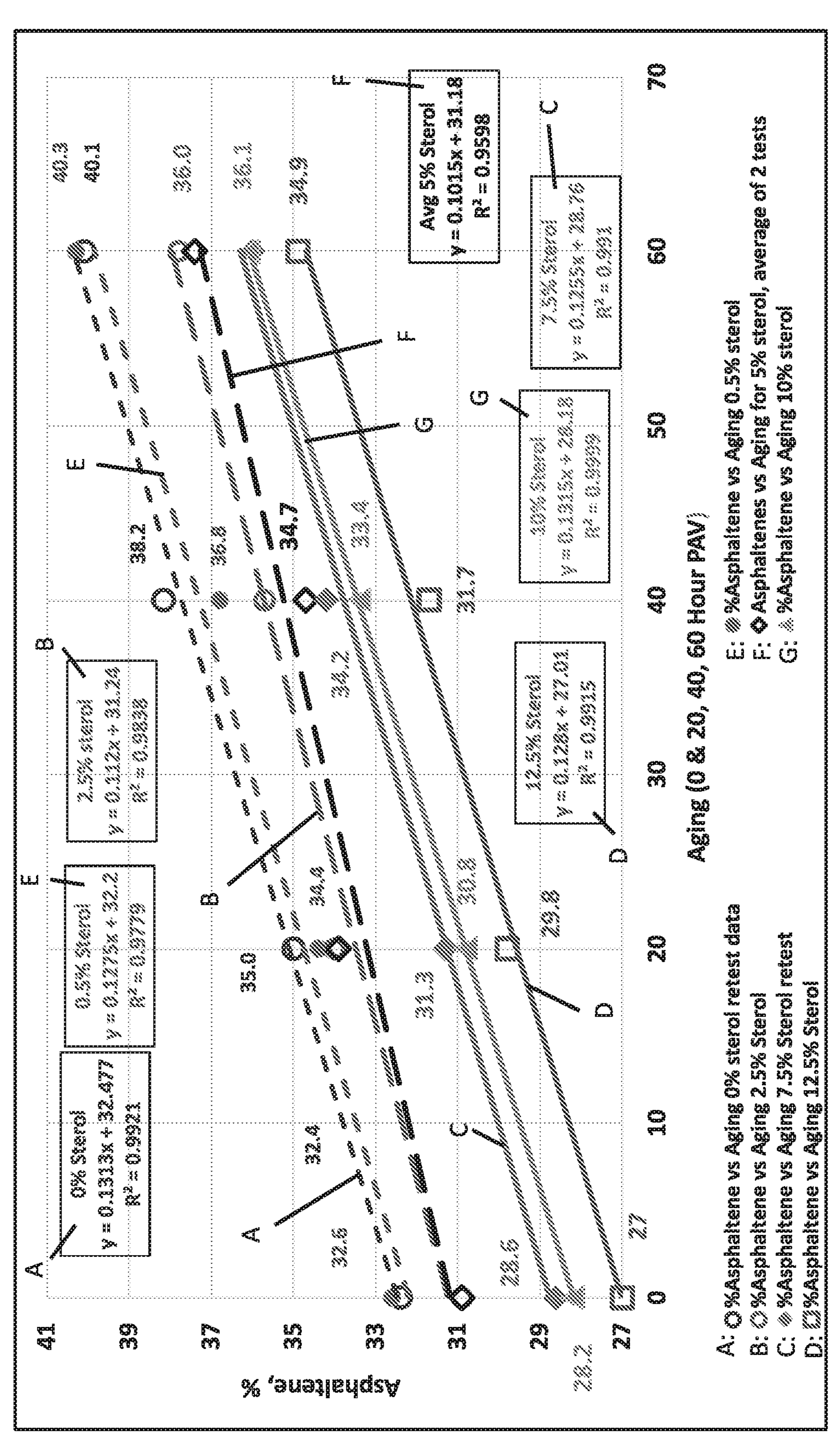
FIG. 12 is a plot of asphaltene concentration as a function of binder aging time in the PAV for an aged, non-air blown base binder with various sterol loadings.

To laboratory aged binder was added with varying dosage levels of sterol, 0, 0.5%, 2.5%, 5%, 7.5%, 10%, and 12.5% and each sample was aged for an additional 20, 40 and 60 hours in the Pressure Aging Vessel (PAV) following ASTM D6521. FIG. 12 shows 12.5% sterol blend after 60 hours of aging has asphaltene content of 34.9% which is comparable to the asphaltene content of the 0% and 0.5% blends after 20 hours of aging. That amounts to three times more aging for the 12.5% bitumen compared to the untreated sample. The 5% sterol sample has asphaltene level of 34.7% asphaltenes after 40 hours of aging which is comparable to the unaged sample after 20 hours of aging.

Figure 13:
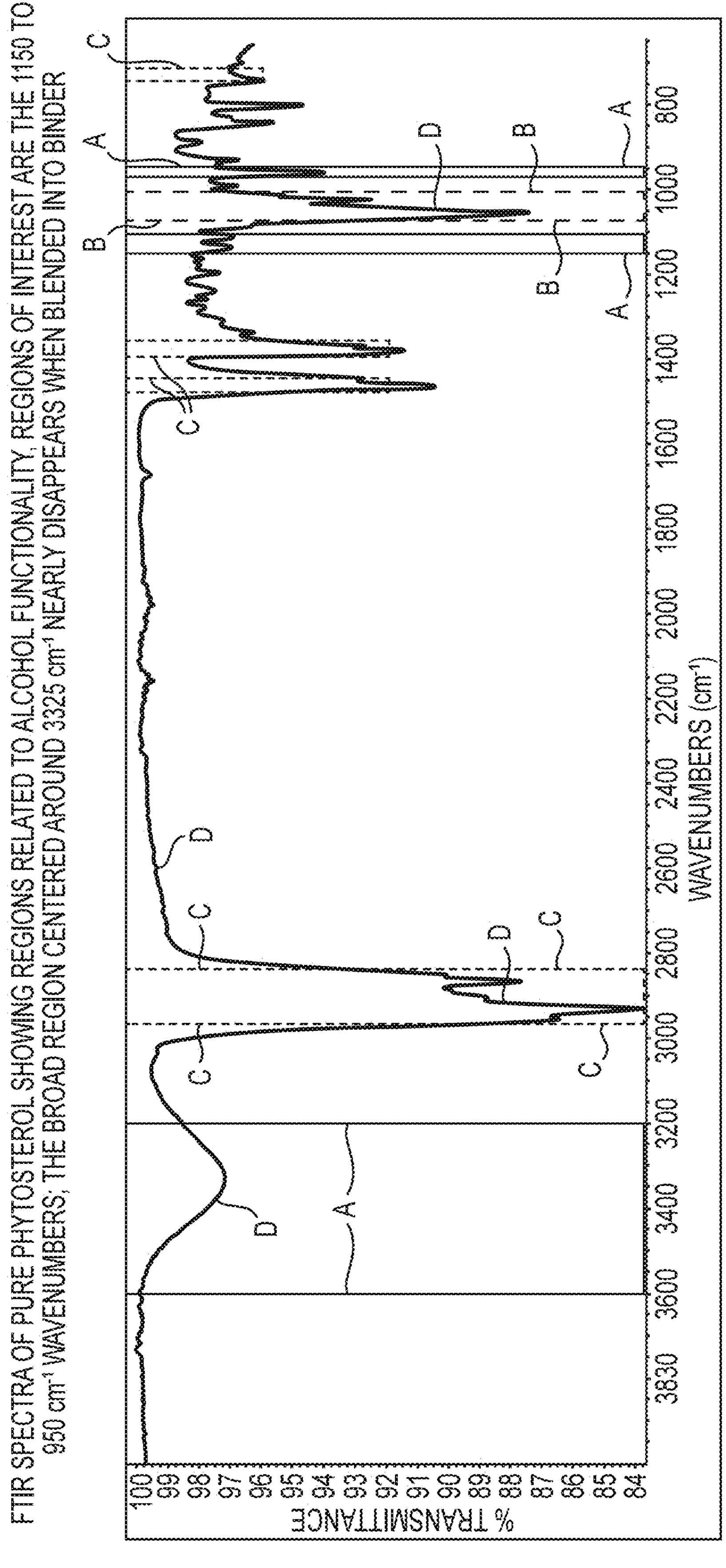
FIG. 13 is a Fourier Transform Infrared (FTIR) spectra of pure phytosterol.
Figure 15:
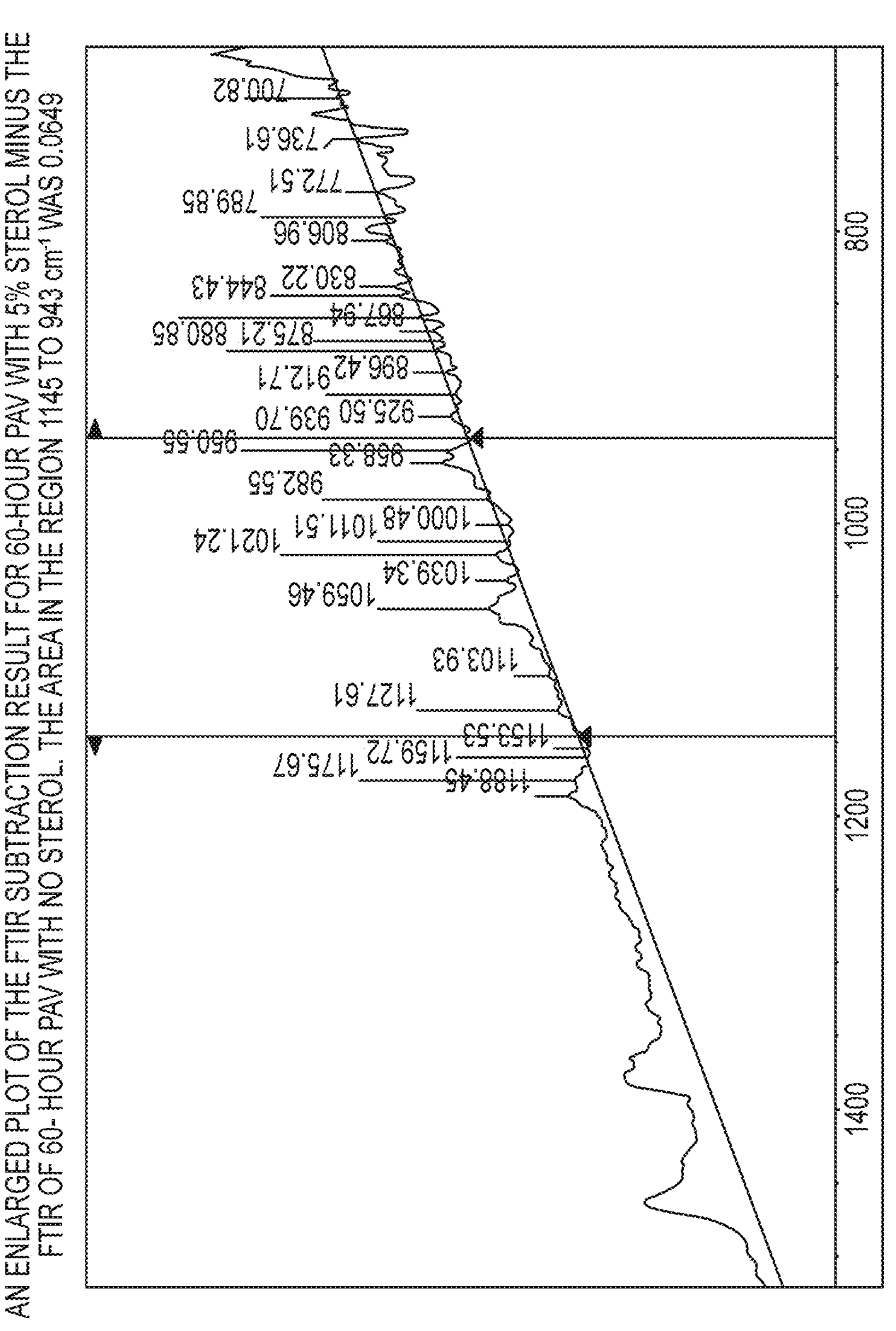
FIG. 15 is an enlarged plot of the FTIR subtraction spectrum result for 60-hour PAV with 5% sterol minus the FTIR of 60-hour PAV with no sterol.
Figure 17:
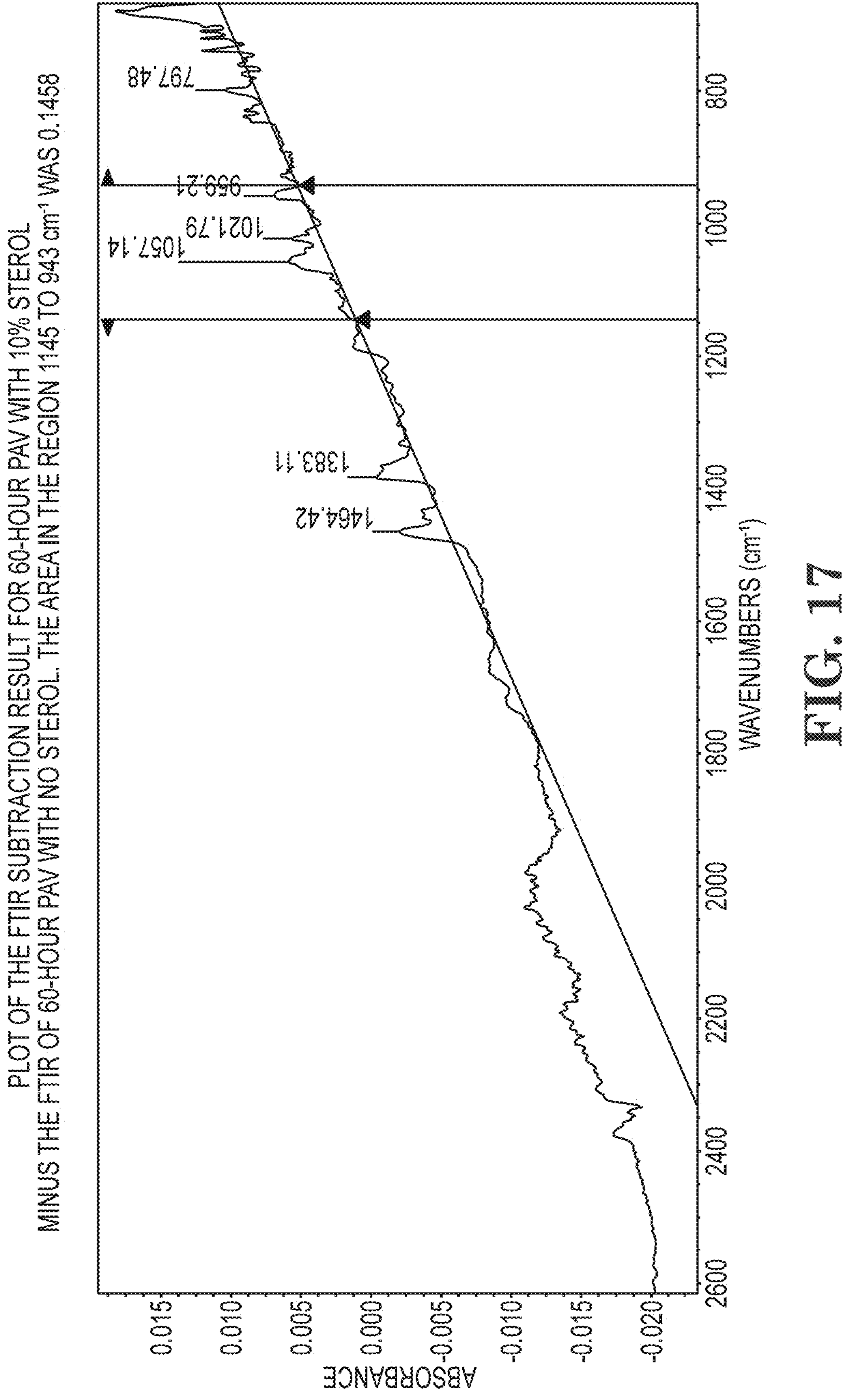
FIG. 17 is a plot of the F lilt subtraction spectrum result for 60-hour PAV with 10% sterol minus the F spectrum of 60-hour PAV with no sterol. The plot shows the area in the region 1145 to 943 cm-1 was 0.1458.

These samples were also evaluated by FTIR plots of aged binder with different levels of sterol at aging times ranging from 0 to 60 hours in the PAV. FIGS. 13 and 14 are FTIR spectra of pure phytosterol showing the wavenumber regions relevant to the sterol $OH^{-1}$ functionality FIG. 13 and FIG. 14 shows the spectral region used to quantify the sterol functionality after blending with binder followed by aging. FIG. 15 shows the FTIR results for the spectra of the 60 hour PAV of the control binder subtracted from the FTIR spectra of the 60 hour 5% sterol blend and FIG. 16 shows the FTIR results for the 60 hour PAV of the control binder subtracted from the FTIR spectra of the 50/50 blend of the 60 hour PAV with no sterol and the 60 hour PAV of a 10% sterol blend in the same starting binder. Comparing the F FIR spectra in FIGS. 15 and 16 shows that the sterol region covering wavenumbers 1145 $cm^{-1}$ to 943 $cm^{-1}$ are similar in appearance and quantification. The results in FIG. 15 are for a sample with 5% sterol that was aged for 60 hours while the results in FIG. 16 are for data of two 60-hour aged samples combined in equal amounts, one with no sterol and one with 10% sterol. The FIG. 15 data shows for the 5% sterol sample that sterol is still present after 60 hours of aging and the FIG. 16 data shows that when the 10% sterol sample was blended with an equal amount of bitumen with no sterol the results match the 5% sterol sample in FIG. 15. The only way this can occur is if the 10% sterol was not consumed during the aging of the 10% sterol binder. FIG. 17 is the subtraction spectra result for the 60-hour aged 10% sterol blend used to produce FIG. 16. Based on the quantification data in FIG. 17 the sterol area is slightly more than double that of the same spectral regions in FIGS. 15 and 16. This suggests that the full 10% sterol is present in the sample prior to blending with the 0% sterol sample.

Example 5

Figure 18:
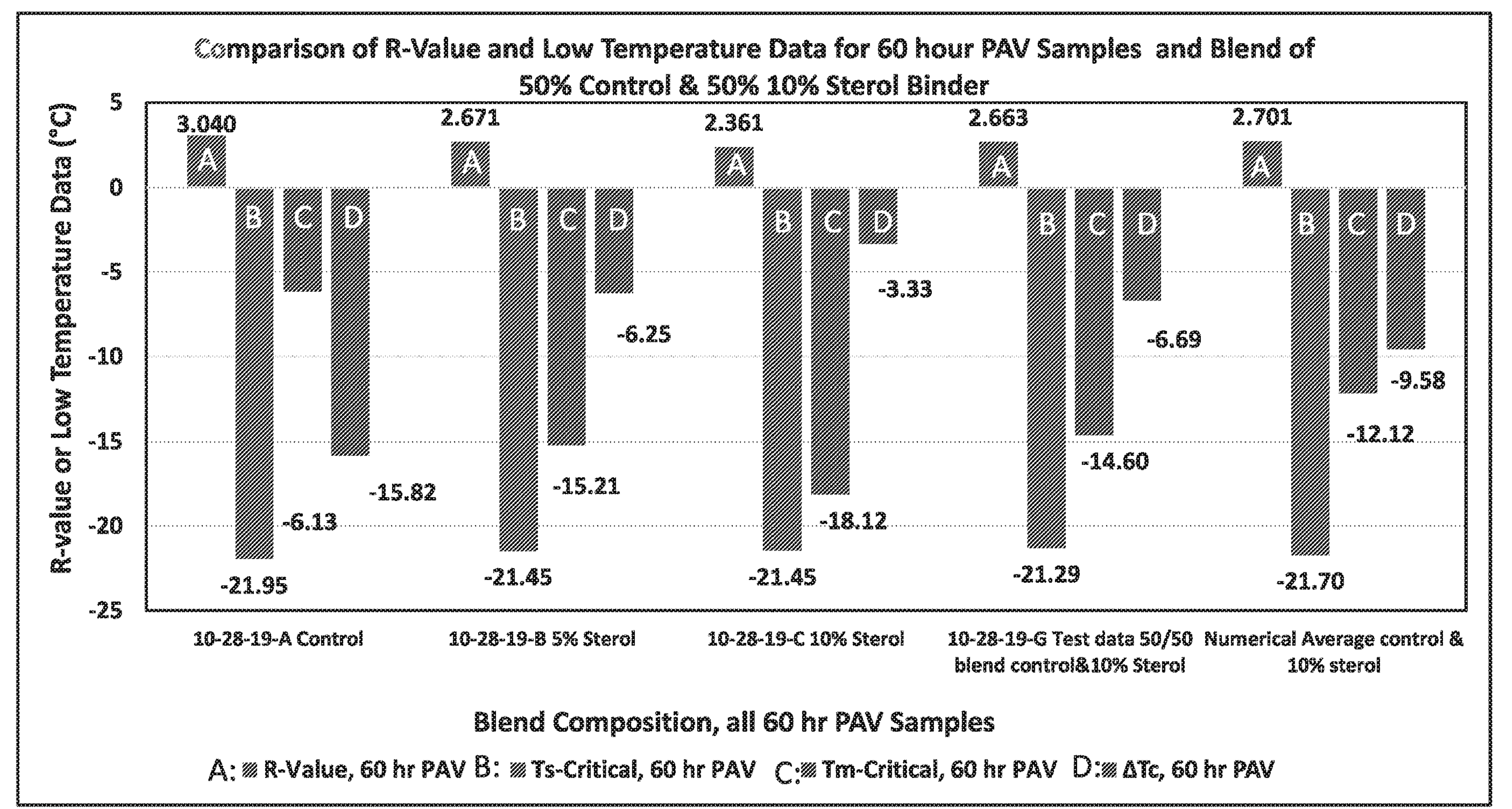
FIG. 18 is a comparison of R-value and low temperature property data for 50% aged binder with 10% sterol blended with aged binder containing no sterol for 60-hour PAV samples.
Figure 19:
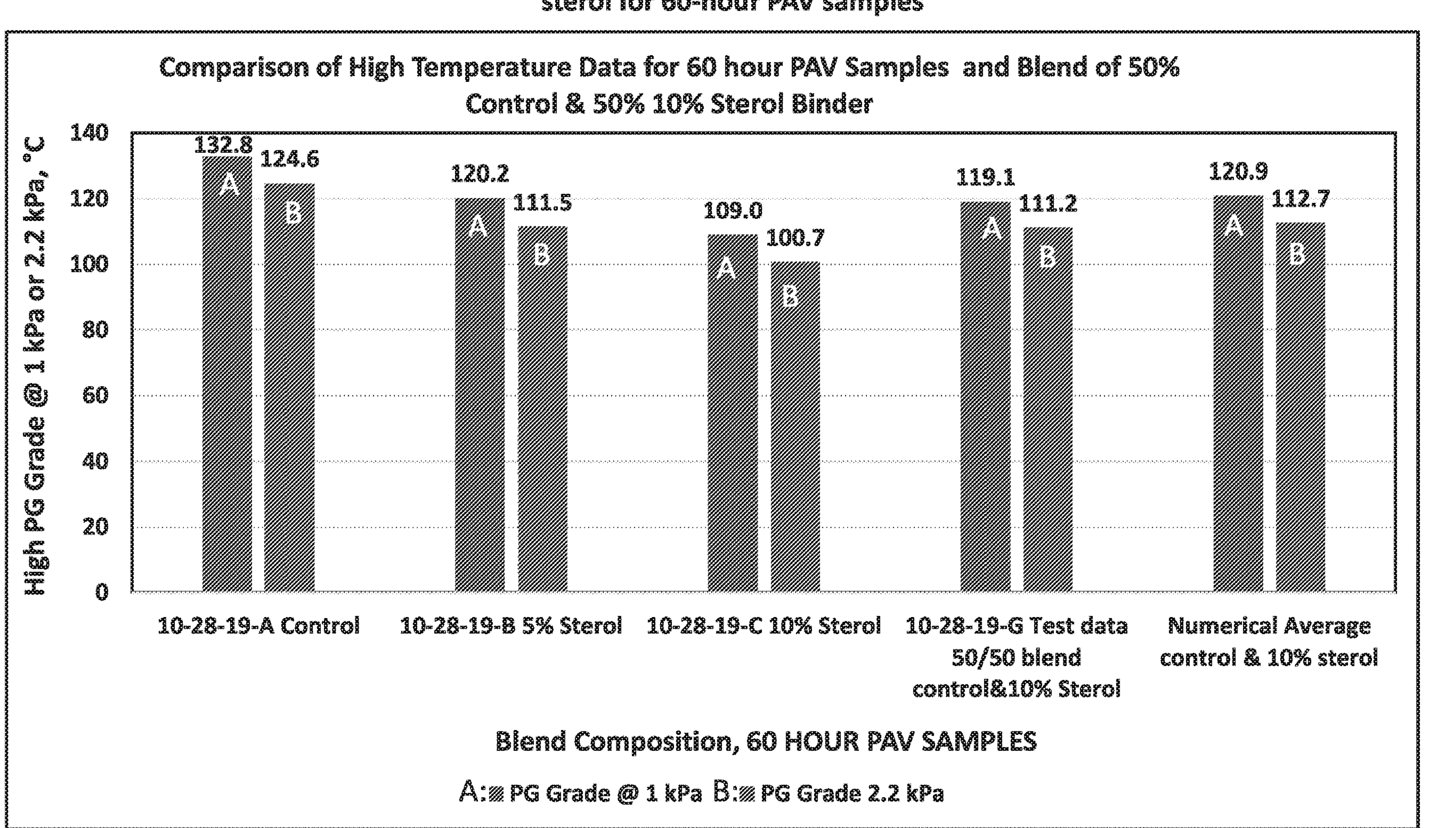
FIG. 19 is a high temperature PG grade comparison for 50% aged binder with 10% sterol blended with aged binder containing no sterol for 60-hour PAV samples.

The reclaimed sterol already present in an aged asphalt binder was tested to determine if it can serve as a source of an age-retarding sterol additive. 20 grams of the 60 hour PAV sample with 10% sterol was blended with 20 grams of the 60 hour PAV sample of control binder with no sterol. This would mean that the final blend contained a theoretical amount of 5% sterol if none of the sterol was consumed. If the assumption of no sterol loss is valid the high temperature and low temperature properties should be similar to the data for the 60-hour 5% sterol blend. FIG. 18 shows R-Value and low temperature data for 60-hour PAV aged samples of the aged base binder control, 5% and 10% sterol, and a 50/50 physical blend of 10% sterol and the control. Also shown for comparison is the numerical average of data for the 10% sterol and control samples. The data in FIG. 18 shows that numerical average and data for the 50/50 physical blend are somewhat similar but not identical. The R-Values for the 5% sterol sample and the 50/50 physical blend are very close whereas the numerical average is higher. This numerical average result means that the more substantial aging of the control skews the R-Value data of the 50/50 averaged blend towards the R-Value of the control binder. The same is true of the Tm-Critical data and the ΔTc data. The numerical average for Tm-Critical is 2.5° C. warmer than the 50/50 blend data. Because the Ts-Critical data is similar for all samples the resulting ΔTc data shows the numerical average is nearly 3° C. more negative than ΔTc for the 50/50 physical blend. The high temperature data shown in FIG. 19 shows the numerical average values are skewed towards the high temperature values of the control while the results for the 50/50 blend are within 1° C. of the original 5% sterol sample.

Figure 20:
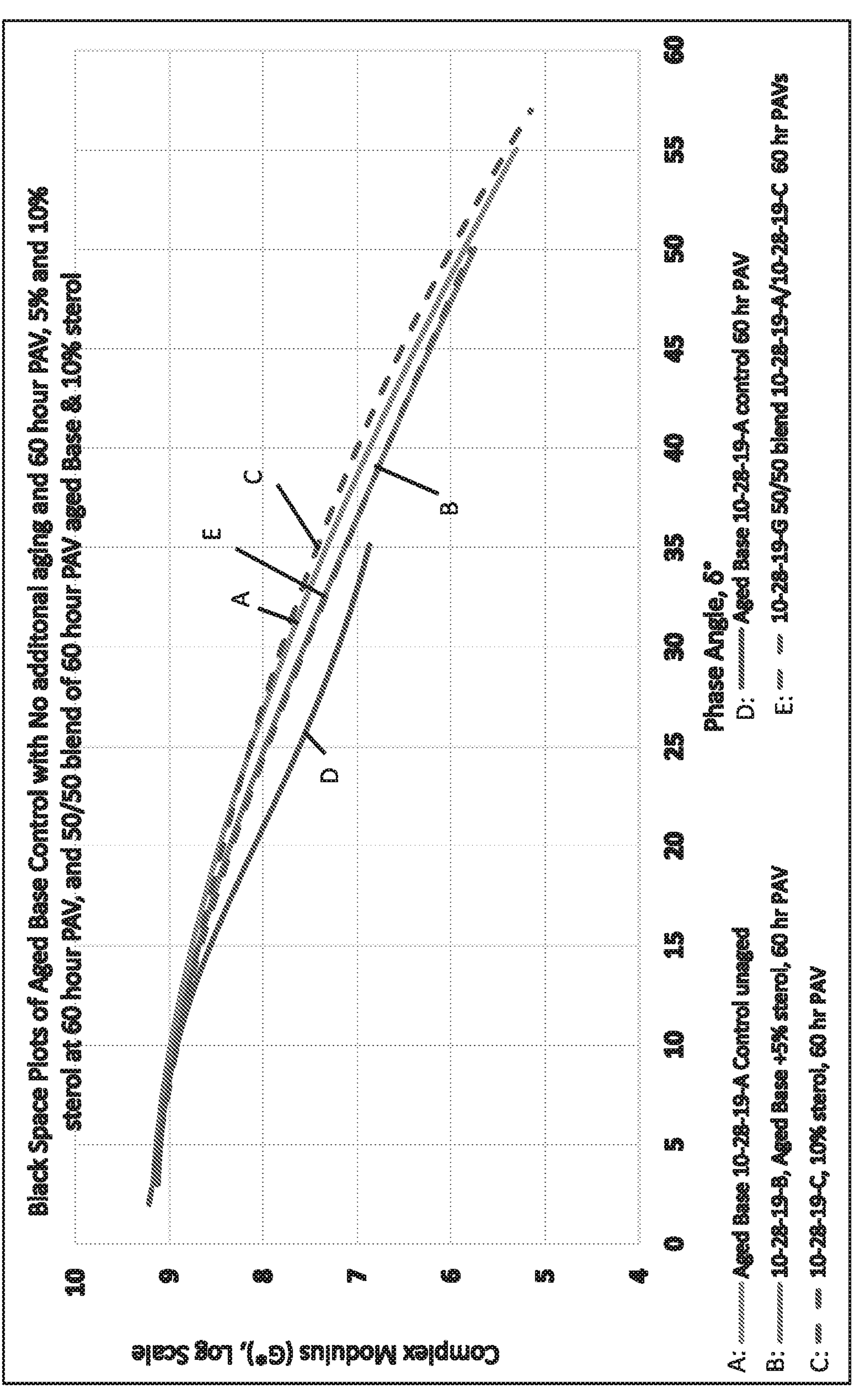
FIG. 20 is a Black Space plot of aged base control with no additional aging and 60 hour PAV, 5% and 10% sterol at 60 hour PAV, and 50/50 blend of 60 hour PAV aged base & 10% sterol.

FIG. 20 shows the Black Space plots for several of the blends discussed above. A Black's plot is a plot of complex modulus (G*) in log scale as a function of phase angle in linear scale. This graphical arrangement is referred to as "Black Space". FIG. 20 shows Black's plots for the aged base control prior to any additional PAV aging and also the aged base control after 60 hours of PAV aging. The data shows at 1E7 Pascals of stiffness the phase angle has shifted from 38.7° for the unaged sample to 33.2° for the 60-hour PAV sample. The 10% sterol sample aged for 60 hours has a slightly higher phase angle (approximately 40.3°) than the unaged control; this is another indication of the age retarding benefits of sterol. Also shown are the data for the 5% sterol sample at 60 hours of aging and the 50/50 blend of the 10% sterol sample and the control sample both aged for 60 hours. The Black space plots lie on the same line which means they are functionally the same material based on their physical properties FIG. 20. This data also suggests that the 10% sterol was present and viable in the 60-hour aged sample such that when blended with the 60-hour aged control the phase angle was shifted to a higher value consistent with the 5% sterol sample.

Example 6

Additional experiments were conducted to show that sterol is not consumed nor reacts with bitumen. In this experiment a PG 64-22 binder was used as the base material. Blends of 6% and 12% in the PG 64-22 were produced. All three binders were tested in the unaged condition and after aging for 60 hours in the PAV.

One aging period of 60 hours in the PAV was chosen because previous testing had shown a good linear relationship between PAV aging time and the resulting test properties and furthermore the purpose of this investigation is to show that after extended aging time the sterol is present in the aged binder and can be reclaimed and be still viable as an age retarding additive.

Additional blends produced were a. PG 64-22 aged 60 hours+6% sterol post added as a comparison to PG 64-22+6% sterol aged for 60 hours
b. PG 64-22 aged 60 hours+12% sterol post added as a comparison to PG 64-22+12% sterol aged for 60 hours
c. 50% PG 64-22 (0% Sterol) aged 60 hours+50% PG 64-22+12% sterol aged for 60 hours. This blend to be compared to PG 64-22+6% sterol aged for 60 hours If 60 hours of PAV does not consume the sterol then blends of binder plus sterol that undergo 60 hours of aging should have properties similar to PAV aged binder+fresh sterol post added. Further the 50/50 blend of aged materials to produce a 6% sterol blend should have properties comparable to the 60 hour aged PG 64-22 with 6% sterol post added.

Rheological properties of all blends were tested to determine high temperature and low temperature properties, Rheological Indices (R-Value) were calculated. Asphaltenes were determined using ASTM D1759 and the resulting maltene fraction was characterized using the IATROSCAN test procedure to determine saturates, cyclics and resins followed by calculation of colloidal index.

As a component of the IATROSCAN test procedure it was determined that sterol becomes part of the resin fraction as does most bio derived recycling and softening additives. However, unlike the bio derived additives, sterol shows up a separate peak within the resin elution area. The peak is present in unaged as well as in aged binders and is quantifiable by integrating the sterol region separately from the remaining resin area.

Black space plots were generated comparing log G* as a function of phase angle for the various blends described in above. The Black Space plots show that a 64-22+12% sterol blend aged for 60 hours follows the same data trace as PG 64-22 aged for 60 hours+12% sterol post added. Further the Black Space plots of blends pre-aged or aged binder plus post added 64-22 or a 50/50 blend of aged binder and aged binder plus 12% sterol to yield a 6% blend all follow the same Black Space data plot. The test properties of blends described above are shown in the figures discussed below.

Figure 21:
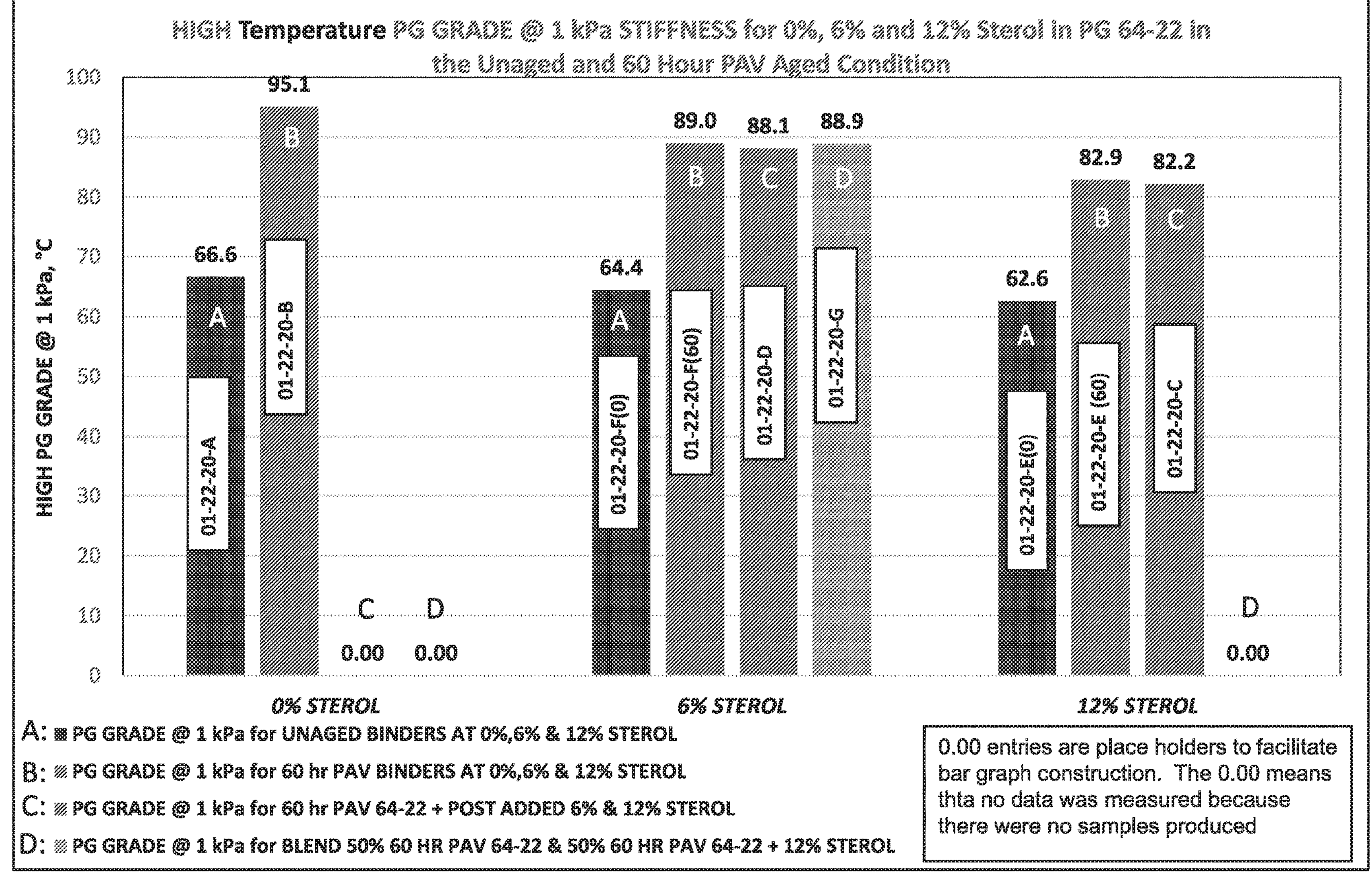
FIG. 21 is a high temperature PG grade at 1 kiloPascal of stiffness.
Figure 22:
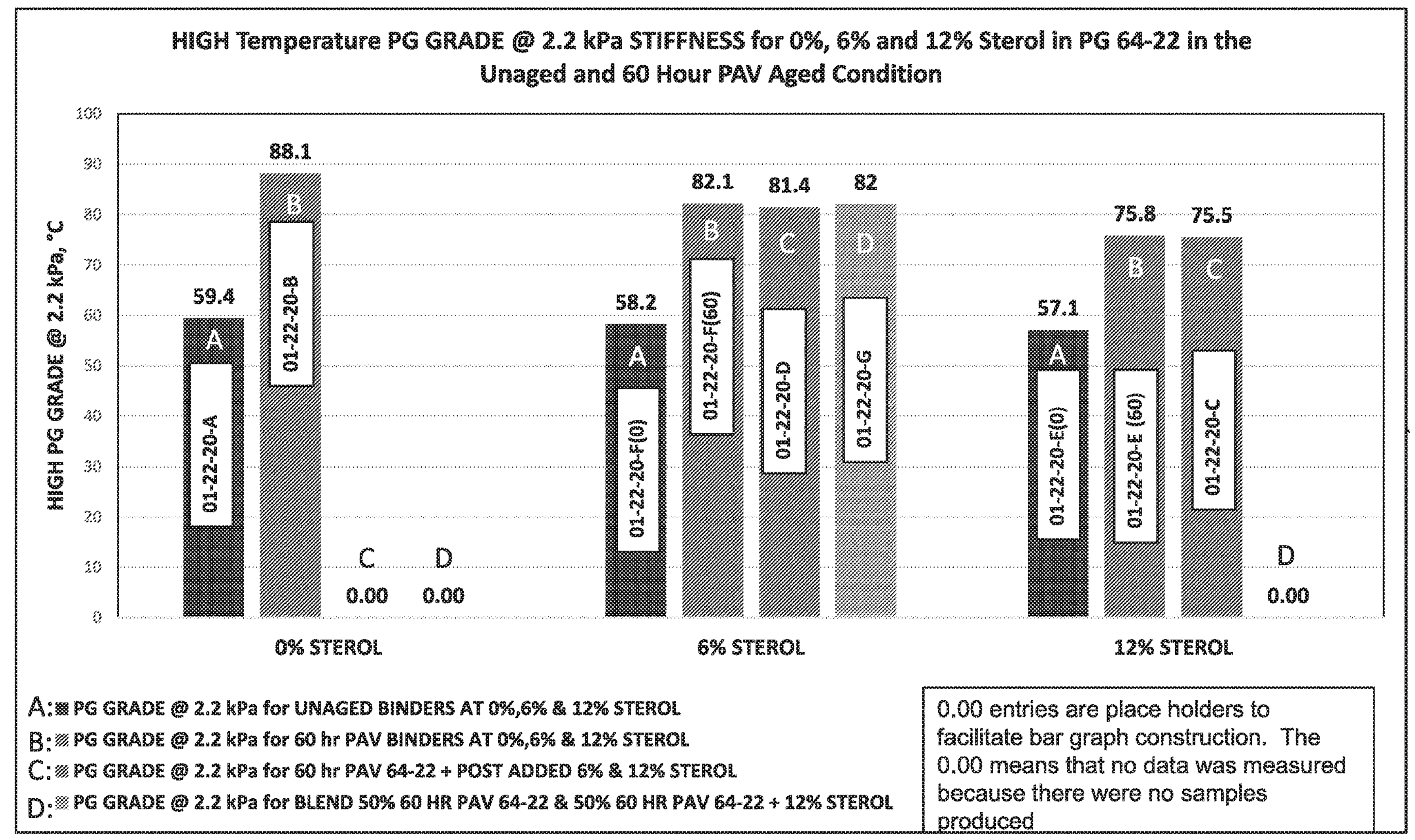
FIG. 22 is a high temperature PG grade at 2.2 kiloPascals of stiffness.

FIG. 21 and FIG. 22 show the high temperature PG grade of the binders at 1 kiloPascal of stiffness FIG. 21 and the high temperature grade at 2.2 kioPascals of stiffness FIG. 11 for PG 64-22+0% sterol, PG 64-22+6% sterol and PG 64-22+12% sterol. Also shown in these two figures. is the high temperature PG grade after 60 hours of PAV aging and for the blends described in above.

Figure 23:
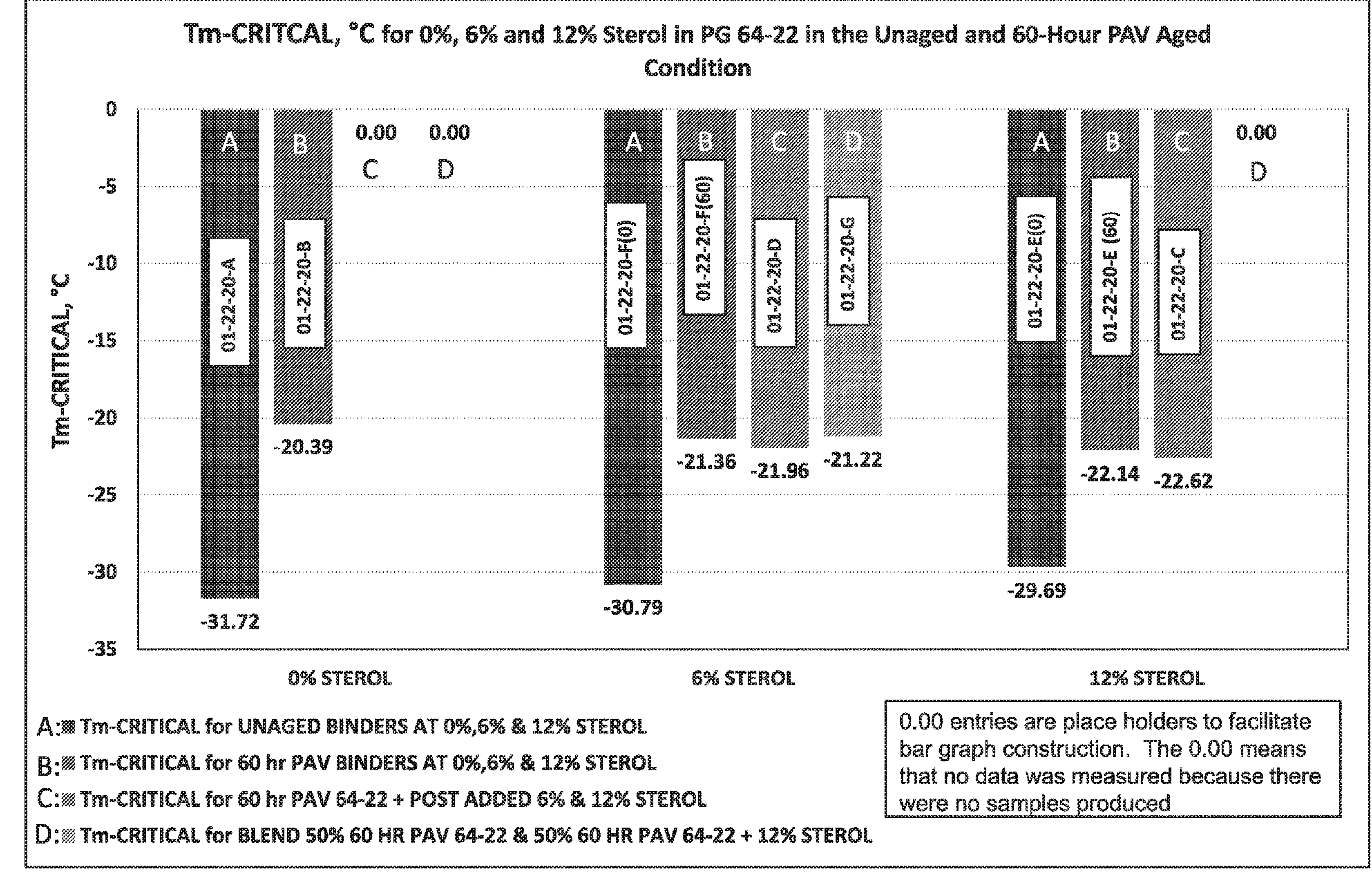
FIG. 23 is a plot of Tm-critical for 0%, 6% and 12% sterol in PG 64-22 unaged and 60 hour PAV aged.

FIG. 23 shows the low temperature creep critical properties (Tm-Critical) of the same blends described. The low temperature stiffness properties (TS-Critical) show similarity in properties, but because other than for the unaged binder samples Tm-Critical controls the low temperature PG grade of the binder and therefore it is the property of importance.

Figure 24:
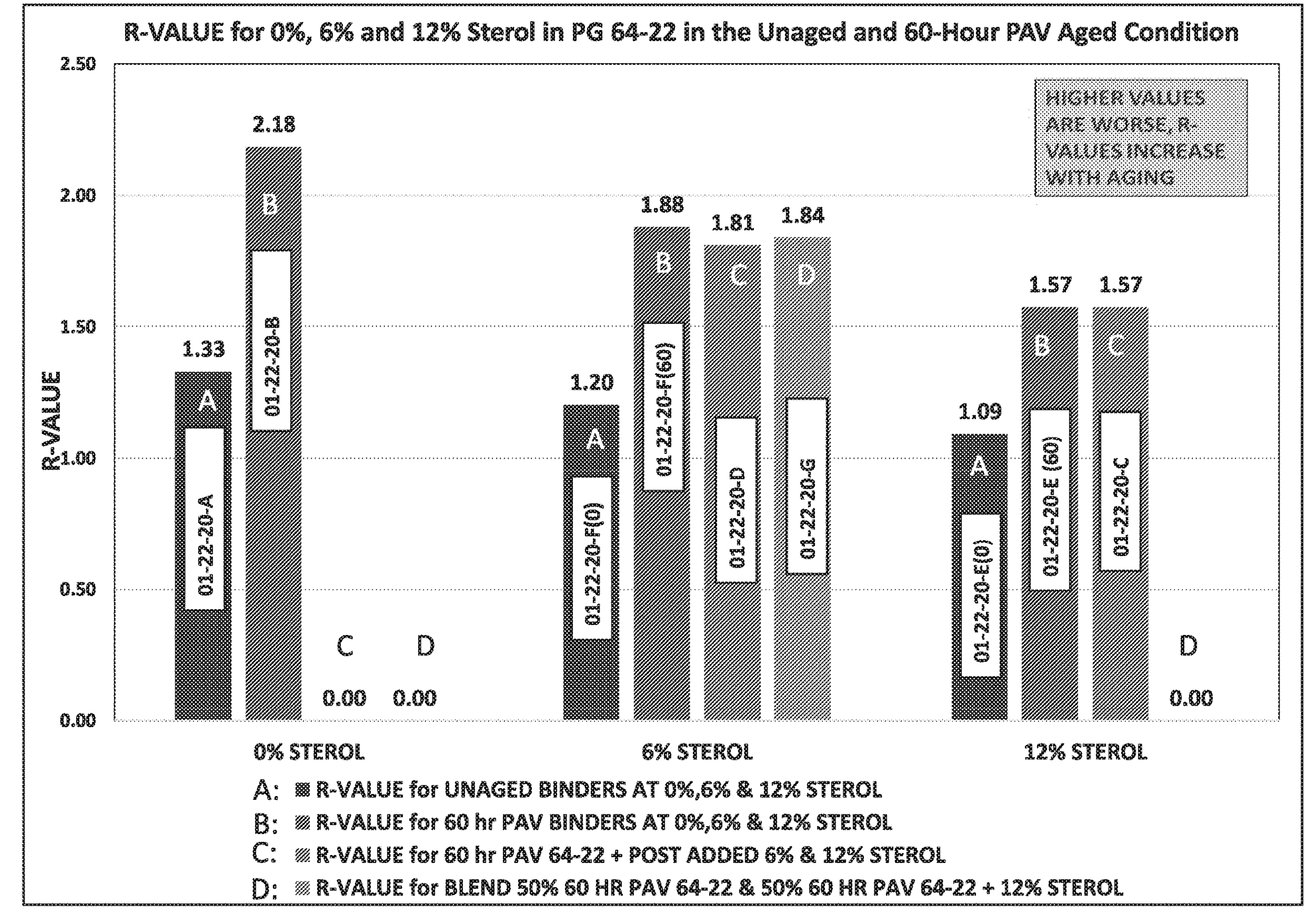
FIG. 24 is a plot of R-value for 0%, 6% and 12% sterol in PG 64-22 in the imaged and 60 hour PAV aged condition.

FIG. 24 shows the plot of R-value data for the unaged and aged blends with and without sterol. As binders age the R-value increases indicating reduced flexibility in the binder. A comparative examination of the Tm-Critical plots in FIG. 23 shows the samples with the lowest critical temperatures (viz. the best ability to relax low temperature thermal stress) are the samples with the lowest R-values in FIG. 24. FIG. 24 also shows that as sterol increases from 0% to 6% to 12% the R-values decrease both for the unaged and aged condition. Also, the blends that result in 6% sterol content have R-values within a value of 0.1 units regardless of whether the sterol was post added to an aged binder or preadded and then aged or whether two aged binders were blended to yield a final sterol concentration of 6%. The two 12% samples both post added and pre-added and aged have identical R-values.

Figure 25:
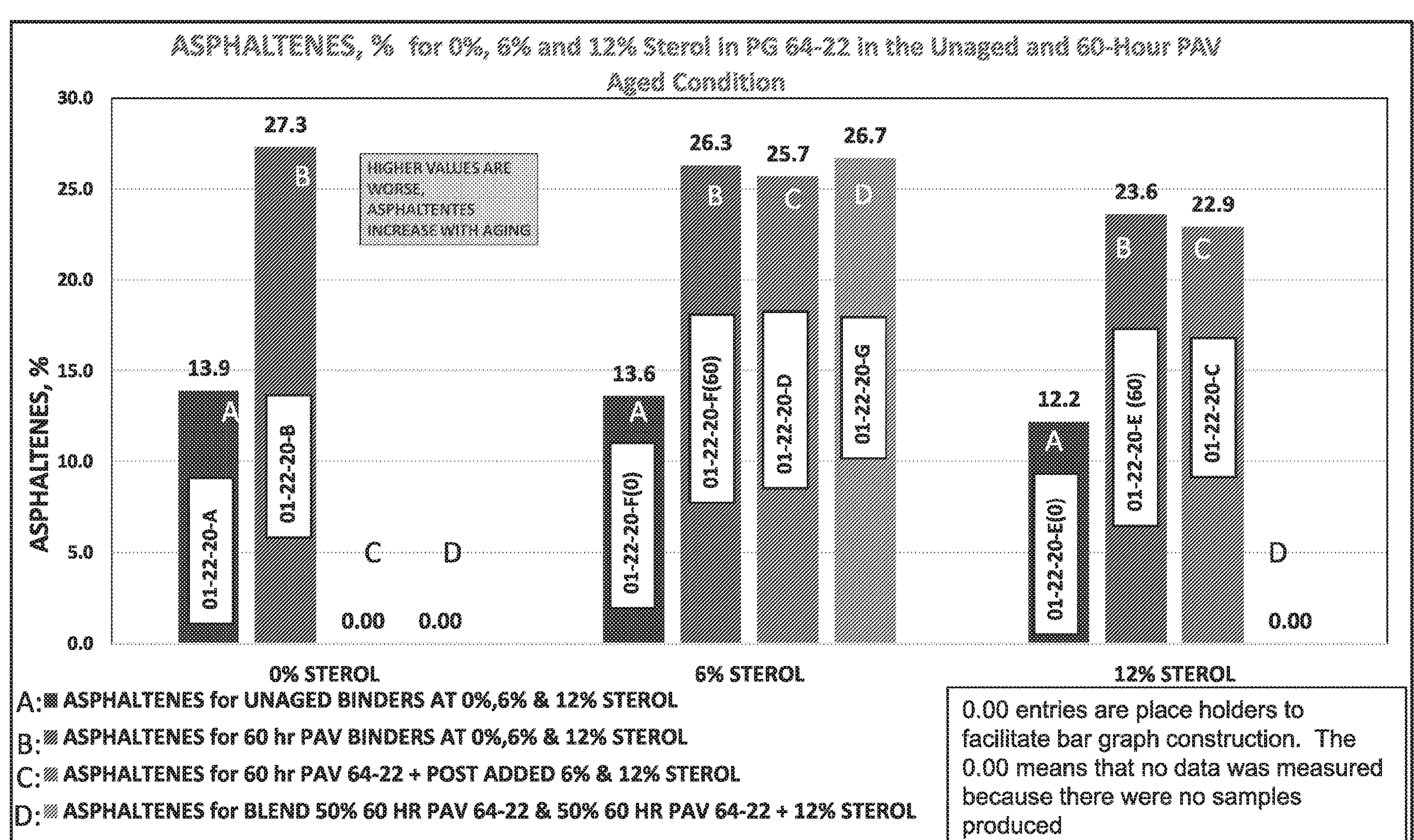
FIG. 25 is a plot of variation in percent asphaltenes due to aging and sterol content.

FIG. 25 shows the asphaltene content of the different binders with aging. The unaged binders show only small change in asphaltenes due to sterol addition. Even at 12% sterol the asphaltene decrease is 1.7%. After aging the difference is more pronounced. The 6% sterol addition only decreases the accumulation of asphaltenes by 1% to 1.6% and the 12% addition decreases the accumulation of asphaltenes by 3.7% to 4.4%. Both the blends with sterol post added to 60-hour PAV aged PG 64-22 are lower in asphaltenes than the blends with pre-added sterol followed by aging. This indicates that post added sterol is slightly more effective in disrupting binder aging compared to preadded and aging. However, the 50/50 blend of aged 64-22 and aged 64-22+12% sterol yielded a result very close to the 6% preblended and aged sample. These data are all similar and reflect that a similar amount of active sterol is present in the samples.

Figure 26:
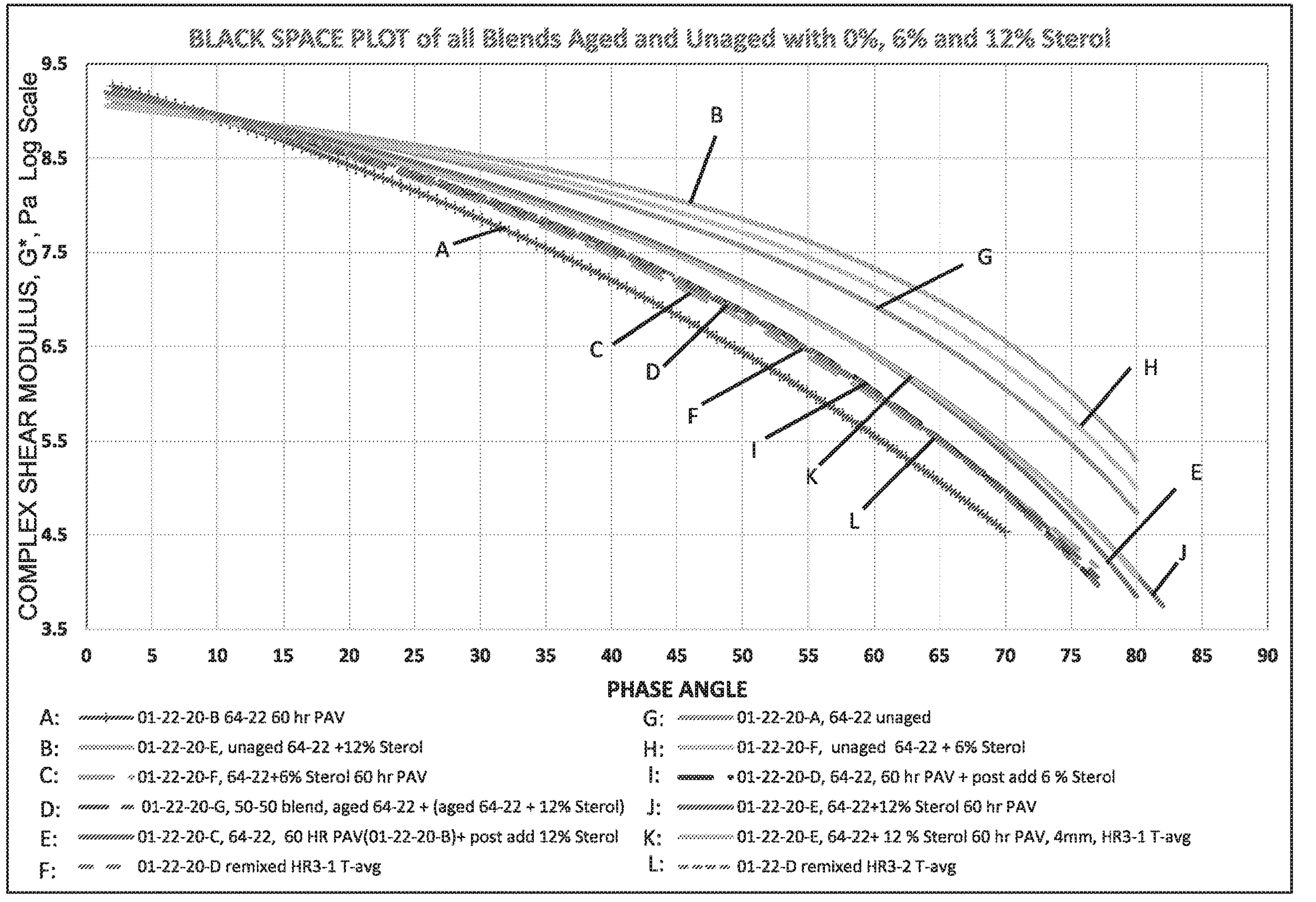
FIG. 26 is a Black Space plot of all blends aged and unaged with 0%, 6% and 12% sterol.
Figure 27:
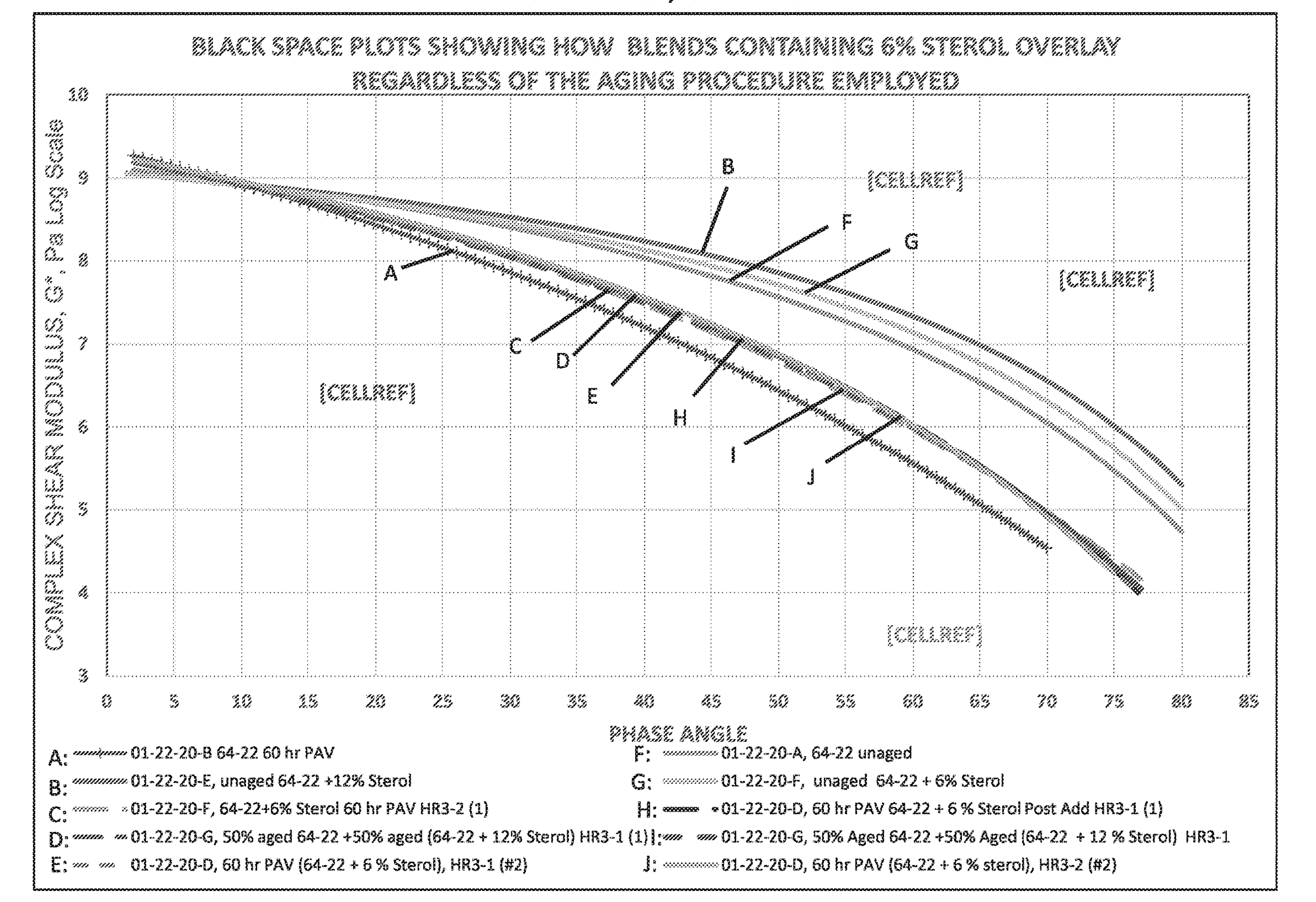
FIG. 27 is Black Space plots emphasizing that all blends containing 6% sterol follow the same Black Space data trace: the other data shows that 0%, 6% and 12% sterol blends follow different plot lines.
Figure 28:
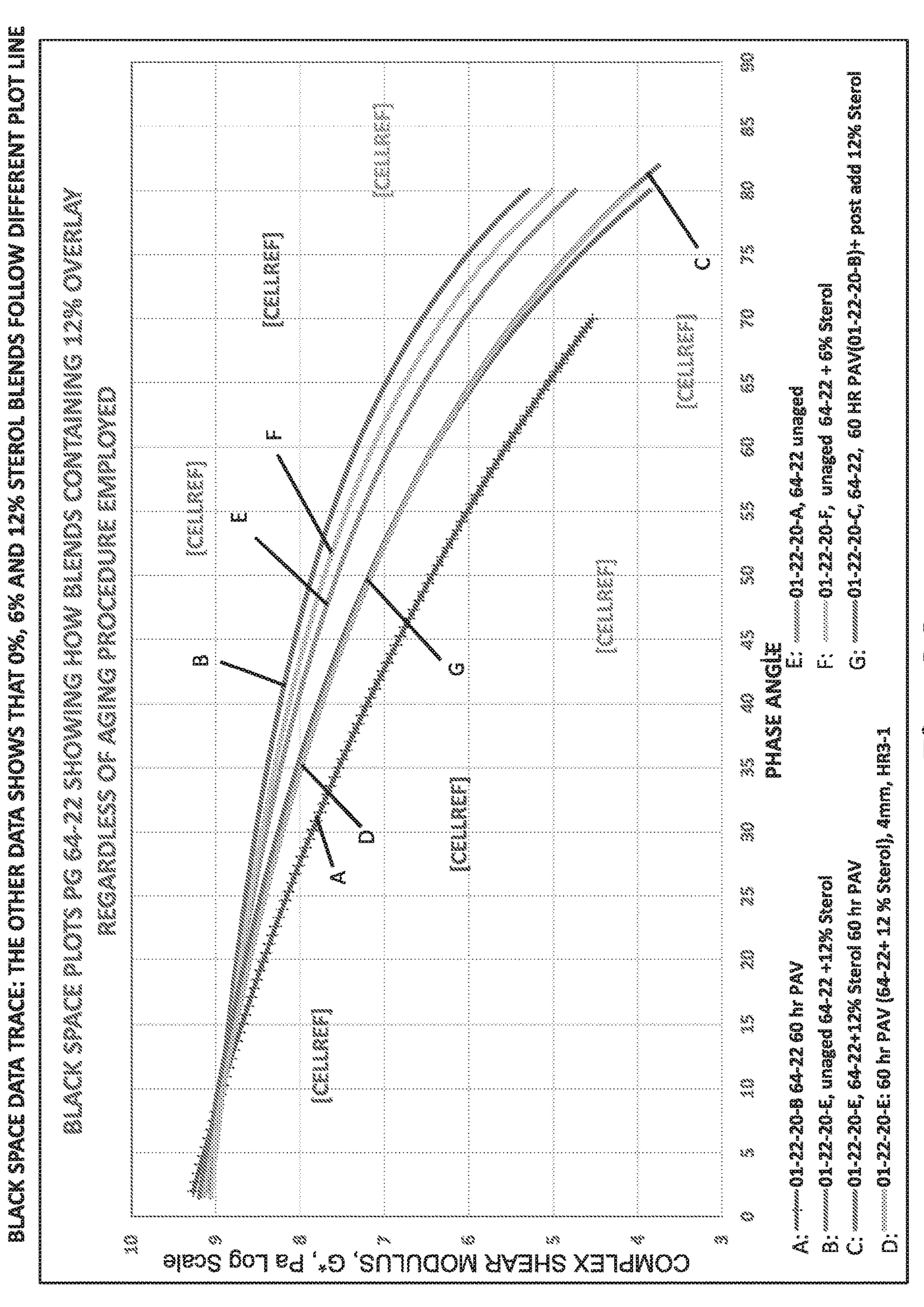
FIG. 28 is Black Space plots emphasizing that all blends containing 12% sterol follow the same Black Space data trace: the other data shows that 0%, 6% and 12% sterol blends follow different plot line.

FIG. 26 through FIG. 28 show Black Space plots for the results generated for the samples. FIG. 26 is a plot of all blends of PG 64-22 with 0%, 6% and 12% sterol imaged and aged plus the various blends described. The main points are that the 60 hour PAV of 64-22+12% plots the highest on the graph indicating that sample has the highest phase angle for any given complex shear modulus value. The higher the phase angle for a given modulus the more flexible is the binder. PG 64-22+6% sterol ranks second and the 0% sterol blend ranks third. PG 64-22+0% sterol aged for 60 hours has the lowest ranking. There are three plots of 12% sterol aged for 60 hours for the two samples. One sample was tested twice and results of both tests are plotted. The 60 hour PAV aged sample of pre-added 12% sterol and the 60 hour PAV of plain PG 64-22 with 12% sterol post added plot on the same Black Space line supporting the conclusion that there is no reduction in sterol properties due to aging. The Black Space plots of blends containing 6% sterol support this same conclusion. Multiple tests were performed on the 6% blends for both the pre-added and then reclaimed sterol blend, the blend with 6% sterol post added to PG 64-22 plain aged for 60 hours and the 50/50 blend of 60 hour aged PG 64-22 plain and 64-22+12% sterol aged for 60 hours. All these data plot on the same Black Space line.

FIG. 27 is plot of only the aged 6% sterol samples overlaid and FIG. 28 is a plot of only the aged 12% sterol samples to make it easier to observe the data.

IATROSCAN Data Analysis of PG 64-22 with 0%, 6% and 12% Sterol Plus Aging

Figure 29:
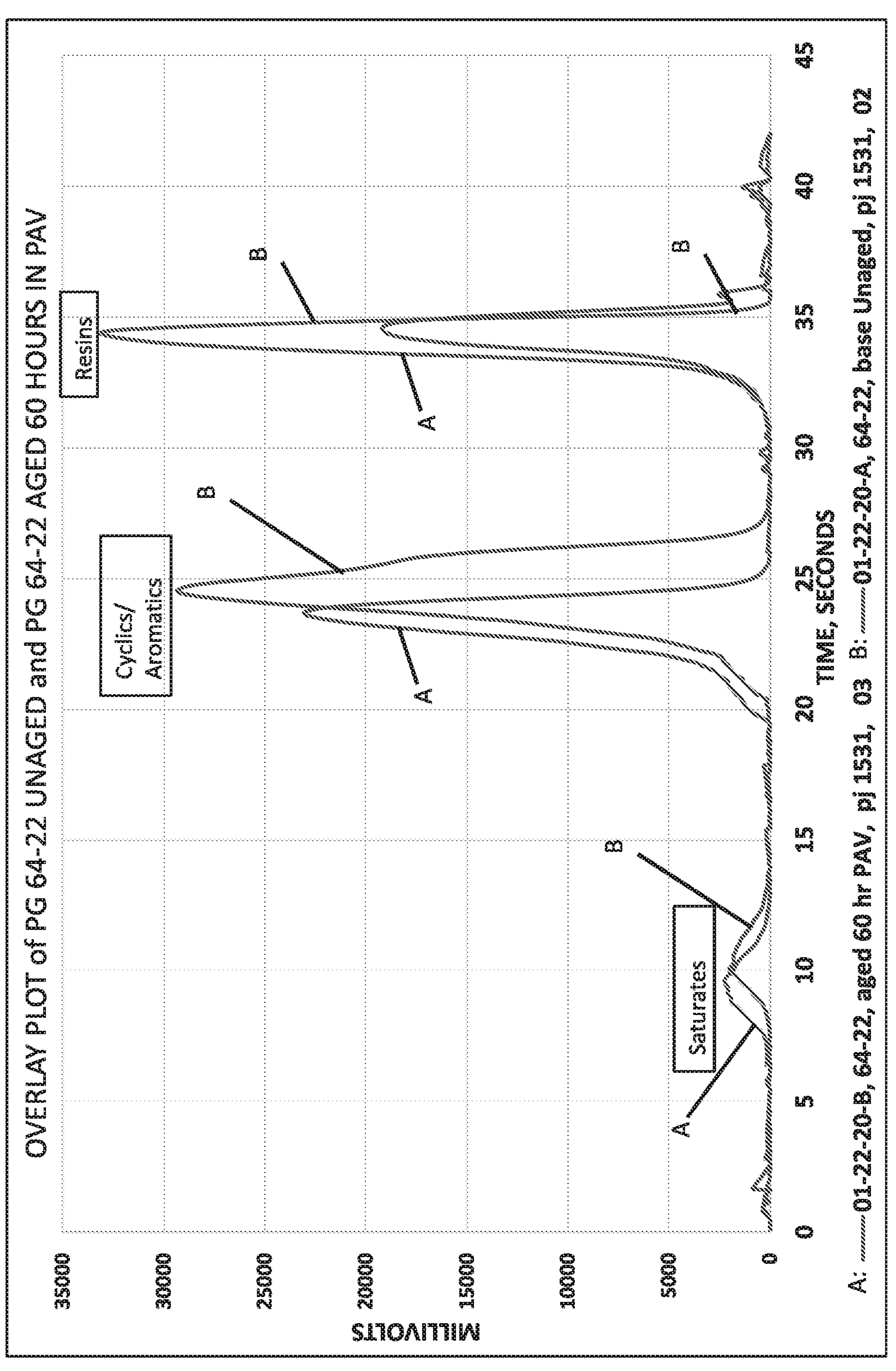
FIG. 29 overlay plot of IATROSCAN™ Flame Ionization Detector (FID) spectra for PG 64-22 imaged and PG 64-22 aged 60 hours in PAV.

When asphalt binder is aged the asphaltenes increase as has already been demonstrated by the data plot in FIG. 25. The material remaining after asphaltene removal is referred to as the maltene fraction and is comprised of three generic fractions which are characterized by their relative solubility and which can be separated chromatographically. These fractions are saturates or paraffinic compounds which are soluble in n-pentane, cyclics or aromatics which are soluble in a blend of toluene and chloroform and resins which have little solubility in the blend of toluene and chloroform. With aging the saturates change very little in concentration, cyclics decrease in concentration and the resins increase in concentration. FIG. 29 graphically shows the cyclics have decreased in volume and the resins have increased in volume and the saturates volume has remained relatively similar. At the same time the inset label in the plot identifies that asphaltenes have doubled.

Figure 30:
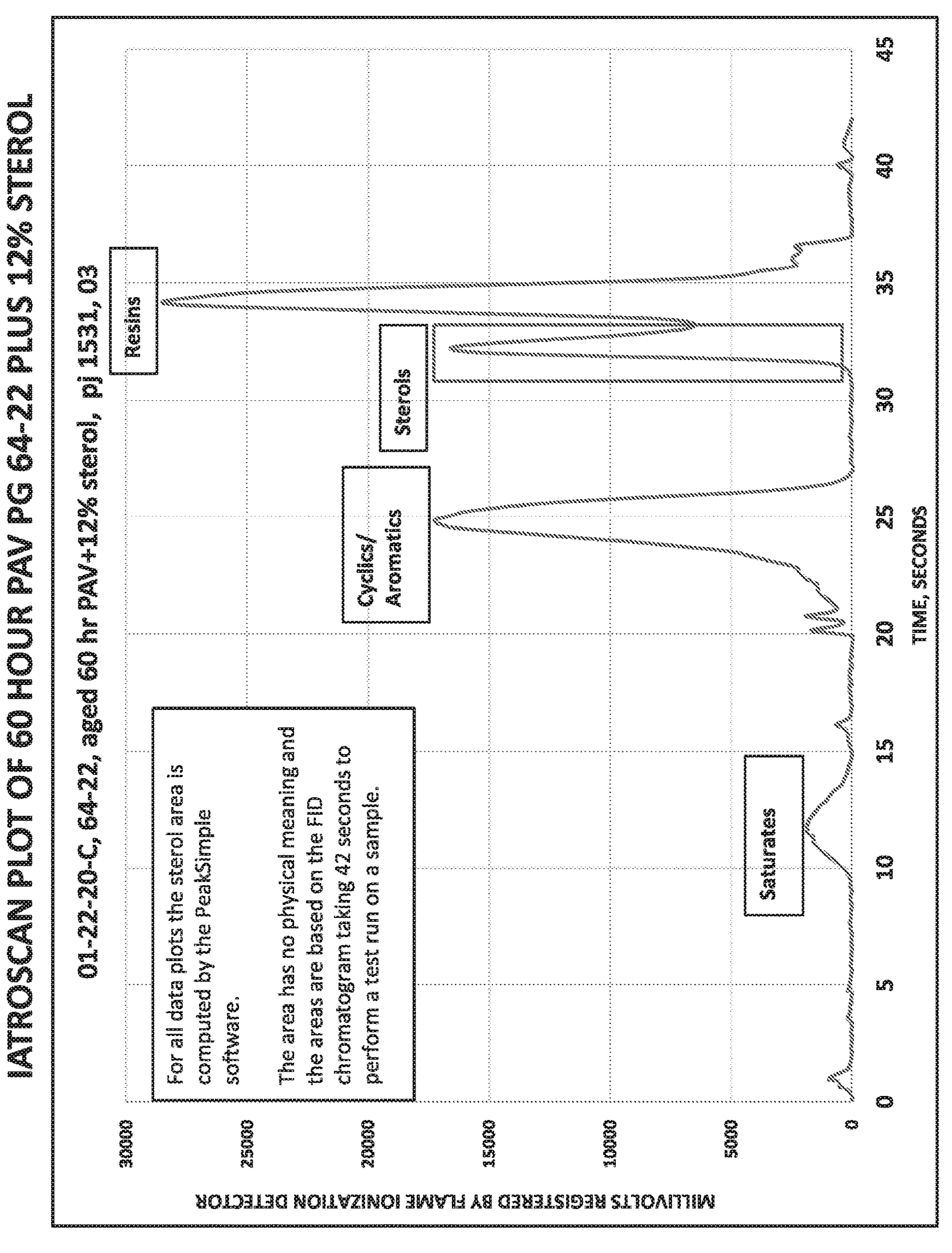
FIG. 30 is an IATROSAN (FID) spectra plot of 60 hour PAV PG 64-22 plus 12% sterol.
Figure 31:
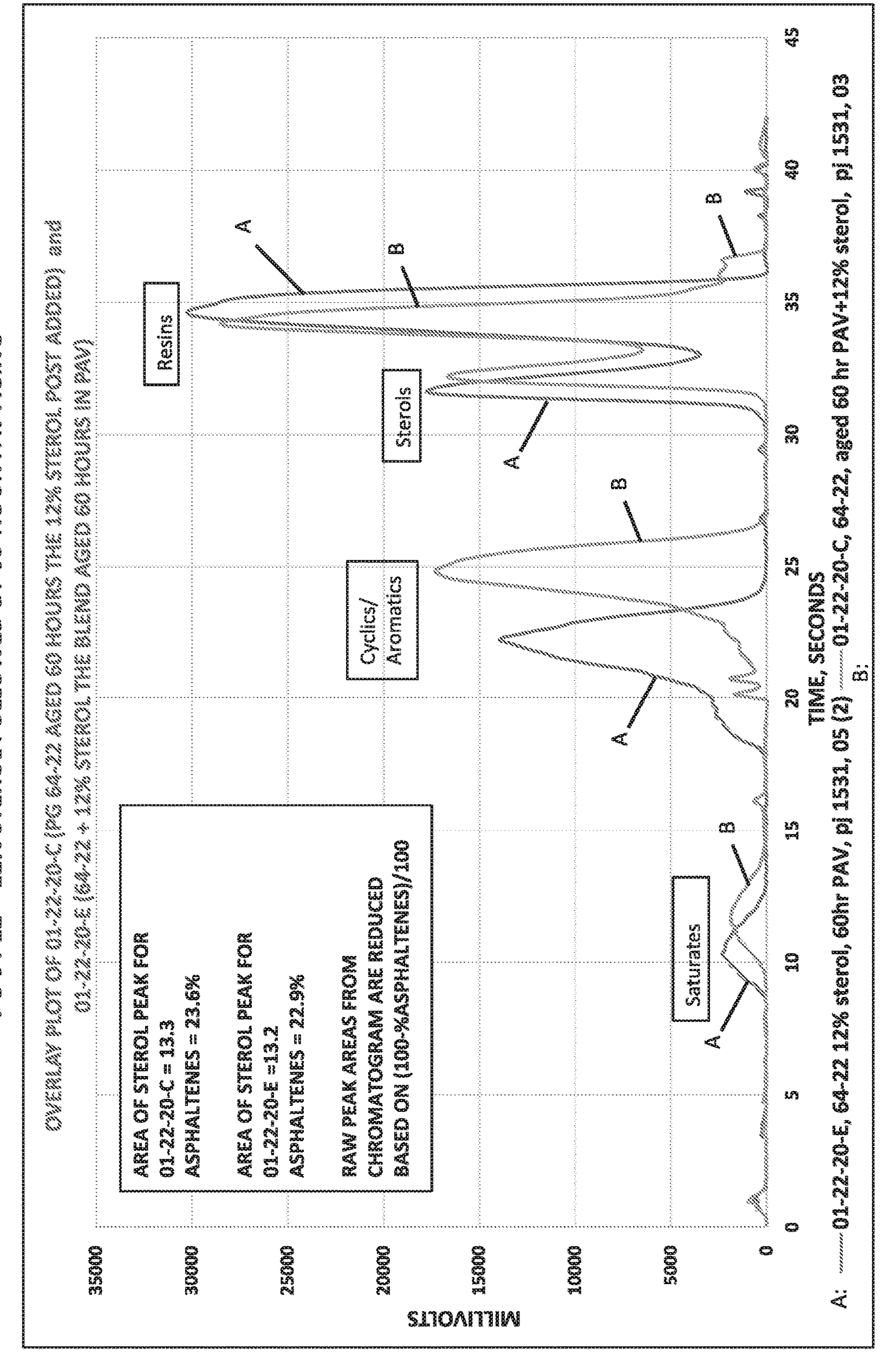
FIG. 31 is overlay IATROSCAN (FID) spectra plot of 60 hour PAV aged 64-22+12% sterol post added and PG 64-22+ 12% sterol followed by 60 hour PAV aging.

When sterol is added to an asphalt binder, in this case PG 64-22, the sterol elutes in the resin fraction. All other bio derived additives have investigated elute as resins even though they are not molecularly the same as asphalt resins. These bio-based materials are not soluble in n-pentane or toluene and only slightly soluble in chloroform. FIG. 30 shows a typical IATROSCAN data plot of 12% sterol post added to PG 64-22 aged for 60 hours in the PAV. Although the sterol was post added it still shows up as separate peak in the resin fraction. FIG. 31 shows that it makes no difference whether the sterol is pre-added or post added the chromatogram is the same with the exception that elution times are slightly different. These peak areas are not quantitative in that they will yield in the case of FIG. 31 values of 12.0. Each sample is spotted on 5 silica treated rods and 5 GC-FID scans are collected. There are differences in the amount of elution and as the data plots show the sterol area is adjoined to the main resin peak and therefore some variability in the amount of sterol will result from test to test. In FIG. 31 similar areas are shown but neither is 12.0%; it is the similarity of the areas that is important in showing that sterol either post added after the base binder was aged or pre-added prior to aging is present at equivalent levels in the two samples.

Figure 32:
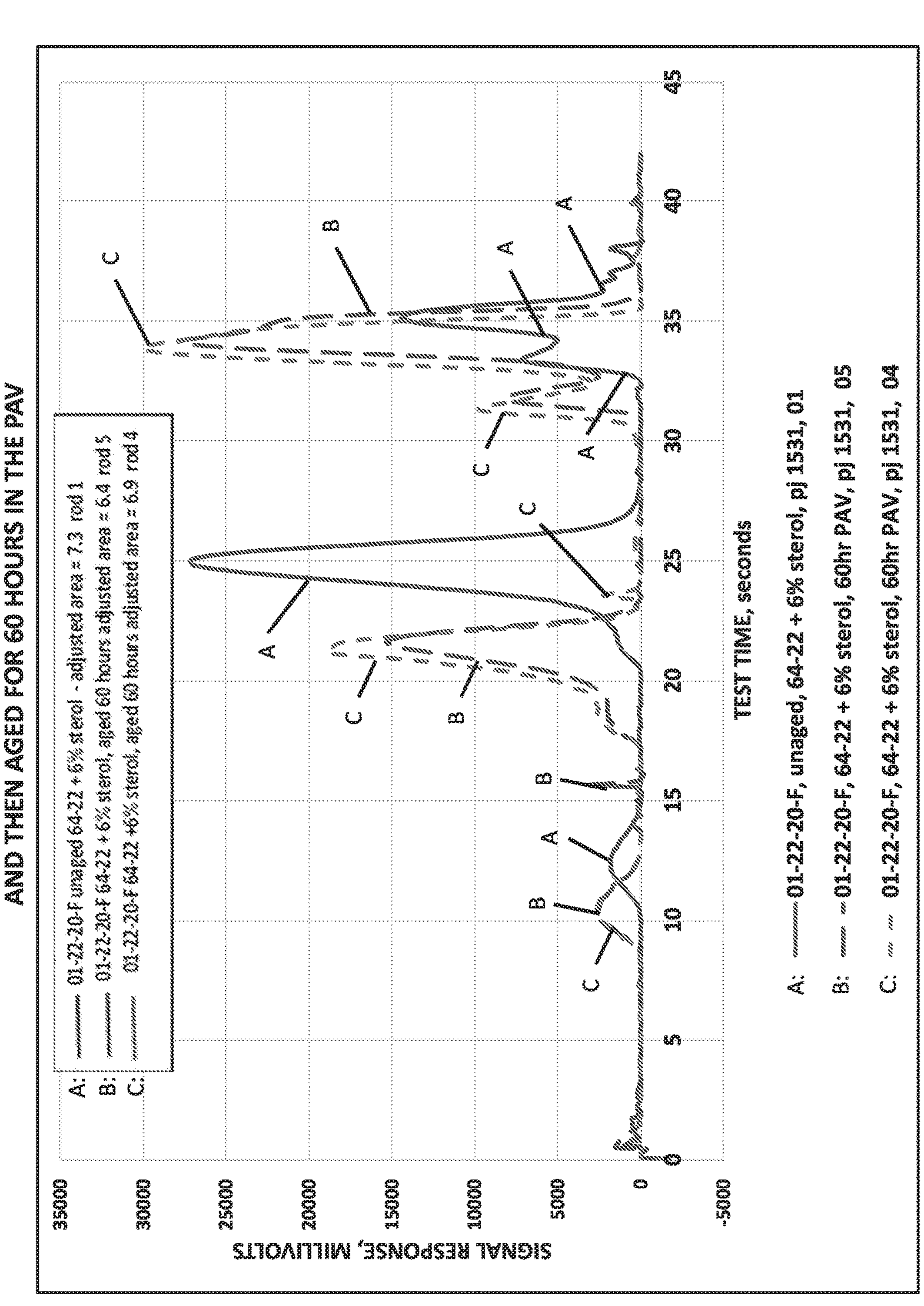
FIG. 32 overlay IATROSCAN (FID) spectra plot of PG 64-22+6% sterol unaged, and two test results for PG 64-22+ 6% sterol and then aged for 60 hours in the PAV.

FIG. 32 shows data plots for 64-22 with 6% sterol. One sample is for PG 64-22+6% sterol with no aging and two data plots are for PG 64-22+6% sterol followed by 60 hour PAV aging. The area adjusted (normalized) for asphaltene content for the samples are shown to 7.3, 6.4 and 6.9. Once again these are not precisely 6% nor are expected to be as explained above. A close examination of FIG. 32 shows the sterol peak of the unaged sample to be smaller than the sterol peaks for the aged samples. Because the unaged sample is unaged the resin area is reduced compared to the resin area of aged samples and the areas for each respective peak is normalized for a total area 100%; hence the smaller sterol peak in the unaged sample represents a relative value of 7.3 when adjusted against the other fractions and adjusted for the sterol content of the unaged binder.

Figure 33:
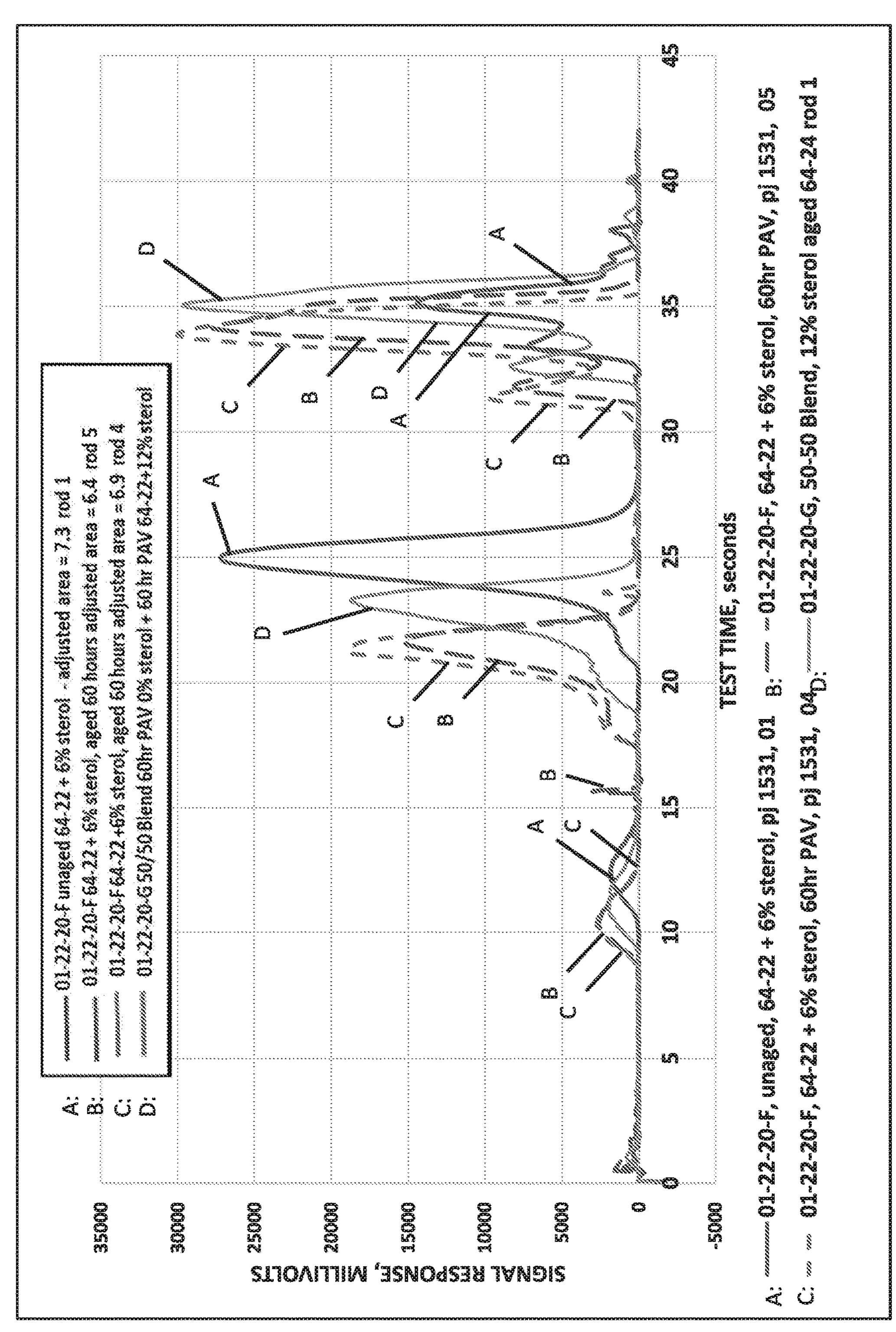
FIG. 33 overlay IATROSCAN (FID) spectra plots of PG 64-22+6% sterol unaged, two test results for PG 64-22+6% sterol and then aged for 60 hours in the PAV, and 50/50 blend of aged 64-22 0% sterol and 64-22+12% sterol 60 hour aged.

In FIG. 33 shows a single data plot added for the blend of 50% PG 64-22 with no aged for 60 hours and 50% of PG 64-22+12% sterol aged for 60 hours. This blend averages to 6% and the area for this sample computes to 6.3 when normalized for asphaltene content.

Example 7

A base 64-22 binder will be used in which the binder is blended with 0%, 5% and 10% sterol in the unaged condition and after aging for 60 hours in the PAV. These samples will be compared with a 60 hour PAV sample which already includes 10% sterol, and will be blended with virgin, oxidized binder with no sterol. The various parameters, such as the R-values, Tm critical, Ts critical data and ΔTc data will be determined. The samples will also be evaluated as Black space plots as discussed above.

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

Published patent applications with publication numbers US20160362338, WO2017027096, WO2017213692, WO2017213693, WO2018031540, US20180215919, WO2018144731, and WO2019023172 are hereby incorporated by reference for all purposes.

What is claimed is:

1. A method for retarding the rate of aging of an asphalt-based roofing material comprising air blowing a virgin asphalt binder composition to provide an oxidized, virgin asphalt binder composition, adding sterol to the oxidized, virgin asphalt binder composition, and, after adding the sterol, using the oxidized, virgin asphalt binder composition to make the asphalt-based roofing material.

2. A method of making roofing materials comprising; treating a virgin asphalt binder to provide an oxidized virgin asphalt binder;

adding sterol to the oxidized virgin asphalt binder composition to form a coating asphalt composition; and coating a roofing material substrate with the coating asphalt binder composition.

3. The method of claim 1, wherein the roofing materials comprise a roofing shingles, a roofing rolls, or a built-up roofing material.

4. The method of claim 1, wherein the sterol includes a reclaimed sterol.

5. The method of claim 1, wherein the sterol comprises reclaimed sterol, fresh sterol, or combinations thereof.

6. The method of claim 1, wherein the sterol is a plant sterol.

7. The method of claim 1, wherein the sterol is a cholesterol.

8. The method of claim 1, wherein the sterol is a pure sterol.

9. The method of claim 1, wherein the sterol is a crude sterol.

10. The method of claim 9, wherein the crude sterol is bio-derived or distilled residue of the bio-derived source.

11. The method of claim 9, wherein the crude sterol comprises a tall oil pitch.

12. The method of claim 1, wherein the sterol is a combination of pure sterol and crude sterol.

13. The method of claim 12, wherein the combination contains 10:90 to 90:10 weight ratio of pure sterol to crude sterol.

14. The method of claim 1, wherein the sterol is about 1 to 10 wt. % or about 1 to 3 wt. % of the asphalt binder weight.

15. The method of claim 1, wherein the sterol a crude sterol comprises an amount effective to provide a less negative ΔTc value after aging.

* * * * *